United States Patent
Yoshida

(10) Patent No.: US 7,589,846 B2
(45) Date of Patent: Sep. 15, 2009

(54) METHOD AND APPARATUS FOR IMAGE FORMING CAPABLE OF EFFECTIVELY CORRECTING ALIGNMENT ERRORS OF ELEMENTARY COLOR OUTPUTS TO BE SUPERPOSED INTO AN IMAGE

(75) Inventor: Yoshiki Yoshida, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 818 days.

(21) Appl. No.: 11/168,344

(22) Filed: Jun. 29, 2005

(65) Prior Publication Data
US 2006/0001891 A1 Jan. 5, 2006

(30) Foreign Application Priority Data
Jun. 30, 2004 (JP) .............................. 2004-194847

(51) Int. Cl.
*G06F 15/00* (2006.01)
*G03F 3/08* (2006.01)
*G06K 9/00* (2006.01)

(52) U.S. Cl. ........................ 358/1.13; 358/518; 382/167

(58) Field of Classification Search ................. 358/518, 358/1.9, 540, 538, 504, 505, 514, 520, 3.26, 358/3.32, 1.13, 1.18, 448, 296, 1.1, 1.6; 382/167, 382/162, 164, 165, 166
See application file for complete search history.

(56) References Cited

U.S. PATENT DOCUMENTS

| 5,469,274 | A | * | 11/1995 | Iwasaki et al. .............. 358/450 |
| 5,801,844 | A | * | 9/1998 | Yamakawa et al. .......... 358/450 |
| 6,130,965 | A | * | 10/2000 | Kobayashi et al. .......... 382/284 |
| 6,493,011 | B1 | * | 12/2002 | Shioya ....................... 347/116 |
| 6,788,320 | B2 | | 9/2004 | Yoshida |
| 7,046,861 | B2 | * | 5/2006 | Imaizumi et al. ............ 382/294 |
| 7,256,815 | B2 | | 8/2007 | Suzuki et al. |
| 7,505,057 | B2 | * | 3/2009 | Yoshida ....................... 347/116 |
| 2002/0186813 | A1 | * | 12/2002 | Tamura et al. ............. 378/98.8 |
| 2003/0210412 | A1 | * | 11/2003 | Ishibashi .................... 358/1.9 |
| 2005/0036028 | A1 | * | 2/2005 | Yoshida ....................... 347/238 |
| 2005/0050424 | A1 | * | 3/2005 | Matsuura .................... 714/748 |
| 2005/0068581 | A1 | * | 3/2005 | Hull et al. ................... 358/1.16 |
| 2007/0139734 | A1 | * | 6/2007 | Fan et al. .................... 358/504 |

FOREIGN PATENT DOCUMENTS

| JP | 05-313425 | 11/1993 |
| JP | 2001-171162 | 6/2001 |
| JP | 2001-290327 | 10/2001 |
| JP | 2003-185953 | 7/2003 |
| JP | 2004-25461 | 1/2004 |
| JP | 2007310514 A | * 11/2007 |

* cited by examiner

*Primary Examiner*—Madeleine A Nguyen
(74) *Attorney, Agent, or Firm*—Oblon, Spivak, McClelland, Maier & Neustadt, L.L.P.

(57) ABSTRACT

An image forming apparatus includes an image forming mechanism configured to perform an image processing operation for forming a plurality of elementary-color images, superposing the plurality of elementary-color images sequentially and accurately into a single color image on a transfer medium, and transferring the single color image onto a recording sheet. An error correction mechanism is configured to perform a plurality of different recording error corrections for correcting different recording errors in a main scanning direction and a sub scanning direction during a time interval between the image processing operations on the recording sheet and on a following recording sheet. And, a selector is configured to activate at least two of the plurality of different recording error corrections.

54 Claims, 22 Drawing Sheets

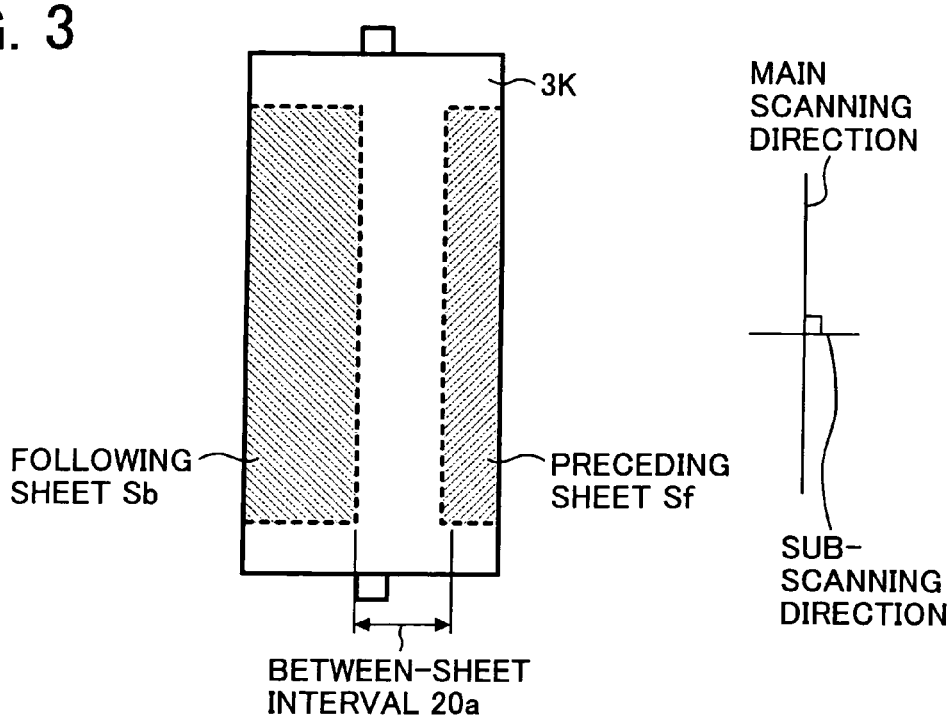
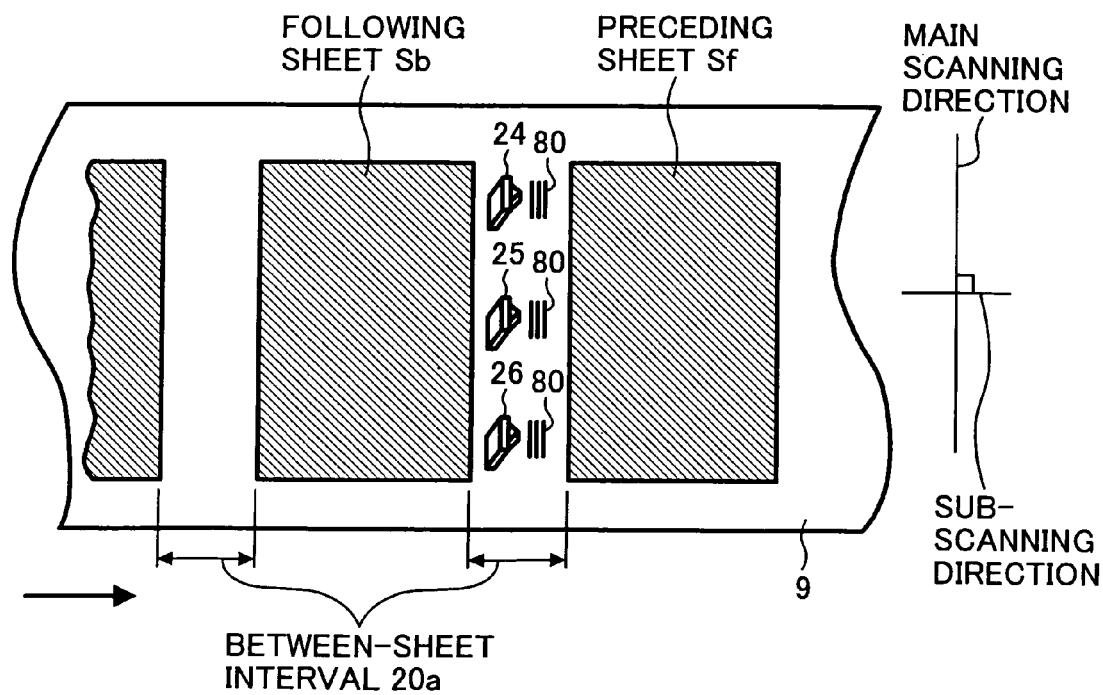

METHOD AND APPARATUS FOR IMAGE FORMING CAPABLE OF EFFECTIVELY CORRECTING ALIGNMENT ERRORS OF ELEMENTARY COLOR OUTPUTS TO BE SUPERPOSED INTO AN IMAGE

CROSS-REFERENCE TO RELATED APPLICATIONS

The present application is based on and claims priority to Japanese patent application No. JPAP 2004-194847 filed on Jun. 30, 2004 in the Japan Patent Office, the entire contents of which are hereby incorporated herein by reference.

BACKGROUND OF THE INVENTION

1. Field of the Invention

The present invention relates to a method and apparatus for image forming, and more particularly to a method and apparatus for image forming capable of effectively correcting alignment errors of elementary color outputs to be superposed into an image.

2. Description of the Background Art

An image forming apparatus forming a color image is generally known. In such an image forming apparatus, a plurality of elementary-color images, that is, latent images, in response to a color image having respective color components are formed on photoconductors by using a plurality of image writing mechanisms. Then, the latent images with the respective color components formed on the photoconductors are developed by color toners, so that color toner images are formed on the respective photoconductors. Then, the color toner images thus formed are superposed and transferred onto a recording medium. Finally, a single color image is formed on the recording medium.

The image forming apparatus described above includes a pattern forming mechanism configured to form patterns with respective color toners, on the photoconductors, used for detecting positional displacements, during an interval of image forming processing on the recording medium, a detection mechanism configured to detect an amount of positional displacements in writing positions of the respective color components, based on positions of toner patterns formed on the respective photoconductors by the pattern forming mechanism, and a correction control mechanism configured to roughly correct the positional displacements in the writing positions with respective color components during a first interval and correct remaining positional displacements in plural times during a second interval or later intervals, based on the amount of the positional displacements in the writing positions of the respective components detected by the detection mechanism.

In such an image forming apparatus described in one document associated with background art, sub-scan color displacements, as an object to be corrected, can be corrected in timing with a between-sheet interval. However, the document does not describe a method for correcting main-scan color displacements, in detail. The document schematically describes that the same method can be applied thereto.

Causes, an amount, and directions of errors to be corrected may be different between correction in the main scanning direction and in the sub scanning direction. Therefore, various countermeasures may be taken to correct the errors.

For example, positional displacements in the main scanning direction, that is to say, a color displacement, may result from a positional variation with time in scan mechanisms, such as a polygon mirror, positional variation with time in optical members such a mirror, etc. In addition, positional displacements in the main scanning direction may also result from accumulated errors in the respective images formed independently. Thereby, positional displacements in a writing start point from a reference position cause positional displacement errors in the main scanning direction between respective colors, so that color displacements are caused. On the other hand, sub-scan color displacements based on a writing error results from a rotation velocity of a mechanism for conveying in the sub scanning direction.

Moreover, as for the errors in the main scanning direction, a magnification error is also known. Suppose a case in which a mold lens group is used for an optical system that guides scanning light to the photoconductor. Quite different from glass lenses unsusceptible to environmental conditions including temperatures, a mold lens group is susceptible to environmental conditions and operating conditions. Accordingly, a refractive index of the mold lens group tends to frequently vary. The magnification error is a certain type of error in which the magnification in the main scanning direction is varied by heat generated by a laser drive part and a polygon motor drive part. Therefore, the error is regarded as "the magnification error in the main scanning direction", and the error is a primary reason for image distortion and color displacement.

An amount of the magnification error in the main scanning direction resulting from variation in refractive index is large. This is because the magnification error in the main scanning direction is caused by temperature variation with time from a point of time when the image forming apparatus is started up. However, since the magnification error in the main scanning direction does not require the patterns used for error detection, a time required for detecting the amount of correction and a time required for correction may be short. On the other hand, a required time period for the positional displacement errors in the main scanning direction and the sub scanning direction is relatively longer. This is because the patterns used for the error detection are formed in detecting the amount to be corrected.

As described above, there are several types of errors with respect to the positional displacements of the image formed on the medium holding the images thereon. In particular, in the image forming apparatus and an image forming method forming the superposed images, since positional displacements are more apparent than color displacements, correcting the positional displacement errors is indispensable to improve image quality. Whereas on the other hand, upon correcting such errors to shorten processing time for forming the image, decrease in processing capability for forming the image needs to be avoided.

SUMMARY OF THE INVENTION

The present invention has been made in view of the above-mentioned and other disadvantages to address the above-discussed and other disadvantages.

One object of the present invention is to provide a novel method and apparatus for image forming of effectively correcting alignment of elementary color outputs to be superposed into an image. More particularly, an object of the present invention is to provide a novel method for correcting the image, an image forming apparatus, an image correction control apparatus capable of reducing positional displacements and of outputting images with improved quality without a down time, in other words, without reduction in image output capability with respect to each unit of time.

The present invention advantageously provides a novel image forming apparatus including an image forming mechanism, an error correction mechanism, and a selector. The image forming mechanism is configured to perform an image processing operation. The image processing operation includes the following operations. Namely, operations of forming a plurality of elementary-color images, superposing the plurality of elementary-color images sequentially and accurately into a single color image on a transfer medium and transferring the single color image onto a recording sheet are included. The error correction mechanism is configured to perform a plurality of different recording error corrections for correcting different recording errors in a main scanning direction and a sub scanning direction. The error corrections are performed during a time interval between the image processing operations on the recording sheet and on a following recording sheet. In addition, a selector is configured to activate at least two of the plurality of different recording error corrections.

In an embodiment of the novel image forming apparatus according to the invention, the plurality of different recording error corrections includes magnification error in the main scanning direction, main-scan displacements in the main scanning direction, and sub-scan displacements in the sub scanning direction. The error correction mechanism includes a first corrector, a second corrector, and a third corrector. The first corrector includes a magnification error detection mechanism and a magnification error correction mechanism. The magnification error detection mechanism is configured to detect an amount of the magnification error in the main scanning direction. On the other hand, the magnification error correction mechanism is configured to correct the magnification error detected by the magnification error detection mechanism. The second corrector includes a main-scan displacement detection mechanism and a main-scan displacement correction mechanism. The main-scan displacement detection mechanism is configured to detect an amount of the main-scan displacements among the plurality of elementary-color images in the main scanning direction. On the other hand, the main-scan displacement correction mechanism is configured to correct the main-scan displacements detected by the main-scan displacement detection mechanism. The third corrector includes a sub-scan displacement detection mechanism and a sub-scan displacement correction mechanism. The sub-scan displacement detection mechanism is configured to detect an amount of the sub-scan displacements among the plurality of elementary-color images in the sub scanning direction. On the other hand, the sub-scan displacement correction mechanism is configured to correct the sub-scan displacements detected by the sub-scan displacement detection mechanism.

In an embodiment of the novel image forming apparatus according to the invention, the magnification error detection mechanism includes two photo-detectors and a magnification error correction amount calculation mechanism. The two photo-detectors are arranged, with an interval, in a direction scanned by scanning light. The magnification error correction amount calculation mechanism is configured to calculate the amount of the magnification error in the main scanning direction with scanning light detection information from the photo-detectors.

In an embodiment of the novel image forming apparatus according to the invention, light receptive photo-detectors are used for the two photo-detectors.

In an embodiment of the novel image forming apparatus according to the invention, the magnification error correction mechanism includes a phase locked loop (PLL) circuit. The PLL circuit is configured to change a pixel clock frequency for writing the plurality of the elementary color images in the main scanning direction, based on displacement information from the magnification error detection mechanism. It is noted that the pixel clock frequency is a pulse train corresponding to a pixel.

In an embodiment of the novel image forming apparatus according to the invention, the magnification error correction mechanism includes a frequency divider, a pulse train generation circuit, and a selector. The frequency divider is configured to generate pixel clock signals based on original clock signals. The pulse train generation circuit is configured to generate pulses for changing phases of image clock signals with respect to regular pixel clock signals, based on an output by the magnification error detection mechanism. The selector is configured to select appropriate pixel clock signals for correction from an output by the pulse train generation circuit.

In an embodiment of the novel image forming apparatus according to the invention, the pulse train generation circuit generates the pixel clock signals for correction with a short pulse width in comparison with the regular pixel clock signals when the single color image tends to be lengthened. On the other hand, the pulse train generation circuit generates the pixel clock signals for correction with a long pulse width in comparison with the regular pixel clock signals when the single color image tends to be shortened.

In an embodiment of the novel image forming apparatus according to the invention, the main-scan displacement detection mechanism includes photo-detectors arranged opposing the transfer medium and a main-scan displacement correction amount calculation mechanism. The main-scan displacement correction amount calculation mechanism calculates the amount of the main-scan displacements, based on detection information from the photo-detectors detecting main-scan displacement error detection patterns formed in advance. It is noted that the displacements are color displacements.

In an embodiment of the novel image forming apparatus according to the invention, the main-scan displacement correction mechanism is a part of an image area signal generation circuit. The image area signal generation circuit receives positional displacement information in the main scanning direction by the main-scan displacement correction amount calculation mechanism. Then, the image area signal generation circuit changes a writing start position with respect to each single main scanning line of pixel clock signals for writing the plurality of the elementary color images, so that main-scan image area signals are output.

In an embodiment of the novel image forming apparatus according to the invention, the sub-scan displacement detection mechanism includes photo-detectors arranged opposing the transfer medium and a sub-scan displacement correction amount calculation mechanism. The sub-scan displacement correction amount calculation mechanism calculates the displacements, based on detection information from the photo-detectors detecting sub-scan displacement error detection patterns in advance. It is noted that the displacements are the color displacements.

In an embodiment of the novel image forming apparatus according to the invention, reflective photo-detectors are used for the photo-detectors.

In an embodiment of the novel image forming apparatus according to the invention, the sub-scan displacement correction mechanism is a part of an image area signal generation circuit. The image area signal generation circuit receives positional displacement information in the sub scanning direction from the sub-scan displacement correction amount calculation mechanism. Then, the image area signal generation circuit changes the writing start position with respect to each single sheet of the pixel clock signals for writing the plurality of the elementary color images, so that a sub-scan image area signal is output.

In an embodiment of the novel image forming apparatus according to the invention, the image area signal generation circuit outputs main-scan image area signals, sub-scan image area signals, and pattern image area signals. The pattern image area signals write the main-scan displacement error detection pattern and the sub-scan displacement error detection pattern.

In an embodiment of the novel image forming apparatus according to the invention, the image area signal generation circuit starts generating the pattern image area signal in synchronization with a sub-scan position of the immediately preceding sub-scan image area signal.

In an embodiment of the novel image forming apparatus according to the invention, when displacement error detection patterns are simultaneously written with detecting of the amount of the magnification error in the main scanning direction by the magnification error detection mechanism, the writing of the displacement error detection patterns is preferentially executed.

In an embodiment of the novel image forming apparatus according to the invention, with respect to a priority to control the first to the third correctors, control over the first corrector has the priority over the second and the third correctors.

In an embodiment of the novel image forming apparatus according to the invention, detecting and correcting of the amount of the main-scan displacements by the second corrector are executed independent of detecting and correcting of the amount of the sub-scan displacements by the third corrector.

In an embodiment of the novel image forming apparatus according to the invention, detecting and correcting of the amount of the main-scan displacements by the second corrector is executed after detecting and correcting of the amount of the sub-scan displacements by the third corrector.

In an embodiment of the novel image forming apparatus according to the invention, when sub-scan displacement error detection patterns are simultaneously written with detecting of the amount of the magnification error in the main scanning direction by the magnification error detection mechanism, concurrent processing is performed.

In another aspect, the present invention advantageously provides a novel image correction control apparatus. The novel image correction control apparatus for use in an image forming apparatus includes an error correction mechanism and a selector. The error correction mechanism performs a plurality of different recording error corrections for correcting different recording errors in a main scanning direction and a sub scanning direction. The plurality of different recording error corrections is performed during a time interval between the image processing operations on the recording sheet and on a following recording sheet. A selector is configured to activate at least two of the plurality of different recording error corrections.

In an embodiment of the novel image correction control apparatus according to the invention, the plurality of different recording error corrections includes magnification error in the main scanning direction, main-scan displacements in the main scanning direction, and sub-scan displacements in the sub scanning direction. The error correction mechanism includes a first corrector, a second corrector, and a third corrector. The first corrector further includes a magnification error detection mechanism and a magnification error correction mechanism. The second corrector further includes a main-scan displacement detection mechanism and a main-scan displacement correction mechanism. The third corrector further includes a sub-scan displacement detection mechanism and a sub-scan displacement correction mechanism.

In an embodiment of the novel image correction control apparatus according to the invention, the magnification error correction mechanism includes a frequency divider and a pulse train generation circuit. It is noted that the image correction control apparatus corrects the magnification error by replacing phases of the pixel clock signals by using the correction pulses having a different pulse width from a pixel clock pulse width, based on correction data obtained from photo-detectors.

In another aspect, the present invention advantageously provides a novel image forming method. The novel image forming method includes performing an image processing operation. In addition, the performing further includes a plurality of operations as follows. Namely, a first operation is to form a plurality of elementary-color images. A second operation is to superpose the plurality of elementary-color images sequentially and accurately into a single color image on a transfer medium. A third operation is to transfer the single color image onto a recording sheet. Then, a fourth operation is to execute a plurality of different recording error corrections for correcting a plurality of different recording errors in a main scanning direction and in a sub scanning direction. The fourth operation is performed during a time interval between the image processing operations on the recording sheet and on a following recording sheet, for the plurality of different recording error corrections.

In an embodiment of the novel image forming method according to the invention, the plurality of different recording errors corrections include at least two of a magnification error correction in a main scanning direction, a main-scan displacement correction in the main scanning direction, and a sub-scan displacement correction in a sub scanning direction.

In an embodiment of the novel image forming method according to the invention, the magnification error correction in the main scanning direction shifts phases of pixel clock signals each determining timings of an individual image recording operation using scanning light, based on a resultant value of a comparison between a scanning time period of the scanning light in the main scanning direction and a reference time period.

In an embodiment of the novel image forming method according to the invention, the main-scan displacement correction in the main scanning direction forms a plurality of predetermined main-scan displacement error detection patterns on the transfer medium. Then, the main-scan displacement correction reads with a plurality of photo-detectors the plurality of predetermined main-scan displacement error detection patterns formed on the transfer medium. Next, the main-scan displacement correction changes start timings of main-scan image area signals to synchronize the individual image recording operation to a predetermined reference timing based on the read values of the plurality of predetermined main-scan displacement error detection patterns.

In an embodiment of the novel image forming method according to the invention, the sub-scan displacement correction in the sub scanning direction forms a plurality of predetermined sub-scan displacement error detection patterns on the transfer medium. Then, the sub-scan displacement correction reads with a plurality of photo-detectors the plurality of predetermined sub-scan displacement error detection patterns formed on the transfer medium. Next, the sub-scan displacement correction changes start timings of sub-scan image area signals to synchronize the individual image recording operation to a predetermined reference timing based on the read values of the plurality of predetermined sub-scan displacement error detection patterns.

In an embodiment of the novel image forming method according to the invention, the plurality of predetermined sub-scan displacement error detection patterns are formed during the time interval between the image processing operations on the recording sheet and on the following recording sheet. The above pattern formation is executed each time when a predetermined time period elapses after a termination of the sub-scan image area signal corresponding to a page length in the sub scanning direction.

In an embodiment of the novel image forming method according to the invention, the executing executes each one of the plurality of different recording error corrections during different intervals of the recording sheets adjacent to each other under the image processing operations.

In another aspect, the present invention advantageously provides a novel image forming method. The image forming method includes performing an image processing operation. The image processing operation further includes a plurality of operations as follows. A first operation is to form a plurality of elementary-color images. A second operation is to superpose the plurality of elementary-color images sequentially and accurately into a single color image. A third operation is to transfer the single color image onto a recording sheet. A fourth operation is to perform a plurality of different recording error corrections. The error correction includes at least two of a magnification error correction in a main scanning direction, a main-scan displacement correction in the main scanning direction, a sub-scan displacement correction in a sub scanning direction, and a toner density correction. The error correction for correcting a plurality of different recording errors is performed during a time interval between the image processing operations on the recording sheet and on a following recording sheet, for the plurality of different recording error corrections.

In an embodiment of the novel image forming method according to the invention, when writing of a toner density correction patterns occurs simultaneously with measuring of the magnification error correction in the main scanning direction, concurrent processing is executed.

In an embodiment of the novel image forming method according to the invention, when a writing sequence other than a case in which the toner density correction patterns are solid shaded patterns having uniform data in all pixels occurs simultaneously with measuring of the magnification error correction in the main scanning direction, concurrent processing is terminated.

In an embodiment of the novel image forming method according to the invention, when reading of the toner density correction patterns occurs simultaneously with measuring of the magnification error correction in the main scanning direction, control over the toner density correction is preferentially executed.

In an embodiment of the novel image forming method according to the invention, the toner density correction patterns are generated in synchronization with completion of a preceding sub-scan image area signal.

In an embodiment of the novel image forming method according to the invention, photo-detectors with a similar type for detecting diffused light are used for both photo-detectors detecting displacement correction patterns and the toner density correction patterns.

In an embodiment of the novel image forming method according to the invention, when writing of displacement correction patterns occurs simultaneously with writing of toner density correction patterns, concurrent writing of both patterns is executed. It is noted that the above-described writing is performed in an arrangement in which the displacement correction patterns and the toner density correction patterns are placed without being superposed with each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a diagram illustrating a between-sheet interval on a photoconductor;

FIG. 4 is a diagram illustrating the between-sheet interval on a transfer belt;

DETAILED DESCRIPTION OF THE PREFERRED EMBODIMENTS

Figure 1:
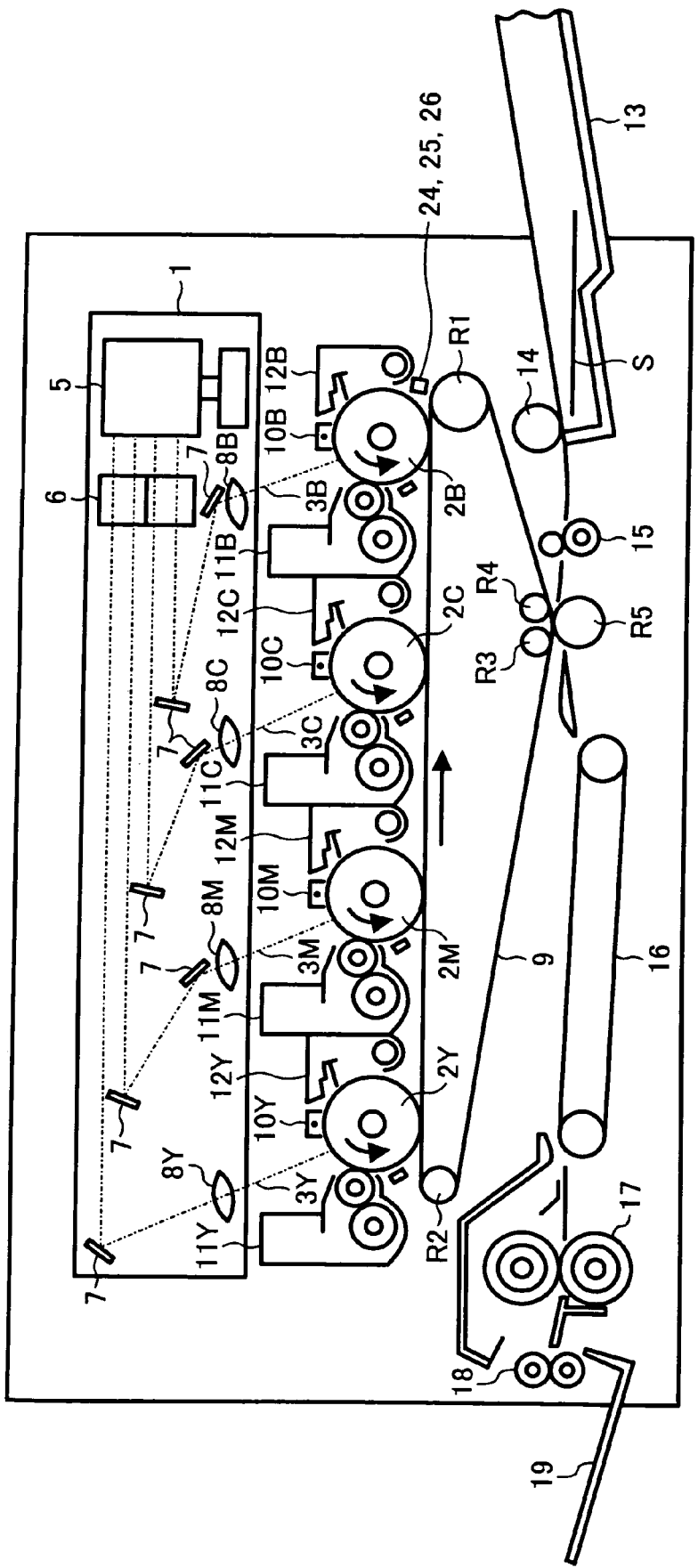
FIG. 1 is a schematic sectional view illustrating a structure of an image forming apparatus according to an embodiment of the present invention.

In describing preferred embodiments illustrated in the drawings, specific terminology is employed for the sake of clarity. However, this patent specification is not intended to be limited to the specific terminology so selected and it is to be understood that each specific element includes all technical equivalents that operate in a similar manner.

In addition, various modifications and improvements are possible without departing from the spirits and scope of the invention.

A configuration of each part without a particular description being given is the same throughout an embodiment as illustrated in FIGS. 1 through 32, and the same reference numerals are attached to the same part so that a redundant description will be avoided for simplicity.

It should be noted that terminologies such as a "main scanning direction" and a "sub scanning direction" represent the following meaning. Typically, the "main scanning direction" indicates a direction in which a beam spot scans a surface to be scanned. On the other hand, the "sub scanning direction" indicates a direction orthogonal to the main scanning direction. However, the terminologies are interpreted in a broader sense in the embodiment. A direction corresponding to the "main scanning direction" of the surface to be scanned indicates the "main scanning direction" on respective positions of an optical path. On the other hand, a direction corresponding to the "sub scanning direction" of the surface to be scanned indicates the "sub scanning direction" on the respective positions of the optical path.

Hereinafter, an image forming apparatus and an image forming method is described with reference to the drawings.

Referring to FIG. 1, an example structure of the image forming apparatus is explained. The image forming apparatus includes an optical writing unit 1, four photoconductors 2Y, 2M, 2C and 2B, a drive roller R1, three support rollers R2, R3 and R4, a transfer roller R5, a transfer belt 9, four charging devices 10Y, 10M, 10C and 10 B, four developing devices 11Y, 11M, 11C and 11B, four cleaning devices 12Y, 12M, 12C and 12B, a paper feed tray 13, a paper feed roller 14, registration rollers 15, a conveyance belt 16, a fixing device 17, paper ejection rollers 18, a paper ejection tray 19, and photo-detectors 24, 25 and 26.

The optical writing unit 1 irradiates scanning light, which is a laser beam, 3Y, 3M, 3C and 3B used for writing images. Each scanning light is irradiated onto respective of the photoconductors 2Y, 2M, 2C and 2B as an image carrier and on surfaces of which each color image, such as a yellow image Y, a magenta image M, a cyan image C and a black image B, is formed. It should be noted that each reference symbol such as Y, M, C and B attached to respective reference numerals indicate members associated with respective colors such as yellow, magenta, cyan and black images.

Figure 2:
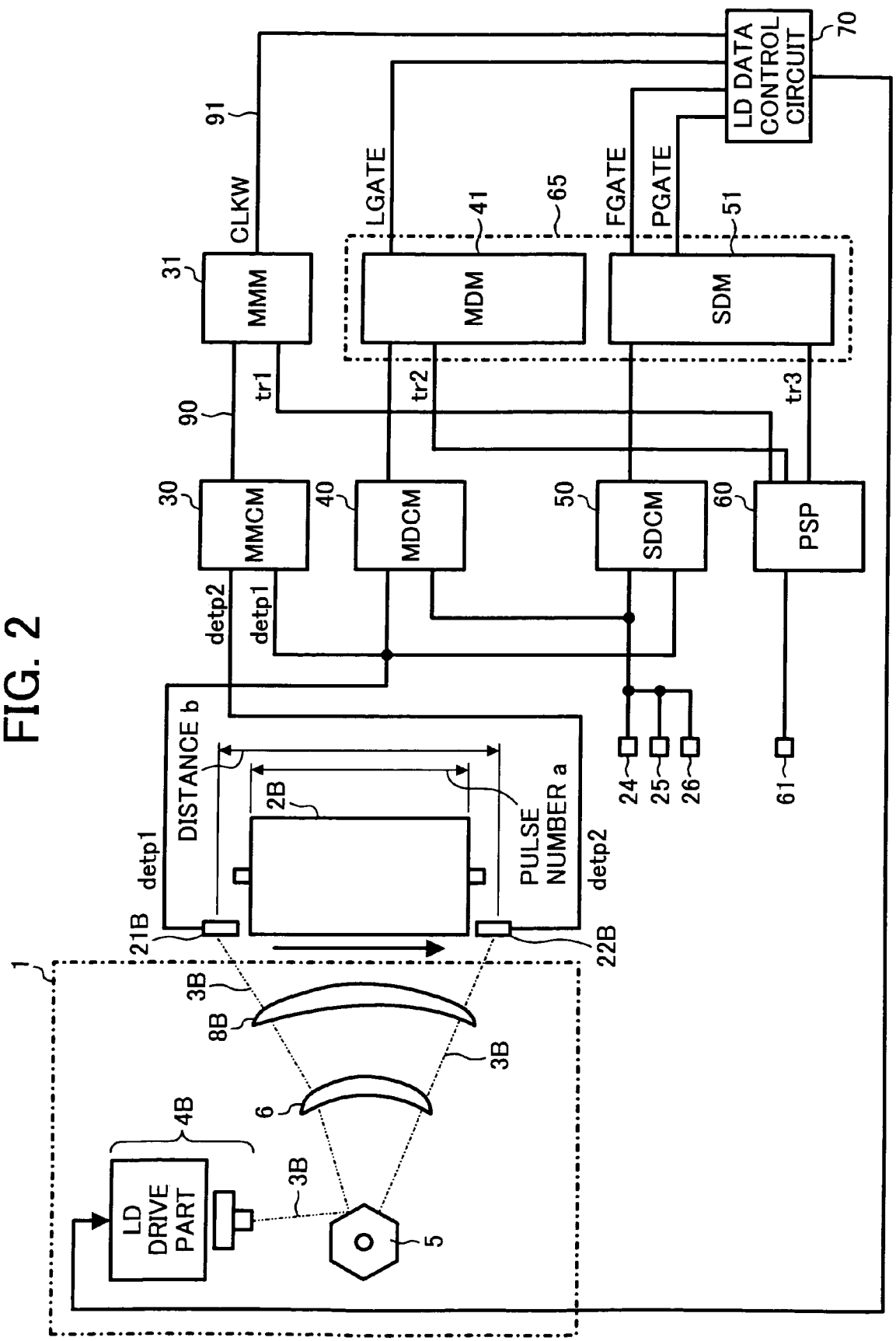
FIG. 2 is a block diagram illustrating mechanisms for controlling a variety of corrections executed according to an embodiment of the present invention.

Referring now to FIG. 2, as an example, the optical writing unit 1 with a black writing system and mechanisms associated with various corrections is illustrated. FIG. 2 shows the optical writing unit 1, the photoconductor 2B, photo-detectors 21B and 22B, photo-detectors 24, 25 and 26, a main-scan magnification error correction amount calculation mechanism (MMCM) 30, a main-scan magnification error correction mechanism (MMM) 31, a main-scan displacement correction amount calculation mechanism (MDCM) 40, a main-scan displacement correction mechanism (MDM) 41, a sub-scan displacement correction amount calculation mechanism (SDCM) 50, a sub-scan displacement correction mechanism (SDM) 51, a processing selection part (PSP) 60, a temperature sensor (TS) 61, an image area signal generation circuit 65 including the above-described the main-scan displacement correction mechanism (MDM) 41 and the sub-scan displacement correction mechanism (SDM) 51, an LD data control circuit 70, magnification error correction amount information 90, a writing signal 91 after correction, detection outputs detp1 and detp2, a regular pixel clock CLKW, a main-scan image area signal LGATE, a sub-scan image area signal FGATE, a pattern image area signal PGATE, a scan magnification correction trigger tr1, a main-scan positional displacement correction trigger tr2, and a sub-scan positional displacement trigger tr3. The mechanisms associated with various types of corrections will be described later in detail.

The optical write unit 1 further includes a black laser diode unit (LD) 4B having a laser diode drive part (LD drive part), a polygon mirror 5, an fθ lens 6, and toroidal lens 8B. The LD unit 4B irradiates scanning light 3B.

The scanning light 3B passes through a coupling optical system (not illustrated) and a cylindrical lens (not illustrated) focusing the scanning light 3B from the coupling optical system, in the main scanning direction. Thereafter, the scanning light 3B reaches the polygon mirror 5. The polygon mirror 5 is a mechanism for deflecting the scanning light 3B so that the scanning light 3B can be scanned. Then, the scanning light represented as 3B is reflected by the polygon mirror 5 and reaches scanning lenses, such as the fθ lens 6 and toroidal lens 8B, and the mirror 7. Finally, the scanning light 3B reaches the photoconductor 2B having a surface to be scanned.

Although not illustrated in FIG. 1, the LD units are provided with respect to each color in the optical writing unit 1, which are the same as the black writing system illustrated in FIG. 2. The scanning light 3Y, 3M or 3C is irradiated from each LD unit to pass through the polygon mirror 5, the common fθ lens 6, and the toroidal lenses for respective colors 8Y, 8M and 8C. Thereafter, the scanning light focuses on the respective photoconductors 2Y, 2M, 2C, as a light spot, and scanning operation is executed in such a direction that penetrates a surface of a sheet, that is, in the main scanning direction.

The respective photoconductors 2Y, 2M, 2C and 2B have a drum shape. The transfer belt 9 is provided under the respective photoconductors so that the transfer belt 9 can be commonly in contact with the photoconductors. A portion commonly in contact with the respective photoconductors is referred to as a primary transfer part. The transfer belt 9 is supported by the drive roller R1, the support rollers R2, R3 and R4 provided adjacent to the drive roller R2. The respective photoconductors 2Y, 2M, 2C and 2B are arranged in a substantially equal interval along a traveling direction of the transfer belt 9, that is, in the sub scanning direction, shown by an arrow in FIG. 1.

Around the respective photoconductors 2Y, 2M, 2C and 2B, the charging devices 10Y, 10M, 10C and 10B, the developing devices 11Y, 11M, 11C and 11B, and the cleaning device 12Y, 12M, 12C and 12B are arranged in a direction of rotation. For example, in the photoconductor 2B, when the scanning operation by the scanning light 2B from the writing unit 1 is executed in the main scanning direction at a position between the charging device 10B and the developing device 11B, a black latent image is formed. Latent images with respective colors are equally formed with respect to respective photoconductors.

The latent images are visualized by the developing devices 11Y, 11M, 11C and 11C corresponding thereto. Next, the latent images are sequentially superposed on the transfer belt 9 as a medium on a surface of which the latent images are transferred at the primary transfer portion at which the respective photoconductors 2Y, 2M, 2C and 2B are in contact with the transfer belt 9, so that the color image is formed. It should be noted that the cleaning devices 12Y, 12M, 12C and 12B remove residual color toner from the respective photoconductors 2Y, 2M, 2C and 2B to prepare for a next image formation.

The superposed image on the transfer belt 9 is conveyed from the paper feed tray 13 by the paper feed roller 14, and the superposed image is transferred on a sheet shaped medium S at a secondary transfer portion at which two support rollers R3, R4 and the transfer roller R5 are provided facing each other. A timing for conveying the sheet-shaped medium is adjusted at the portion of the pair of registration rollers 15. The sheet-shaped medium S having the superposed image thereon is conveyed to the fixing device 17 by the transfer belt 16 and is further conveyed to the paper ejection tray 19 by using the paper ejection rollers 18, after passing through the fixing device 17.

In the image forming apparatus described above, although the medium on which the superposed image is formed is the transfer belt 9, there is another type of image forming apparatus having the medium on which the superposed image is formed is a sheet-shaped medium. In this case, the sheet-shaped medium is a last medium on which the superposed image is formed. The present invention may be applicable to both types of image forming apparatuses.

Hereinafter, a between-sheet interval will be explained. In such image forming apparatus or such image forming method according to the present invention, when image processing ranging over more than one sheet is performed in a single job (that is, a series of image processings executing a plurality of images), a plurality of error corrections are executed at an interval between the image processing in a preceding sheet and the image processing in a following sheet. Hereinafter, the interval is referred to as the "between-sheet interval".

Referring to FIG. 3 illustrating the between-sheet interval, a preceding sheet Sf and a following sheet Sb are illustrated on the photoconductor 3B. The interval between the preceding sheet Sf and the following sheet Sb is a between-sheet interval 20a. A vertical line parallel to the photoconductor 3B is the main scanning direction and a line orthogonal to the main scanning direction is the sub scanning direction.

The interval between the image processing in the preceding sheet and in the following sheet occurs in each phase during the image processing. For example, in an image forming phase of the photoconductor, as is described when explaining FIG. 3, the interval explained here is a temporal interval or a special gap which is equivalent to an area between a latent image formation, that is the image processing, by the scanning light 3B with respect to the preceding sheet Sf and the latent image formation by the scanning light 3B with respect to the following sheet Sb, both latent image formations being executed on the photoconductor 3B.

A blank between the preceding sheet Sf and the following sheet Sb represents the between-sheet interval 20a, in FIG. 3. The spatial blank also represents a time period between the latent image formation by the scanning light 3B with respect to the preceding sheet Sf and the latent image formation by the scanning light 3B with respect to the following sheet Sb, for example, as illustrated in FIG. 17 which will be described later in detail. Hereinafter, the between-sheet interval 20a and the time period between sheets are equivalently treated unless otherwise noted.

Referring now to FIG. 4, FIG. 4 is a diagram illustrating the between-sheet interval on the transfer belt 9. Two orthogonal lines on the left upper side of FIG. 4 indicate the main scanning direction and the sub scanning direction. A pattern 80 used in correcting positional displacement errors and the photo-detectors 24, 25, and 26 are illustrated between the intervals between the sheets 20a. Both will be described later in detail.

The yellow images are superposed on the preceding sheet Sf and the following sheet Sb, at a step after a primary transfer step in the photoconductor 2Y, respectively, during the primary transfer step with respect to the transfer belt 9. The magenta images are superposed on the yellow images on the preceding sheet Sf and the following sheet Sb, respectively, at the step after the primary transfer step in the photoconductor 2M. The cyan images are superposed on the yellow images and the magenta images in the preceding sheet Sf and in the following sheet Sb, respectively, at a step after the primary transfer step in the photoconductor 2C. The black images are superposed on the yellow images, the magenta images and cyan images on the preceding sheet Sf and on the following sheet Sb, respectively, at a step after the primary transfer step in the photoconductor 2C. Finally, a full-color image is formed thereon. In each case, there is the between-sheet interval between the preceding sheet Sf and the following sheet Sb. In a case where there are many sheets, the between-sheet interval exists between the respective neighboring sheets.

Thus, the between-sheet interval serves as a delimiting boundary between the sheets. In other words, the between-sheet interval is indispensable. In addition, the between-sheet interval is a space and a period essentially required. Accordingly, by measuring positional displacements and a magnification error occurred on the image to correct the positional displacements and the magnification error with the help of the between-sheet interval, image correction without downtime can be achieved and image quality can be improved. It should be noted that, here, the down time indicates reduction in performance with time during image output. A plurality of different types of writing error corrections executed with the help of the between-sheet interval will be explained later in detail.

The magnification error in the main scanning direction will now be explained. In the image forming apparatus illustrated in FIGS. 1 and 2, mold lenses are used for the fθ lens, the toroidal lenses 8Y, 8m, 8C and 8B, and the coupling optical system. The mold lenses are not only susceptible to temperature variation but also tend to deform with temperature variation. Magnification by the mold lens tends to vary in the main scanning direction in the latent image formation by the scanning light. As a result, the magnification error in the main scanning direction may occur. The magnification error in the main scanning direction further causes color displacements on the superposed image. Therefore, correcting the magnification error in the main scanning direction improves the image.

Positional displacement errors in the main scanning direction and the sub scanning direction will now be explained. When employing the image forming method and the image forming apparatus in which the images are formed on the plurality of photoconductors 2Y, 2M, 2C and 2B respectively to sequentially superpose the images on the transfer belt 9, so that the superposed image can be formed, since the superposed image is formed by sequentially superposing the respective images formed on the respective photoconductors 2Y, 2M, 2C and 2B independently provided, the errors caused by the positional displacements with respect to each image formed on the photoconductors are accumulated. Thus, the superposed image made up of the respective images having positional displacements includes the accumulated positional displacements.

The positional displacement errors in the entire image caused by accumulated processing errors associated with mechanisms used for forming the image such as the photoconductors or accumulated errors associated with positional accuracy in assembling the apparatus includes positional displacement errors in the main scanning direction and positional displacement errors in the sub scanning direction, depending on the directions of the positional displacements. The positional displacement errors in the main scanning direction results in the color displacements in the main scanning direction. The positional displacement errors in the sub scanning direction results in the sub-scan color displacements. Accordingly, correcting the positional displacement errors with respect to the main scanning direction, correcting the positional displacement errors in the sub scanning direction, or correcting the positional displacement errors in both directions can prevent the color displacement (that is, blurring) from occurring.

Hereinafter, the correction executed during the between-sheet interval will be explained. The three types of error corrections such as the magnification error correction in the main scanning direction, the positional displacement error correction in the main scanning direction, and the positional displacement error correction in the sub scanning direction can be achieved by changing writing timing and writing velocity by the scanning light, that is, by changing writing conditions.

In the embodiment, the plurality of different error corrections are executed in the between-sheet interval. The plurality of different error corrections includes at least two of the three types of error corrections such as the magnification error correction in the main scanning direction, the positional displacement error correction in the main scanning direction, and the positional displacement error correction in the sub scanning direction.

Furthermore, the plurality of different writing error corrections are not executed in the same timing with respect to the between-sheet interval, but are executed at different timings with respect to the between-sheet interval in a dispersed manner. Executing the error correction with dispersed timing allows the error correction without changing a predetermined period assigned to the between-sheet interval.

As to combinations of the above two types, four types (A)-(D) of combinations can be selected as follows.

(A) The magnification error correction in the main scanning direction and the positional displacement error correction in the main scanning direction.

(B) The magnification error correction in the main scanning direction and the positional displacement error correction in the sub scanning direction.

(C) The positional displacement error correction in the main scanning direction and the positional displacement error correction in the sub scanning direction.

(D) The magnification error correction in the main scanning direction, the positional displacement error correction in the main scanning direction, and the positional displacement error correction in the sub scanning direction.

The error correction described in (A) is capable of reducing the positional displacements in the main scanning direction (in the case of the color image, color displacement). The error correction described in (B) is capable of reducing the positional displacements in the main scanning direction (also in the case of the color image, color displacement) by the magnification error correction in the main scanning direction capable of executing quick processing. Then, the positional displacements in the sub scanning direction (also in the case of the color image, color displacement) can be corrected by the positional displacement error correction in the sub scanning direction. As a result, the correction in the main scanning direction and the sub scanning direction can be achieved. The error correction described in (C) is capable of reducing the positional displacements in both the main scanning direction and the sub scanning direction (also in the case of the color image, color displacement) by the positional displacement error correction. The error correction described in (D) is capable of reducing not only the positional displacements in the main scanning direction and the sub scanning direction (also in the case of color image, color displacement) but also improving the magnification error in the main scanning direction, so that the image quality may be drastically improved.

For example, typically, control for reducing color displacements by correcting an amount of the displacements between respective colors is executed in a following manner. First, the number of times for executing the magnification error correction in the main scanning direction is increased, so that the amount of the displacements can be suppressed by independently adjusting the magnification to a median of the error with respect to each color. Then, the positional displacement error correction is executed after a certain time period has elapsed. The above corrections are not necessarily executed in the same between-sheet interval but may be executed, in the dispersed manner, at different between-sheet intervals having different timings. As a result, the correction may be executed without the downtime, in other words without the reduction in performance with time in the image output, in the image forming apparatus.

Otherwise, the magnification error correction is executed in the between-sheet interval of, e.g., every couple of sheets so that the positional displacement error correction can be executed once for several magnification error corrections or in a designated temperature interval detected by a temperature sensor.

As described above, the image correction without the downtime caused by the image forming apparatus resulted from the above described corrections may be achieved by combining at least two of the three types of error corrections and measuring the errors required for the corrections in the same between-sheet interval, or by measuring errors, in the dispersed manner, during the plurality of the between-sheet intervals, so that the image quality can be improved.

Hereinafter, the variety of error correction mechanisms will be explained. In the above examples of the image forming apparatus according to FIGS. 1 through 4, the present invention identifies three types of errors to be corrected in the between-sheet interval. Namely, the magnification error in the main scanning direction, the positional displacement errors in the main scanning direction, and the positional displacement errors in the sub scanning direction are identified. Therefore, three types of mechanisms, which will be explained below, are prepared.

There is provided a first set of mechanisms configured to correct the magnification error in the main scanning direction. The first set of mechanisms is a main-scan magnification error detection mechanism, which includes two photo-detectors 21B and 22B, a main-scan magnification error correction amount calculation mechanism (MMCM) 30, and a main-scan magnification error correction mechanism (MMM) 31, shown in FIG. 2. In addition, there is provided a second set of mechanisms configured to correct the displacement in the main scanning direction. The second set of mechanism is a main-scan displacement detection mechanism, which includes photo-detectors 24, 25 and 26, a main-scan displacement correction amount calculation mechanism (MDCM) 40, and a main-scan displacement correction mechanism (MDM) 41, shown in FIG. 2.

Moreover, there is provided a third set of mechanisms configured to correct the positional displacement error correction in the sub scanning direction. The third set of mechanisms is a sub-scan displacement detection mechanism, which includes photo-detectors 24, 25 and 26, a sub-scan displacement correction amount calculation mechanism (SDCM) 50, and a sub-scan displacement correction mechanism (SDM) 51, shown in FIG. 2. In addition, there is provided a processing selection part (PSP) 60, as a mechanism for correcting the writing error, configured to drive at least two of the three sets of mechanisms at a timing during the between-sheet interval.

The three sets of mechanisms and the processing selection part (PSP) 60 are provided in the image forming apparatus in which, after forming the latent images on the plurality of image carriers, each latent image is visualized to sequentially superpose each visualized image on the medium on which the visualized image is transferred, so that the superposed image can be formed. The three sets of mechanisms and the processing selection part (PSP) 60 constitute a correction control device capable of properly dealing with the positional displacements in the main scanning direction and in the sub scanning direction that have occurred on the image or the magnification error in the main scanning direction. As a result, the positional displacements in the main scanning direction and in the sub scanning direction or the magnification error in the main scanning direction may be treated quickly and appropriately.

FIG. 2 illustrates a configuration where three types of errors, that is, the magnification error in the main scanning direction, the positional displacement errors in the main scanning direction, and the positional displacement errors in the sub scanning direction, may be corrected. The correction control device includes the main-scan magnification error detection mechanism having the photo-detectors 21B and 22B, the main-scan magnification error correction amount calculation mechanism (MMCM) 30, and the main-scan magnification error correction mechanism (MMM) 31. In addition, the correction control device also includes the main-scan displacement detection mechanism having the photo-detectors 24, 25 and 26, the main-scan displacement correction amount calculation mechanism (MDCM) 40, and the main-scan displacement correction mechanism (MDM) 41. Moreover, the correction control device also includes the sub-scan displacement detection mechanism having the photo-detectors 21B and 22B, the sub-scan displacement correction amount calculation mechanism (SDCM) 50, and the sub-scan displacement correction mechanism (SDM) 51.

The correction control device also includes a temperature sensor (TS) 61 configured to detect temperatures affecting the magnification change in the main scanning direction by the scanning lights 3Y, 3M, 3C and 3B. The temperature sensor (TS) 61 is provided in the optical unit 1 containing the optical scanning system. Information detected by the temperature sensor (TS) 61 is input to the processing selection part (PSP) 60.

Thus, executing two of the three types of error corrections and measuring the errors required for the corrections are combined within the same between-sheet interval or during the plurality of between-sheet interval in the dispersed manner, and thereby the image correction without the downtime of the image forming apparatus resulting from the corrections may be achieved to improve the image quality.

Hereinafter, a correction system, more particularly, a magnification correction system in the main scanning direction, will be explained. In other words, a schematic information flow constituting the correction system and an outline of the correction will be explained.

As illustrated in FIG. 2, the photo-detectors 21B and 22B that detect the scanning light 3B for the black image, in the main scanning direction, output detection outputs detp1 and detp2 to the main-scan magnification error correction amount calculation mechanism (MMCM) 30. The photo-detectors with respect to each color (not illustrated), which are provided in response to the scanning lights 3Y, 3M and 3C for each color, output the detection outputs to the main-scan magnification error correction amount calculation mechanism (MMCM) 30, as well.

The main-scan magnification error correction calculation mechanism (MMCM) 30 receiving the outputs compares a scanning time period in the main scanning direction with a reference value to calculate the magnification error in the main scanning direction. Then, the main-scan magnification error correction calculation mechanism (MMCM) 30 outputs the value, thus obtained, that is, magnification error correction amount information 90, to the main-scan magnification error correction mechanism (MMM) 31.

The main-scan magnification error correction mechanism (MMM) 31 to which the value thus obtained is input generates a writing signal 91 after correction, that is, a pixel clock CLKW, used for writing the image with the help of the scanning light to output the LD data circuit 70. A writing signal after correction 91 is a pixel clock, that is, clkw2, a phase of which is led with respect to a regular pixel clock, that is, clkw, described later in detail in FIG. 8, or a pixel clock, that is, clkw1, a phase of which is lagged with respect to the regular clock. On the other hand, the writing signal after correction 91 is a pixel clock, that is, clkw20, a phase of which is led with respect to the regular pixel clock or a pixel clock, that is, clkw10, a phase of which is lagged with respect to the regular pixel clock, described later in detail in FIG. 11.

Thus, the magnification error correction in the main scanning direction is executed as follows. Namely, scanning time in the main scanning direction by the scanning light is compared with the reference value, and based on the value thus obtained by the above comparison, the phase of the pixel clock for writing the image by using the scanning light is led or lagged, so that the magnification correction in the main scanning direction can be executed. Processing which converts the phase of the image signal for writing the image is employed for this correction method. This method allows the processing to execute at the timing in the between-sheet interval by dividing the processing in chronological order.

The LD data control circuit 70 receiving the output generates signals for writing respective color images, such as a black image, to output to the respective color LD units, such as 4B. The signals are output together with the output from the main-scan displacement correction mechanism (MDM) 41 and sub-scan displacement correction mechanism (SDM) 51, which will be described later. Each LD unit receiving each writing signal causes a laser light source to operate by using the writing signal after correction 91. The writing signal after correction is an image writing signal after correction. Then, the respective LD units scan the photoconductors 2Y, 2M, 2C and 2B by using the scanning lights 3Y, 3M, 3C and 3B to write latent images.

It should be noted that, although details are not illustrated in FIG. 2 to avoid complication, the photo-detectors similar to the photo-detectors 21B and 22B which detect, in the main scanning direction, the scanning light 3B for the black image are provided corresponding to the respective photoconductors. The photo-detectors are used for detecting the scanning lights 3Y, 3M and 3C. Thus, the image signals after correction may be obtained with respect to each color according thereto. The images after correction can be written on the respective photoconductors 2Y, 2M, 2C and 2B by operating the LD units for the respective colors.

Hereinafter, other correction systems, more particularly, a positional displacement correction system in the main scanning direction and in the sub scanning direction will be explained.

The photo-detectors 24, 25 and 26 are shared for detecting the positional displacement errors in the main scanning direction and the sub scanning direction, in FIGS. 1 and 4. The photo-detectors are provided on a position in the direction of rotation of the transfer belt 9 shown by arrow in FIG. 1, that is, a downstream side of the photoconductor 2B, which is the last transfer member used for superposing the images. More specifically, the photo-detectors are provided on positions that are at an upstream side of the secondary transfer portion on which the support rollers R3, R4 and the transfer roller R5 are provided in an opposing manner. In the embodiment, the photo-detectors are provided on the positions opposing the support roller SI, while on the other hand, the photo-detectors also oppose the transfer belt 9. There are three photo-detectors fixed on an immobile member such as image forming apparatus main body.

The photo-detectors 24, 25 and 26 are reflective photo-detectors. The photo-detectors 24 through 26 are capable of reading displacement error detection patterns formed on the transfer belt 9. In addition, the photo-detectors 24 through 26 detect the positional displacements in the main scanning direction and in the sub scanning direction to provide information for automatically calculating a degree of the positional displacements, the correction amount, and the number of times of the correction executed in the between-sheet interval in the dispersed manner.

The photo-detectors 24 through 26 detect main-scan displacement error detection patterns and sub-scan displacement error detection patterns formed with respect to each color in the between-sheet interval. These patterns are represented by reference numeral 80. Details thereof will be described in FIGS. 15 and 16. The patterns 80 used for detecting the displacement errors in the main scanning direction and the sub scanning direction are formed in a following procedure. A pattern generation part (not illustrated) outputs a pattern forming signal to the LD data control circuit 70. The pattern forming signal operates each LD unit with respect to each color such as the LD unit 4B. The respective LD units form the latent images on the photoconductors 2Y, 2M, 2C and 2B. The latent images are visualized and transferred.

Detection information of the patterns 80 by the photo-detectors 24 through 26 are output to the main-scan displacement correction amount calculation mechanism (MDCM) 40 and the sub-scan displacement correction amount calculation mechanism (SDCM) 50 in FIGS. 2 and 4. The main-scan displacement correction amount calculation mechanism (MDCM) 40 receiving the detection information by the photo-detectors 24 through 26 calculates the positional displacement errors in the main scanning direction with respect to each color to output the error information to the main-scan displacement correction mechanism (MDM) 41.

The main-scan displacement correction mechanism (MDM) 41 receiving the error information outputs a main-scan image area signal LGATE corrected with respect to each color to the respective LD units such as the LD unit 4B. The respective LD units write images at corrected main-scan positions with respect to each photoconductor such as 2Y, 2M, 2C and 2B.

In addition, the sub-scan displacement correction amount calculation mechanism (SDCM) 50 receiving the detection information by the photo-detectors 24 through 26 calculates the positional displacement errors in the sub scanning direction with respect to each color to output the error information to the sub-scan displacement correction mechanism (SDM) 51.

The sub-scan displacement correction mechanism (SDM) 51 receiving the error information writes a sub-scan image area signal FGATE corrected with respect to each color, to the respective LD units such as the LD unit 4B. The respective LD units write images at corrected sub-scan positions with respect to each color. Thus, the magnification correction system in the main scanning direction and the positional displacement error correction systems in the main scanning direction and in the sub scanning direction constitute feedback systems so that the errors can be eliminated. Hereinafter, a detailed description of the respective correction mechanisms and method thereof will be given.

The embodiment in FIG. 2 relates to the first set of mechanisms. That is, the first set of mechanisms is the main-scan magnification error detection mechanism including the photo sensor 21B and 22B, the main-scan magnification error correction amount calculation mechanism (MMCM) 30, and the main-scan magnification error correction mechanism (MMM) 31.

The main-scan magnification error detection mechanism, which detects the magnification error in the main scanning direction, mainly includes the photo-detectors 21B and 22B and the main-scan magnification error correction amount calculation mechanism (MMCM) 30, in FIG. 2. The two photo-detectors are provided along a scanning direction by the scanning light 2B and along a rotation axis direction of the photoconductor 3B. In addition, the photo-detectors are positioned outside the image area of the photoconductor 3B with a certain interval. The main-scan magnification error correction amount calculation mechanism (MMCM) 30 calculates the magnification error in the main scanning direction by receiving the detection outputs from the photo-detectors 21B and 22B.

Figure 5:
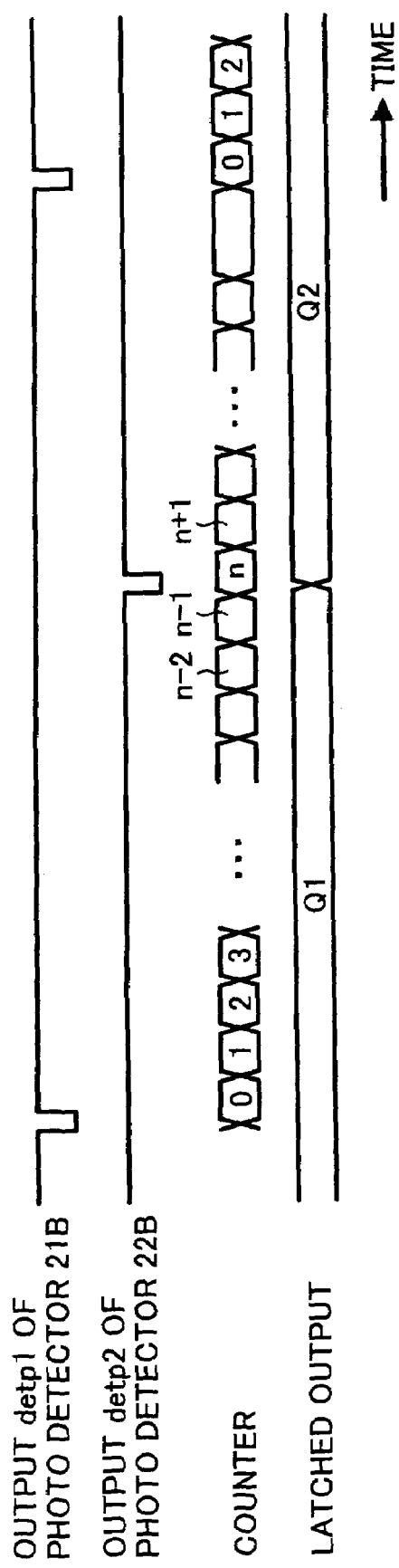
FIG. 5 is a timing chart illustrating a relation between an optical detection output and other outputs.

Referring to FIG. 5, an uppermost line indicates the detection output of the photo-detector 21B, that is, a front end synchronization detection. A second line indicates the detection output of the photo-detector 22B, that is, the front end synchronization detection. A third line indicates a number counted by a counter. A lowermost line indicates a latched counter output. Q I and Q2 indicate counted values with preceding and following lines, respectively.

Figure 6:
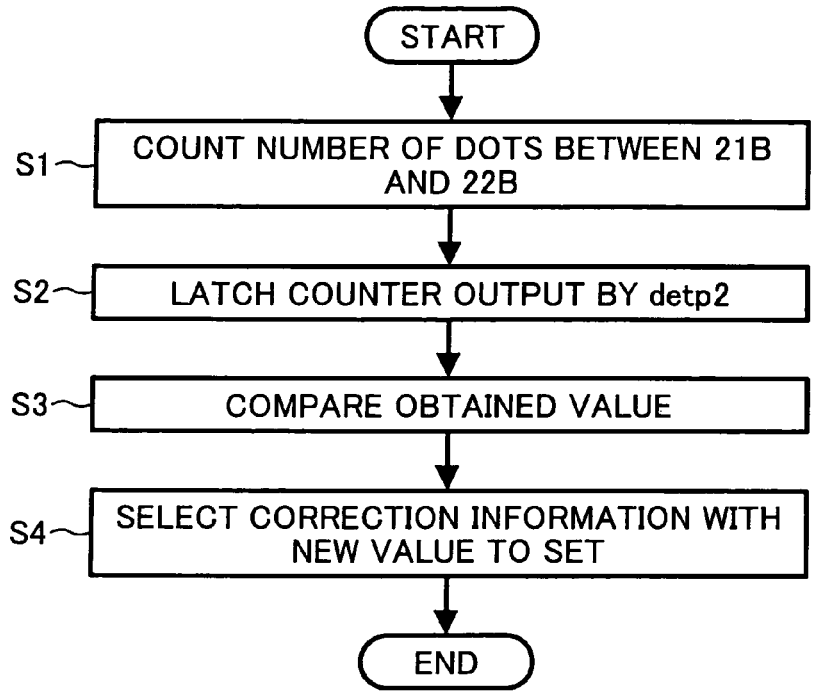
FIG. 6 is a flowchart illustrating a procedure for calculating an amount of magnification error correction.

Referring to FIG. 6, a calculation of the magnification error correction is explained.

As illustrated in FIGS. 5 and 6, the main-scan magnification error correction amount calculation mechanism (MMCM) 30 counts a period elapsed from a point of time in which the photo-detector 21B at a front end outputs the detection output detp1 to a point of time in which the photo-detector 22B at a rear end outputs the detection output detp2. That is Step S1. The main-scan magnification error correction amount calculation mechanism (MMCM) 30 latches a counter output by the detection output detp2 of the photo-detector 22B of rear end synchronization detection to obtain a time interval or the number of pixels of the scanning light passing through the two photo-detectors. That is Step S2. The main-scan magnification error correction amount calculation mechanism (MMCM) 30 compares a count value Q1 at the preceding line, that is, the period or the number of pixels, and a count value Q2 at the following line, that is, the period or the number of pixels, with a period as a reference or the number of pixels as a reference. That is Step S3. Thereby, the main-scan magnification error correction amount calculation mechanism (MMCM) 30 selects the magnification error correction amount information 90, that is, a new value after correction, from a table based on a comparison result. That is Step S4.

Thus, since the time interval or the number of pixels of the scanning light passing through the photo-detectors positioned on two different points is compared with the reference value so that the magnification error correction information 90 with a new value can be selected, in other words, a predetermined procedure can be executed, automation is possible in the main-scan magnification error detection mechanism.

Receiving and detecting the scanning light by the two photo-detectors 21B and 22B allows data acquisition for calculating the magnification error in the main scanning direction because the receptive photo-detectors can detect the scanning light passing through the photo-detectors with ease.

When the main-scan magnification error correction amount calculation mechanism (MMCM) 30 outputs the magnification error correction information 90 with the new value after correction to the main-scan magnification error correction mechanism (MMM) 31, in FIG. 2, the main-scan magnification error correction mechanism (MMM) 31 generates the image writing signal 91, in other words, the image clock CLKW after correction, to output to the LD data control circuit 70.

Hereinafter, two examples for the main-scan magnification error correction mechanism (MMM) 31 will be described. In a first case, the magnification error correction mechanism includes a phase locked loop (PLL) circuit. In a second case, the magnification error correction mechanism includes a pulse generation circuit.

Figure 7:
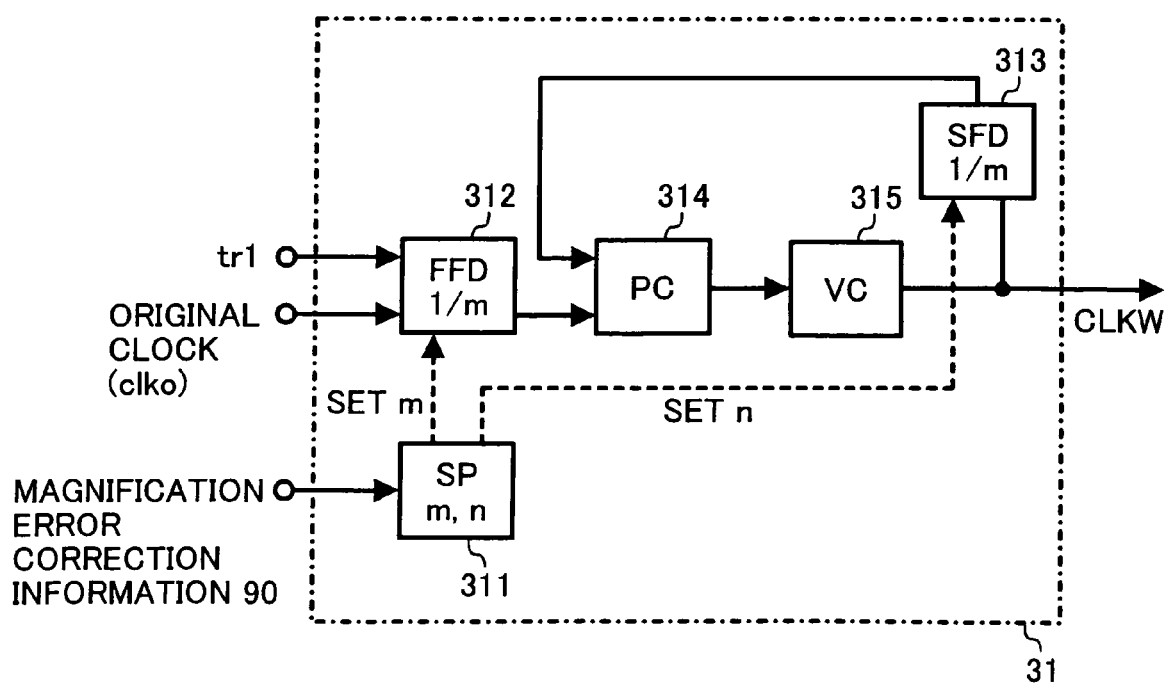
FIG. 7 is a block diagram illustrating a magnification error correction mechanism in a main scanning direction in a first case.

Referring now to FIG. 7, the main-scan magnification error correction mechanism (MMM) 31 in the first case includes a setting part (SP) 311, a first frequency divider (FFD) 312, a second frequency divider (SFD) 313, a phase comparator (PC) 314, and a voltage converter (VC) 315. An arrow input to the setting part (SP) 311 indicates the magnification error correction information 90. An upper arrow input to the first frequency divider (FFD) 312 indicates the scan magnification trigger tr1 and a lower arrow input to the first frequency divider (FFD) 312 indicates an original clock clko. An arrow output from the voltage converter (VC) 315 indicates the writing signal after correction 91, that is CLKW. Reference symbols m and n are set values set at the setting part (SP) 311.

Figure 8:
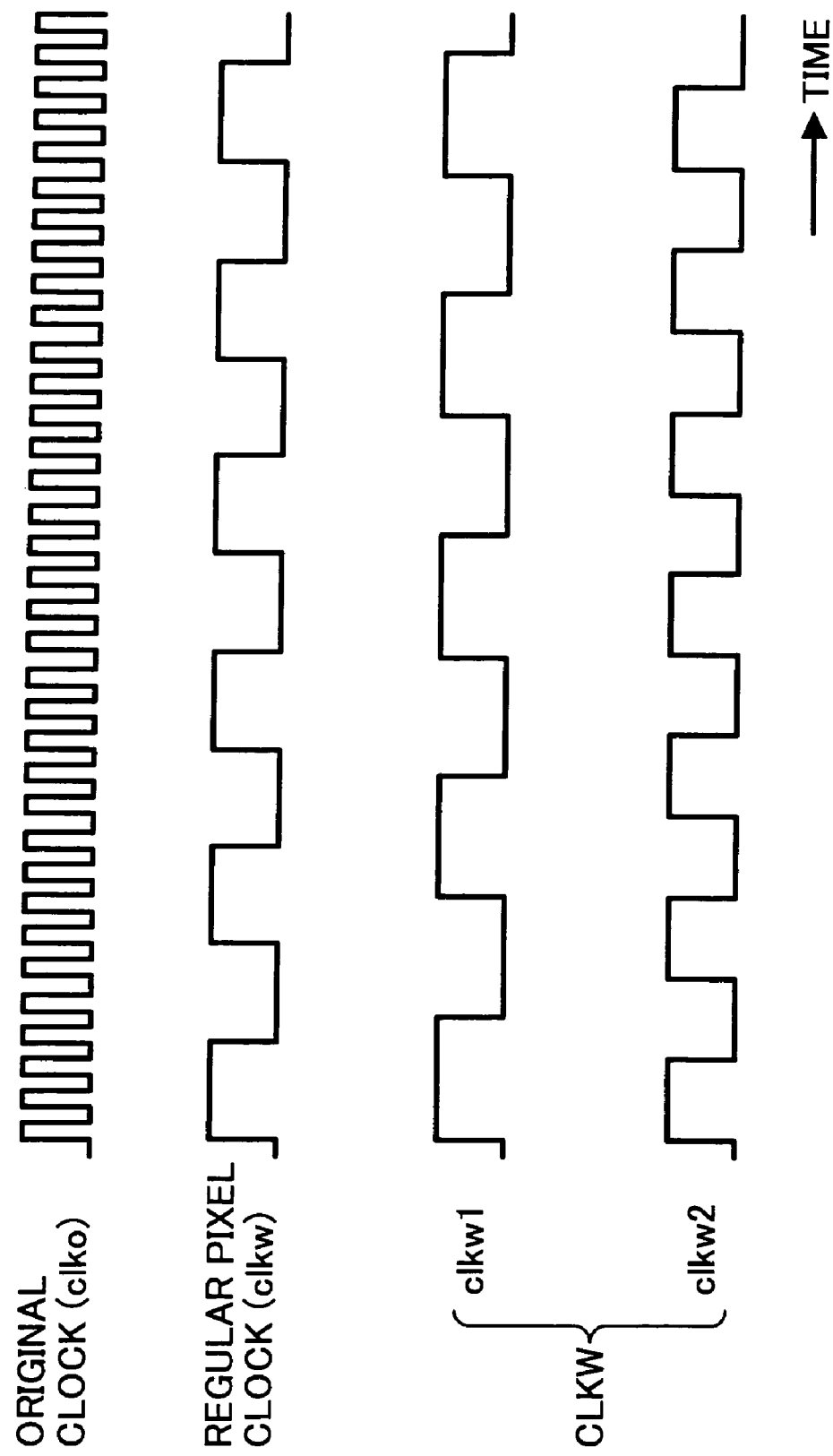
FIG. 8 is a timing chart illustrating pixel clock signals after changing phases.

Referring to FIG. 8, an uppermost line indicates the original clock clko. A second line indicates the regular pixel clock clkw. Third and fourth lines indicate pixel clocks CLKW such as clkw1 and clkw2 after changing phases.

The main-scan magnification error correction mechanism (MMM) 31 in FIG. 2 includes the PLL circuit. As illustrated in FIG. 7, the PLL circuit changes a frequency of the regular pixel clock having a pulse train corresponding to the pixels and for writing the latent image in the main scanning direction based on the information, that is, the magnification error correction amount information 90 having the new value after correction. With the information, the phase of the pixel clock can be corrected by leading or lagging the phase of the pixel clock, in response to the magnification error in the main scanning direction. Accordingly, the magnification error in the main scanning direction can be corrected.

In FIGS. 7 and 8, the magnification error correction information 90 is input to the main-scan magnification error correction mechanism (MMM) 31, in the first case. The magnification error correction information 90 includes certain information by which the setting part (SP) 311 sets the set value m in the first frequency divider (FFD) 312 and the set value n in the second frequency divider (SFD) 313.

The original clock clko having a pulse width smaller than the regular pixel clock clkw is input to the first frequency divider (FFD) 312, so that the first frequency divider (FFD) 312 outputs a clock after dividing the original clock into a frequency with l/m to the phase comparator (PC) 314, based on the setting value. The output of the phase comparator (PC) 314 is input to the voltage converter (VC) 315, and a part of the output is fed back to the phase comparator (PC) 314 through the second frequency divider (SFD) 313. The second frequency divider (SFD) 313 divides the output into a frequency with l/n. From the main-scan magnification error correction mechanism (MMM) 31, based on a changed setting value changed by the setting part (SP) 311 with respect to the magnification error correction information 90, the writing signal after correction 91 having the changed phase, such as the pixel clock CLKW after correction, for example, the pixel clock clkw1 or clkw2, are output. As illustrated in FIG. 8, when comparing the pixel clock clkw1 with the regular pixel clock clkw, if the phase of the pixel clock clkw1 lags, the image after correction tends to shorten. On the other hand, if the phase of the pixel clock clkw2 leads, the image after correction tends to lengthen. Degrees of phases that tend to shorten or to lengthen depend on the setting values set by the setting part (SP) 311, that is, the m and the n.

Figure 9:
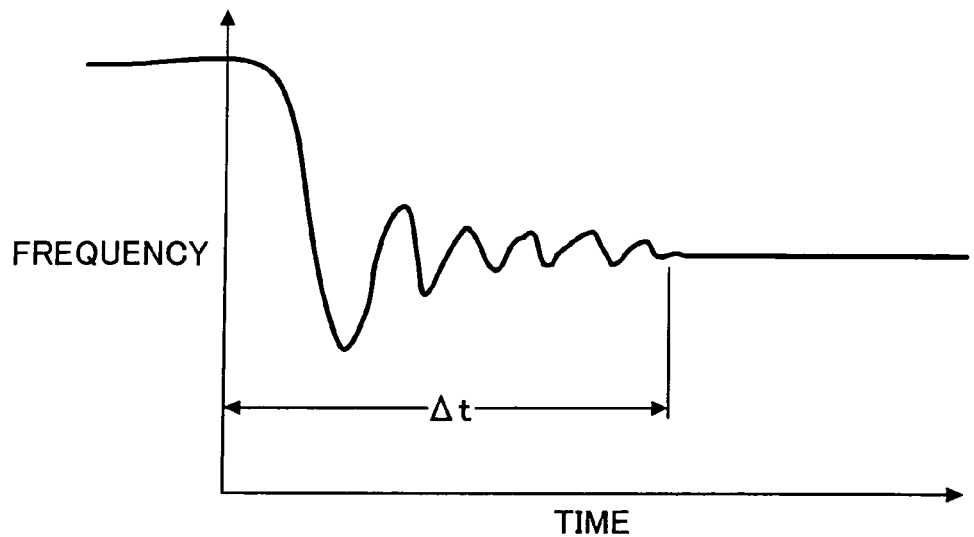
FIG. 9 is a diagram illustrating an output characteristic in a Phase Lock Loop circuit.

Referring now to FIG. 9, a horizontal axis indicates elapsed time and a vertical axis indicates a frequency, in a chart. A heavy line indicates an output value from the main-scan magnification error correction mechanism (MMM) 31. A horizontal line At indicates a time period immediately after switching the set value.

The main-scan magnification error correction mechanism (MMM) 31 including the PLL circuit allows a stable state once the output value becomes stable by a pull-in operation of the frequency. However, as illustrated in FIG. 9, an unstable frequency occurs during a period when the setting value is switched, that is, the period At. On the contrary, there is no such case in the second case that will be described below.

Figure 10:
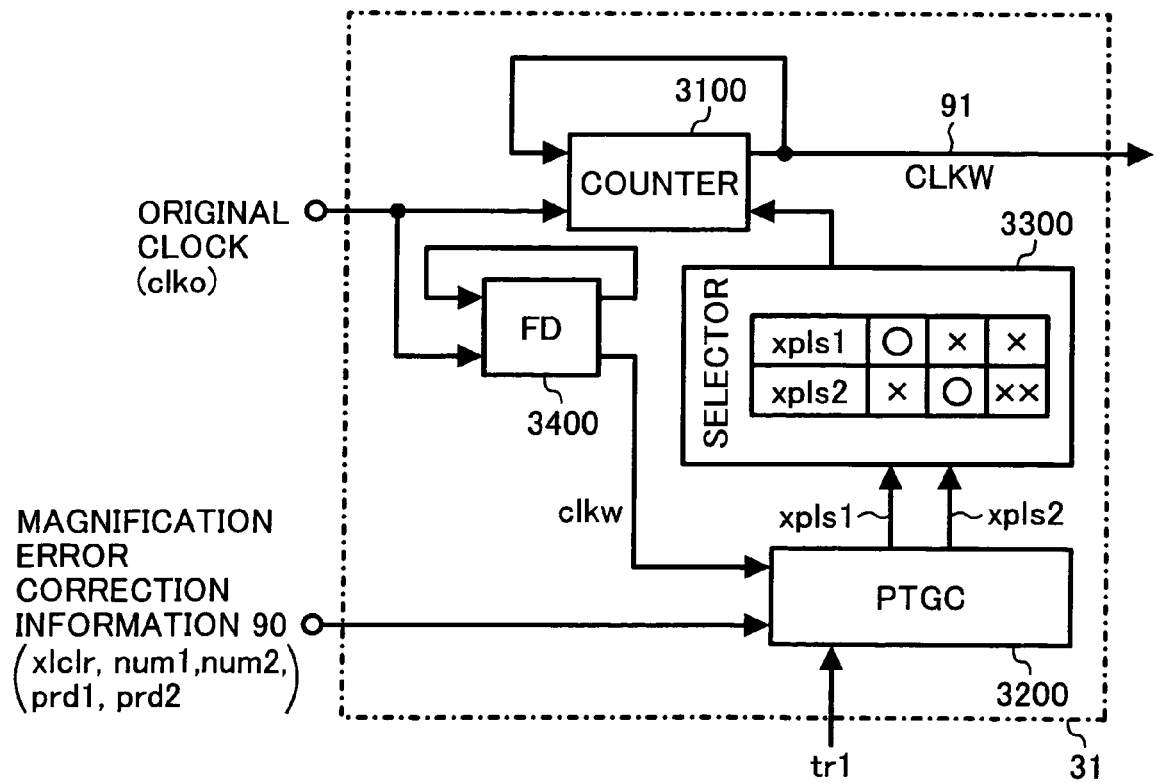
FIG. 10 is a block diagram illustrating a main-scan magnification error correction mechanism in a second case.

Referring to FIG. 10, the second case including the pulse generation circuit is explained. The main-scan magnification error correction mechanism (MMM) 31 in the second case includes a counter 3100, a pulse train generation circuit (PTGC) 3200, a selector 3300, and a frequency divider (FD) 3400. Two arrows, which are input to the counter 3100 and the frequency divider (FD) 3400, indicate the original clock clko. An arrow output from the frequency divider (FD) 3400 and input to the pulse train generation circuit (PTGC) 3200 indicates the regular pixel clock clkw. One of arrows input to the pulse train generation circuit (PTGC) 3200 from left side indicates the magnification error correction amount information 90 such as xlclr, num1, num2, num3, prd1, and prd2. It should be noted that the xlclr indicates is a synchronization output signal from the detection output detp1. An arrow output from the counter 3100 indicates the writing signal after correction 91, that is CLKW. An arrow input to the pulse train generation circuit (PTGC) 3200 from a lower side indicates the scan magnification correction trigger tr1. Two arrows output from the pulse train generation circuit (PTGC) 3200 indicate external command xpls1 and xpls2.

Figure 11:
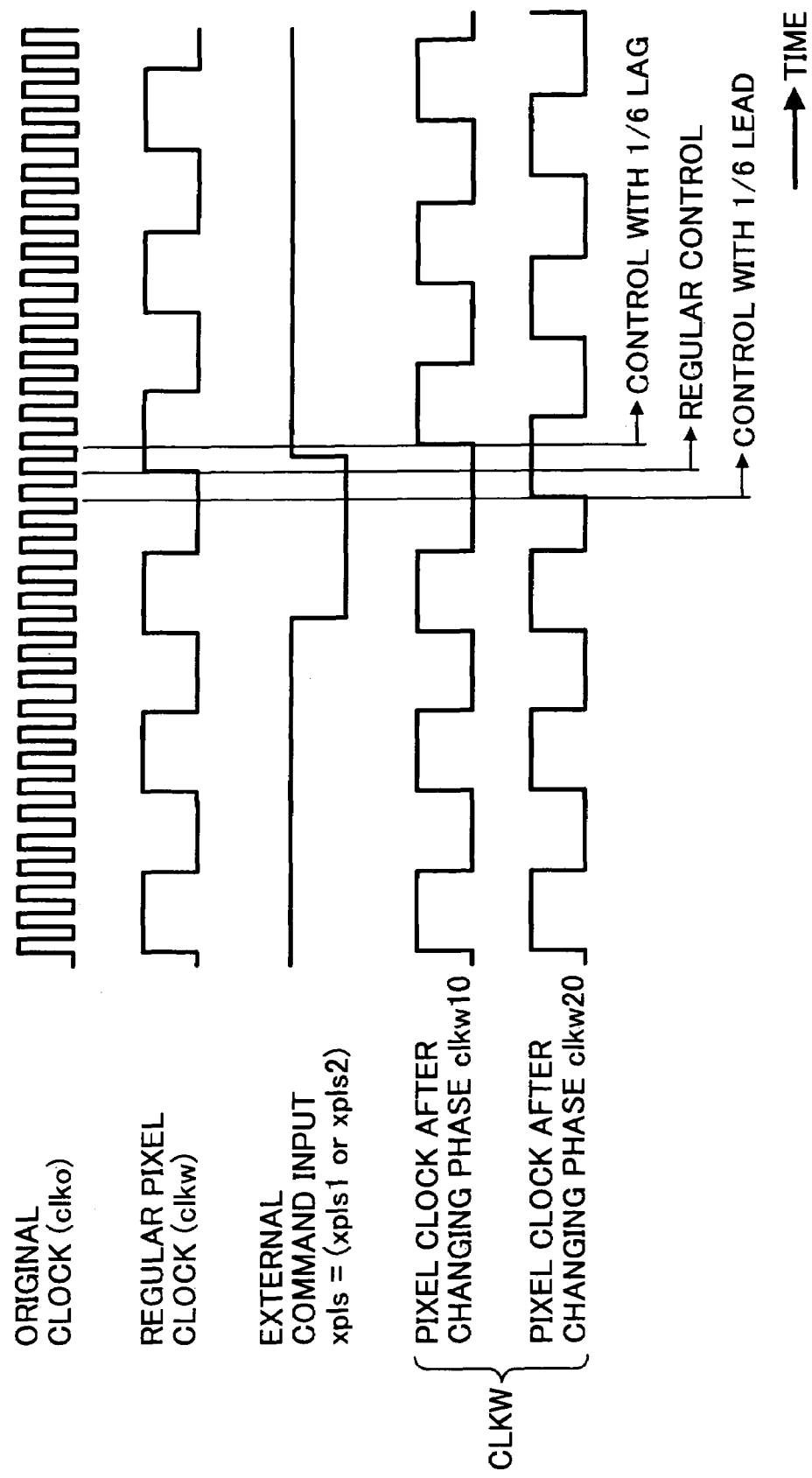
FIG. 11 is a timing chart illustrating pixel clock signals after changing phases.

Referring to FIG. 11, an uppermost line indicates the original clock clko. A second line indicates the regular pixel clock clkw. A third line indicates an external command input xpls such as xpls1 and xpls2. Fourth and fifth lines indicate pixel clocks CLKW after changing phases such as clkw10 and clkw20. Vertical lines orthogonal to the above lines indicate control with a lead and a lag. More particularly, a leftmost vertical line indicates control with a ⅙ lead. A vertical line in the middle indicates regular control. A rightmost line indicates control with a ⅙ lag.

The main-scan magnification error correction mechanism (MMM) 31 in the embodiment illustrated in FIG. 2 generates the regular pixel clock, the frequency of which is an integral multiple of the original clock, illustrated in FIG. 10, and the main-scan magnification error correction mechanism (MMM) 31 shifts the phase of the pixel clock before or after the correction in units of a single pulse of the original clock, so that the magnification correction in the main scanning direction may be performed.

The frequency divider 3100 generates the writing signal after correction 91, that is, the pixel clock CLKW, from the original clock clko. The pulse generation circuit (PTGC) 3200 generates a change indication signal, that is, a pulse (hereinafter, referred to as a "xpls"). The change indication signal determines a position at which a phase change in the pixel clock is executed with respect to the regular pixel clock clkw, and a phase direction, based on the magnification error in the main scanning direction, in other words, determines the magnification error correction amount information 90, which is output the main-scan magnification error correction amount calculation mechanism (MMCM) 30. The selector 3300 selects an appropriate pixel clock for correction from the output by the pulse generation circuit (PTGC) 3200. In the example, the regular clock clkw is obtained by dividing the original clock clko by the frequency divider (FD) 3400 so that the regular pixel clock clkw is input to the pulse generation circuit (PTGC) 3200. According thereto, the PLL circuit requiring quite a little time until a stable state after the phase change is obtained is not necessary. Thus, the pixel clock having a predetermined phase can be immediately obtained on a constant basis.

In FIG. 2, when the scanning light 3B passes through the photo-detector 21B, the detected output detp1 is output and when the scanning light 3B passes through the photo-detector 22B, the detected output detp2 is output. The main-scan magnification error correction amount calculation mechanism (MMCM) 30 calculates the following number of pulses X and Xx, that is, the number of pixels, in a manner described in FIG. 5.

X is the number of pulses, in other words, the number of pixels, included in a distance b, which is a distance between the photo-detectors 21B and 22B, when the distance b is scanned by the scanning light with the regular pixel clock clkw at the time of an actual image forming.

Xx is the number of pulses, that is, the number of pixels, included between the photo-detectors 21B and 22B when the distance between the photo-detectors 21B and 22B is scanned by the scanning light at the time of the actual image forming.

When a single pixel is supposed to be equal to the original clock clko, that is, six pulses, the value num can be obtained by a following equation. The information num is a value that represents a shortened amount or a lengthened amount by the number of pulses of the original clock clko. In the following equation;

$$(Xx-X) \times 6 = num$$

When the above num is equal to zero (num=0), there is no change in the magnification in the main scanning direction. When the num is greater than zero (num>0), a written image in the main scanning direction is shortened compared with the image written by the regular clock. When the num is less than 0 (num<0), the written image in the main scanning direction is lengthened compared with the image written by the regular clock.

When the number of pulses of the regular pixel clock clkw included in the image area in the main scanning direction, that is, the axis direction, of the photoconductor 2B is represented as "a", in a case of "ab", the following equation may be satisfied.

$$a/num \approx prd$$

Here, prd indicates a cycle when the correction is executed by using the external command input, that is, xpls, within the image area. Accordingly, the magnification correction can be achieved by equally dividing within the image area in the main scanning direction so that the number of times of the correction represented by the num is executed with the cycle represented by prd with respect to the regular pixel clock, namely, clkw.

The main-scan magnification error correction amount calculation mechanism (MMCM) 30 in FIG. 2 calculates cases for num1 and prd1 under the condition of "num>0", according to the example described above. In a similar manner, num2 and prd2 are calculated under the condition of "num<0". The main-scan magnification error correction amount calculation mechanism (MMCM) 30 generates the synchronization detection signal, that is, xlclr, from the detection output detp1 to output as the magnification error correction amount information 90 such as num1, num2, prd1, prd2 and the synchronization detection signal xlclr, as illustrated in FIG. 10, to the pulse generation circuit (PTGC) 3200 within the main-scan magnification error correction mechanism (MMM) 31.

Figure 12:
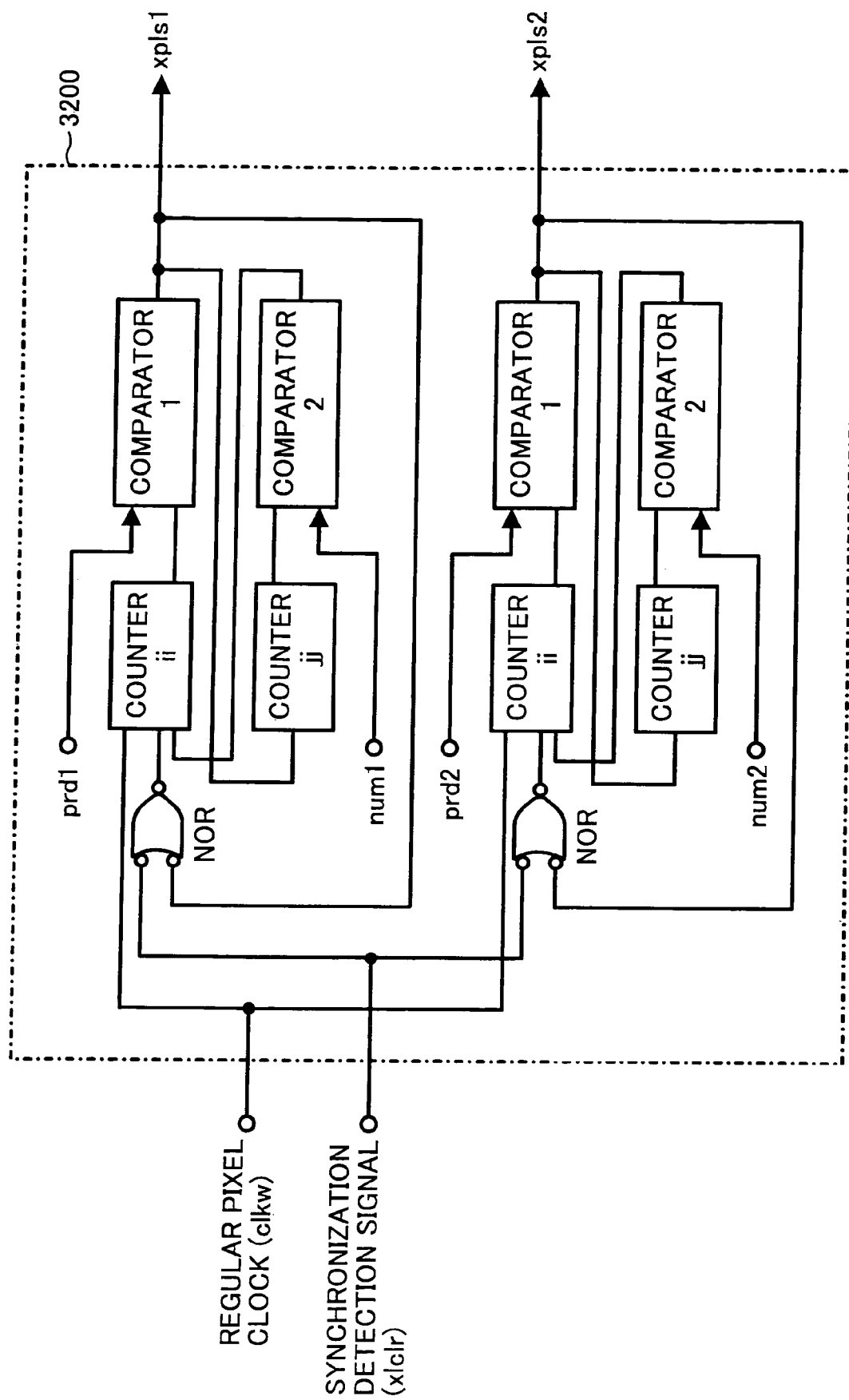
FIG. 12 is a block diagram illustrating a pulse train generation circuit.

Referring now to FIG. 12, the pulse train generation circuit (PTGC) 3200 in FIG. 10 includes a combination of two circuits having a similar circuit configuration. The circuit includes a set of a counter ii, a counter jj, a comparator 1, a comparator 2, and NOR circuit.

The counter ii counts the number of pixel clock to determine a timing for generating the pulse in the cycle, that is, prd. The counter ii counts the number of pulses with respect to each cycle, that is, prd, to execute counting for performing a predetermined times, that is, the num, of corrections. The regular pixel clock, that is, clkw, and the synchronization detection signal, that is, xlclr, are input to these two circuits. Here, prd1 is input to the comparator 1 in one of the two circuits illustrated in an upper part of the pulse generation circuit (PTGC) 3200. Here, prd2 is input to the comparator 1 in one of the two circuits illustrated in a lower part thereof. Here, num1 is input to the comparator 2 in one of the two circuits illustrated in an upper part of the pulse generation circuit (PTGC) 3200 and num2 is input to the comparator 2 in one of the two circuits illustrated in a lower part thereof. After obtaining these inputs, the generation circuit (PTGC) 3200 outputs the external commands, such as xpls1 and xpls2, to the selector. Based on xpls1 and xpls2 thus generated in the pulse generation circuit (PTGC) 3200, operation of the frequency divider 3100 causes the phase of the pixel clock to change.

Hereinafter, these two circuits are identified as the upper circuits and the lower circuit. To the upper circuit, num1 and prd1 are input so that xpls1 is output. On the other hand, to the lower circuit, num2 and prd2 are input so that xpls2 is output.

The selector 3300 includes a selection criterion for the external command inputs illustrated as a matrix, and one of the three combinations is selected in FIG. 10. The three combinations are as follows.

A first input combination: xpls1 (○) and xpls2 (X)
A second input combination: xpls1 (X) and xpls2 (○)
A third input combination: xpls 1 (X) and xpls2 (XX)

The first input combination illustrates a case in which only the external input command xpls1 is selected. The second input combination illustrates a case in which only the external input command xpls2 is selected. The third input combination illustrates a case in which none of the external command inputs is selected.

The selector 3300 outputs selection results to the frequency divider 3100, so that a ratio for dividing the original clock can be changed. For example, if none of the external command inputs, such as xpls1 and xpls2, is selected in the third combination, the selector 3300 outputs the original pixel clock in FIG. 11 as the writing signal after correction 91, that is, clkw.

As a correction image clock in a case when the image tends to lengthen, namely, in a case when the magnification of the writing image increases, only the external command input xpls1 in the first combination is selected to output the pixel clock clkw20 including the pixel click having short pulse width from the frequency divider 3100, so that the magnification can be decreased.

As a correction image clock in a case when the image tends to shorten, namely, in a case when the magnification of the writing image decreases, only the external command input xpls2 in the second combination is selected to output the pixel clock clkw10 illustrated in FIG. 11 from the frequency divider 3100, so that the magnification can be increased.

Thus, when considering in chronological order, with respect to the error, which tends to lengthen or shorten the magnification in the main scanning direction, the corrections corresponding to lengthened or shortened magnification can be achieved by outputting the pixel clock after correction having different pulse widths to the regular pixel clock.

When the external command input xpls1 is once input at a certain timing, the frequency divider 3100 changes a frequency division ratio of the original clock with the timing. Hereby, one pixel clock including a pulse clkw10, which lags by ⅙ in comparison with the regular pixel clock, that is, clkw, is generated in the image area, so that the image can be shortened.

When the external command input xpls2 is input in timing of prd2, the frequency divider 3100 changes a frequency division ratio of the original clock with the timing. Hereby, one pixel clock including a pulse clkw20, which leads by ⅙ in comparison with the regular pixel clock, that is, clkw, is generated in the image area, so that the image can be lengthened.

Figure 13:
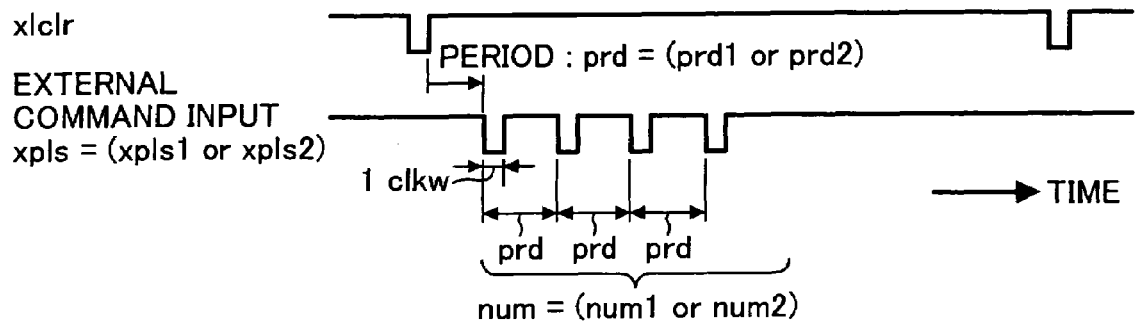
FIG. 13 is a timing chart illustrating a timing for correction and a number of times of corrections in magnification correction control in the main scanning direction.

Referring now to FIG. 13, an upper line indicates the synchronization detection signal xlclr. A lower line indicates the external input command xpls, such as xpls1 or xpls2. The term prd indicates periods such as prd1 or prd2. The term num such as num1 or num2 indicates number of times of the repeated periods that leads or lags.

As illustrated in FIG. 13, a first output from the external command input from by the selector 3300, such as xpls1 or xpls2, is executed after elapsing the cycle prd, such as prd1 or prd2, after the synchronization detection signal xlclr. As illustrated in FIG. 11, the pixel clock CLKW leads or lags by a length equal to one pulse of the original clock clko. After elapsing the cycle prd, such as prd1 or prd2, from this point of time, the pixel clock, that is, CLKW, leads or lags by the length equal to one pulse of the original clock clko, with the external command input xpls, such as xpls1 or xpls2.

The above operation will be explained with reference to FIG. 11. The regular pixel clock clkw counts the original clock clko, to output an "L" which represents an interval of three (3) clko and an "H" which represents a next interval of three (3) clko, so that a certain clock six times greater than the original clock is generated. By changing the L to the interval of Four (4) clko while changing the H to the interval of three (3) clko, clkw10 is generated. By changing the L to the interval of two (2) clko while changing the H to the interval of three (3) clko, clkw20 is generated.

When clkw10 temporarily decreases to a frequency with, for example, approximately 8000 in the entire main scanning direction, the clock is changed to "8000+⅙", so that the frequency decreases in total to lengthen the image.

In a case of clkw20, clkw20 temporarily increases to a frequency with, for example, approximately 8000 clocks in the entire main scanning direction, the clock is changed to "8000−⅙", so that the frequency increases in total to shorten the image. The upper circuit and the lower circuit in FIG. 12 are driven based on an identical flowchart as illustrated in FIG. 14, respectively.

Figure 14:
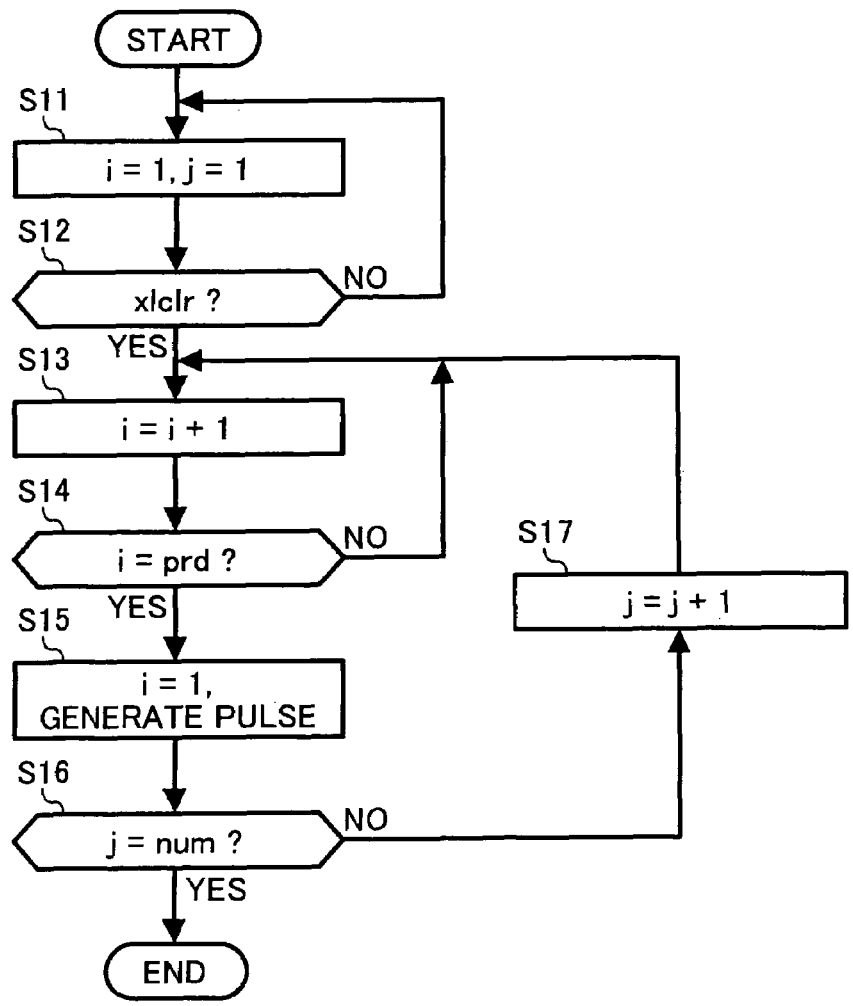
FIG. 14 is a flow chart illustrating a correction procedure in the magnification correction control in the main scanning direction.

Referring to FIG. 14, six steps are taken for the magnification correction control in the main scanning direction.

In FIG. 14, the counter ii and the counter jj equally hold a count value i=1 and j=1. That is Step S11. An input of the synchronization detection signal xlclr, that is Step S12, causes the procedure to proceed to Step S13. When adding 1 to the count value i in the counter, Step S13 proceeds to Step S14. In Step S14, the count value i in the counter ii is checked to see if the count value i becomes prd. It should be noted that, in a case of the upper circuit, the value is prd1, whereas in a case of the lower circuit, the value is prd2.

The procedure returns to Step S13 when the count value i is not prd. When the pixel clock proceeds by one pulse, the procedure proceeds to Step S14 by adding one to the count value i. The procedure returns the count value i to one at Step S15 when the count value i reaches prd, so that the pulse can be generated by an external input, that is xpls. The external command input corresponds to the first external command input xpls in FIG. 13. Thereafter, the procedure checks to see if the count value j of the counter jj reaches the num at step S16. It should be noted that, in the case of the upper circuit, the value is num1, whereas in the case of the lower circuit, the value is num2. When the value does not reach the num, the procedure adds one to the count value j at Step S17 to repeat cycles for returning to Step S13. The procedure terminates when the count value j reaches the num.

Different from the entire image area in the main scanning direction of the photoconductor 2B in FIG. 2 indicated by an arrow, when changing a partial magnification by partially generating the pulse train such as clkw10 or clkw20, first, the main scanning direction is divided into a certain area. Then, the photo-detectors 21B and 22B, the main-scan magnification error correction amount calculation mechanism (MMCM) 30, and the main-scan magnification error correction mechanism (MMM) 31, as illustrated in the example, are provided so that the respective areas are individually controlled. In the above case, the pulse train differs depending on the external command inputs, that is, xpls, at the respective areas.

This example relates to the second set of mechanisms including the main-scan displacement detection mechanism including the photo-detectors 24, 25, 26 and the main-scan displacement correction amount calculation mechanism (MDCM) 40, and the main-scan displacement correction mechanism (MDM) 41, in FIGS. 1 through 4.

Figure 15A:
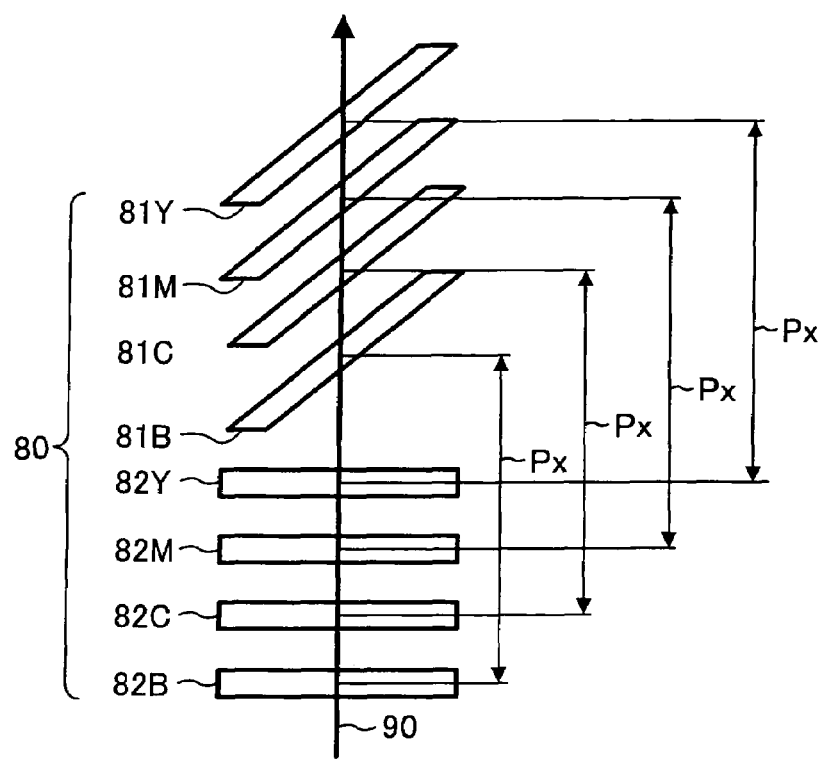
FIG. 15A is a diagram illustrating main-scan displacement error detection patterns.
Figure 15B:
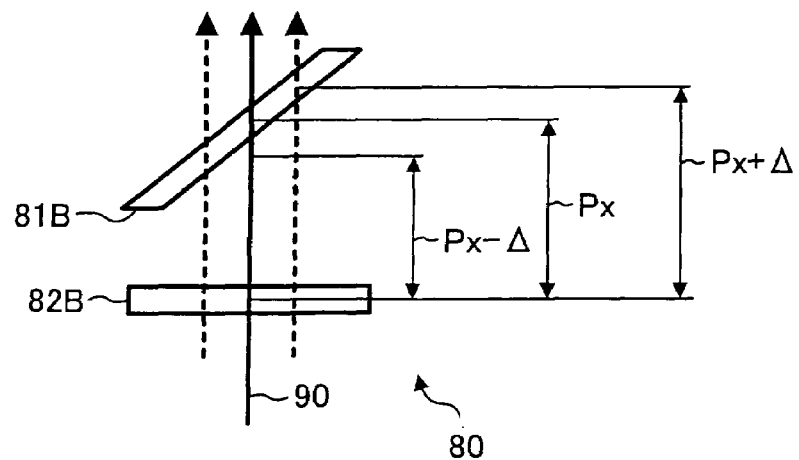
FIG. 15B is a diagram illustrating changes in measured values when an error occurs.

Referring to FIGS. 15A and 15B, the pattern 80 including 81Y through 82B formed on the transfer belt 9 is illustrated. Vertical arrows 90 in FIGS. 15A and 15B facing upward indicate the sub scanning direction. A reference symbol Px indicates a reference distance between two corresponding patterns, such as, between the patterns 81B and 82B. Equations "Px−Δ" and "Px+Δ" indicate respective displacement directions, such as the displacement to the right or to the left.

In the positional displacement error correction in the main scanning direction, as already illustrated in FIG. 4, the pattern 80, more specifically, patterns 81Y, 81M, 81C, 81B, 82Y, 82M, 82C and 82B, are formed on the medium holding the image thereon. It should be noted that the patterns 81Y through 82B, that is, sub-scan displacement error detection patterns illustrated in FIG. 15A, are used for measuring the positional displacement errors in the main scanning direction.

The main-scan displacement error detection patterns 81Y, 81M, 81C, 81B, 82Y, 82M, 82C and 82B are line shaped patterns, which are inclined by 45 degree with respect to a traveling direction of the transfer belt 9, that is, the sub scanning direction, as indicated by an arrow 90. It should be noted that the reference symbols "Y", "M", "C" and "B" indicate yellow, magenta, cyan and black, respectively.

The main-scan displacement error detection patterns 82Y, 82M, 82C and 82B are line-shaped patterns, which are orthogonal to the traveling direction of the transfer belt 9, that is, the sub scanning direction, as indicated by an arrow 90. In addition, the line-shaped patterns are formed parallel to the main scanning direction. It should be noted that the reference symbols "Y", "M", "C" and "B" indicate yellow, magenta, cyan and black, respectively.

A distance between the patterns 81Y and the 82Y, a distance between the patterns 81M and the 82M, a distance between the patterns 81C and the 82C, and a distance between the patterns 81B and the 82B should be a value Px, in other words the respective distances should be equal and constant with each other. However, when measuring the between-sheet interval in a particular time interval by forming the same image patterns, the respective distances vary in an actual measurement. The differences between distances indicate a functional relation with respect to the amount of main-scan displacements.

For example, as illustrated in FIG. 15B, when referring to the patterns 81B and 82B, when a distance from a certain pattern 82B to another pattern 81B written at a certain point of time, in a direction indicated by the arrow 90, increases to Px+Δ in comparison with the reference distance Px from a certain pattern 82B to another pattern 81B written at another different point of time, in a direction indicated by the arrow 90, the image on the photoconductor 2B shifts to left. On the other hand, when the distance decreases to Px−Δ, the image on the photoconductor 2B shifts to right.

As illustrated in FIG. 4, the image patterns are configured to pass through the respective photo-detectors 24, 25 and 26 arranged in the main scanning direction while opposing the transfer belt 9. Then, the image patterns illustrated in FIG. 15A are formed. Next, the photo-detectors 24, 25 and 26 detect the main-scan displacement error detection patterns such as 81Y, 81M, 81C, 81B, 82Y, 82M, 82C and 82B which are formed in advance. Based on detection information from the photo-detectors 24, 25 and 26, the main-scan displacement correction amount calculation mechanism (MDCM) 40 calculates the positional displacement errors in the main scanning direction, that is, the color displacement error.

Thus, based on the displacement error detection patterns passing through the photo-detectors, the positional displacement errors in the main scanning direction are detected, so that the degree of the positional displacements, the correction amount, and the number of times of correction executed separately in the between-sheet interval.

Based on positional displacement data in the main scanning direction of respective colors obtained by the main-scan displacement correction amount calculation mechanism (MDCM) 40, the main-scan displacement correction mechanism (MDM) 41 leads or lags an image writing start point in the main scanning direction, in respective colors, with respect to generation timing of the reference, that is, the synchronization detection signal xlclr, so that the positional displacement errors in the main scanning direction can be corrected. It should be noted that the image writing start point in the main scanning direction is a writing start point of the main-scan area signal LGATE, which will be explained later.

Since the main-scan image area signal LGATE adjusts the writing start point in the main scanning direction based on the reference with respect to each photoconductor 2Y, 2M, 2C and 2B, the positional displacements, that is, the color displacements, of the superposed image in the main scanning direction can be improved. In addition, since the correction is executed by changing the writing start point of the main-scan image area signal, stepwise corrections dispersed in a plurality of particular intervals between sheets are also possible.

Figure 16:
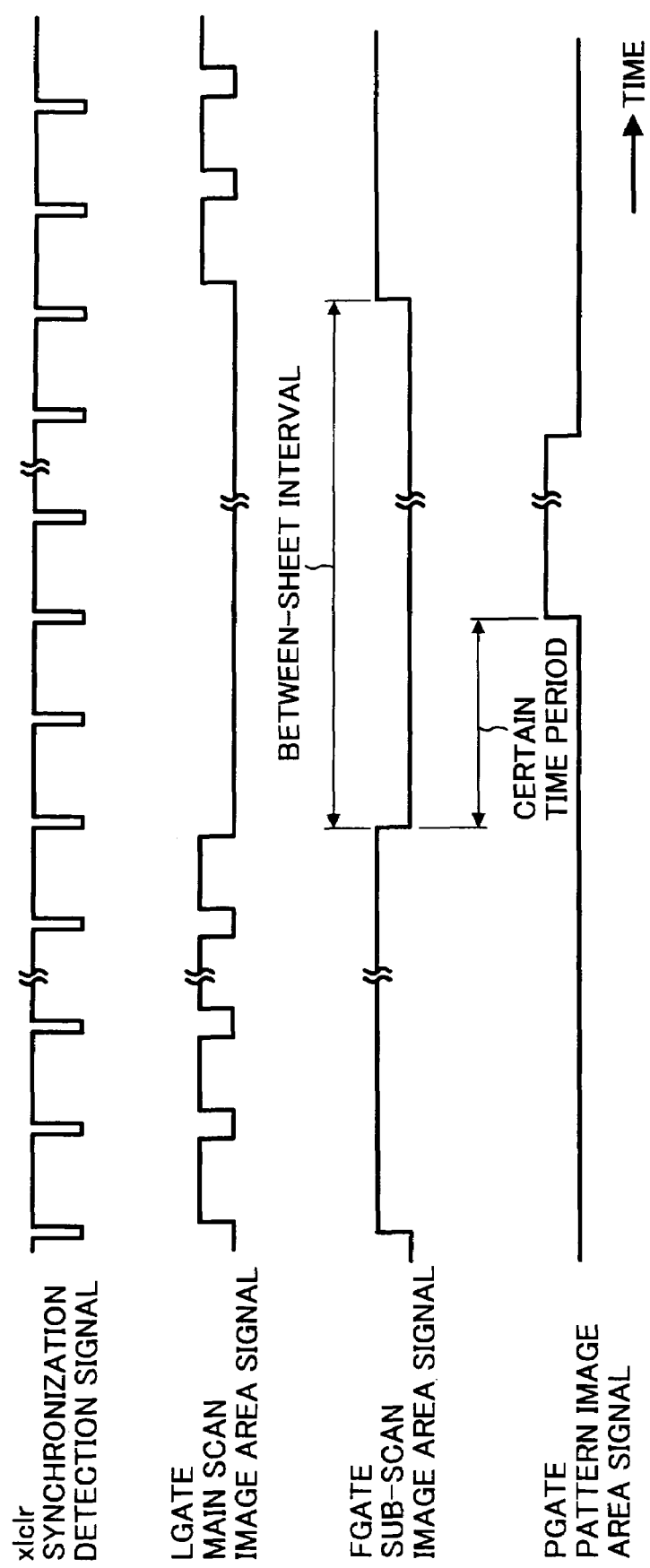
FIG. 16 is a timing chart illustrating a variety of signals for correcting positional displacement errors.

Referring to FIG. 16, an uppermost line indicates the synchronization detection signal xlclr, a second lime indicates the main-scan image area signal, that is, LGATE. A third line indicates the sub-scan image area signal, that is, FGATE. A long horizontal line with two arrows on both sides above the third line indicates the between-sheet interval, or a time period for the between-sheet interval. A lowermost line indicates the pattern image area signal, that is, PGATE. A short horizontal line with two arrows on both sides above the lowermost line indicates a certain time period.

In FIGS. 2 and 16, the positional displacement errors, that is, the correction amount, calculated by the main-scan displacement correction amount calculation mechanism (MDCM) 40 is output to the main-scan displacement correction mechanism (MDM) 41. The main-scan displacement correction mechanism (MDM) 41 is a part of an image area signal generation circuit 65 outputting the image area signal. The main-scan displacement correction mechanism (MDM)

41 changes the writing start point in every single main scanning line by the pixel clock for writing the latent image, based on the input.

In FIG. 16, since the writing start point in the every single main scanning line by the pixel clock for writing the latent image is synchronized with the synchronization detection signal, that is, xlclr, a time period between a rising point of time of the main-scan image area signal and a rising point of time of the synchronization detection signal is changed. Thus, the positional displacement errors in the main scanning direction can be corrected by changing the writing start point in every single main scanning line by the main-scan image area signal, that is, LAGTE. The above described series of procedures for changing the writing start point in the ever single main scanning line is executed in the between-sheet interval.

This example relates to the third set of mechanisms, in other words, the sub-scan displacement detection mechanism and the sub-scan displacement correction mechanism (SDM) 51. The sub-scan displacement detection mechanism includes the photo conductors 24, 25, 26 and the sub-scan displacement correction amount calculation mechanism (SDCM) 50.

The photo-detectors 24, 25 and 26 are shared as the sub-scan displacement detection mechanism, in this example. The photo-detectors 24, 25 and 26 detect the sub-scan displacement error detection patterns formed in advance.

Figure 17A:
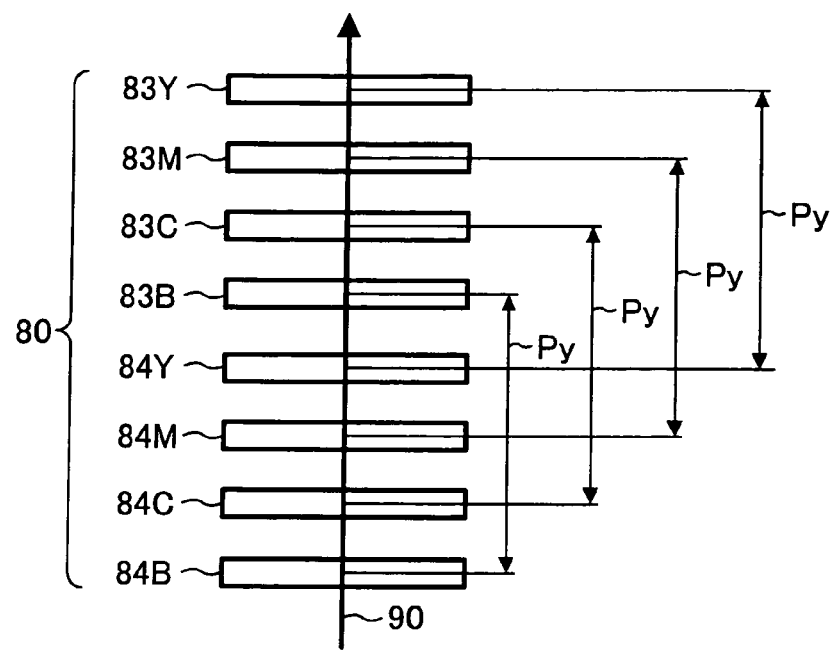
FIG. 17A is a diagram illustrating sub-scan displacement error detection patterns.
Figure 17B:
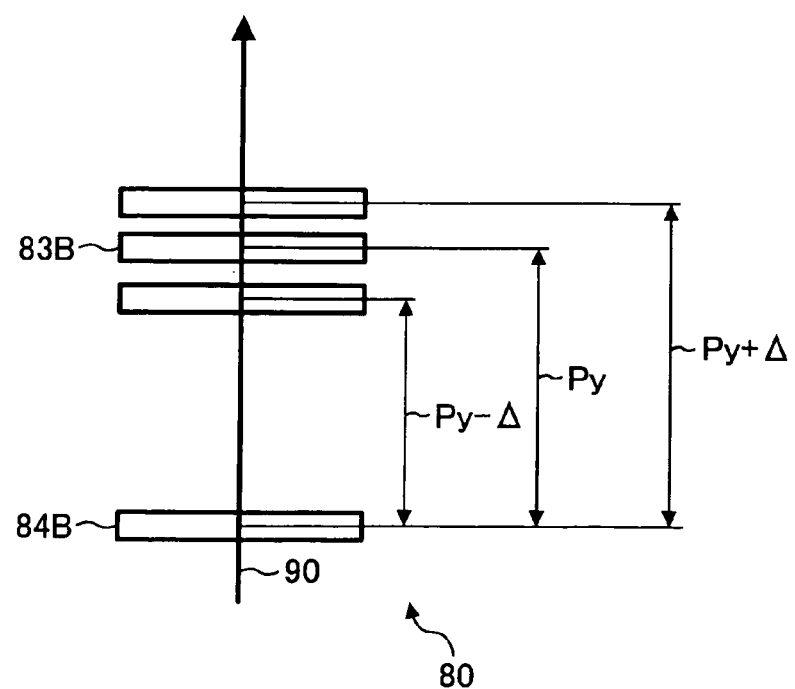
FIG. 17B is a diagram illustrating changes in measured values when an error occurs.

Referring to FIGS. 17A and 17B, the pattern 80 including 83Y through 84B formed on the transfer belt 9 is illustrated. Vertical arrows 90 in FIGS. 17A and 17B facing upward indicate the sub scanning direction. A reference symbol Py indicates a reference distance between two corresponding patterns such as between the patterns 83B and 84B. Equations "Py−Δ" and "Py+Δ" indicate respective displacement directions, such as upward displacement or downward displacement.

When correcting the positional displacement errors in the sub scanning direction, as already illustrated in FIG. 4, the pattern 80 is formed. More particularly, as illustrated in FIG. 17A, sub-scan displacement error detection patterns 83Y, 83M, 83C, 83B, 84Y, 84M, 84C and 84B are formed on the transfer belt 9 as the medium holding the patterns thereon.

The sub-scan displacement error detection patterns 83Y, 83M, 83C, and 83B and the sub-scan displacement error detection patterns 84Y, 84M, 84C, and 84B are line-shaped patterns. These patterns are orthogonal to the traveling direction of the transfer belt 9, that is, the sub scanning direction, as indicated by the arrow 90. It should be noted that the reference symbols "Y", "M", "C" and "B" indicate yellow, magenta, cyan and black, respectively.

A distance between the patterns 83Y and 84Y, a distance between the patterns 83M and 84M, a distance between the patterns 83C and 84C, and a distance between the patterns 83B and 84B should be a value Py, in other words the respective distances should be equal and constant with each other. However, when measuring the between-sheet interval at a regular time interval by forming the same image patterns, the respective distances vary with each other in the actual case. The differences between distances represent a functional relation with respect to the amount of the main-scan displacements.

For example, as illustrated in FIG. 17B, when referring to the patterns 83B and 84B, a distance from a certain pattern 84B to a certain pattern 83B written at a certain point of time, in a direction indicated by the arrow 90, increases to Py+Δ in comparison with the reference distance Py from another pattern 84B to another pattern 83B written at another point of time, in a direction indicated by the arrow 90. This indicates the image on the photoconductor 2B shifts to an upper side, that is, a downstream side of the arrow 90. On the other hand, when the distance decreases to Py−Δ, the image on the photoconductor 2B shifts to a lower side, that is, an upstream side of the arrow 90.

As illustrated in FIGS. 17A and 17B, the image patterns are formed so that the image patterns pass through the respective photo-detectors 24, 25 and 26 arranged in the sub scanning direction and opposing the transfer belt 9. The photo-detectors 24, 25 and 26 detect the main-scan displacement error detection patterns 83Y, 83M, 83C, 83B, 84Y, 84M, 84C and 84B which are formed in advance. Based on detection information by the photo-detectors 24, 25 and 26, the sub-scan displacement correction amount calculation mechanism (SDCM) 50 calculates the positional displacement error information in the sub scanning direction such as Py+Δ or Py−Δ, which are the displacement of the patterns.

Thus, based on the displacement error detection patterns passing the photo-detectors, the positional displacement errors in the sub scanning direction are detected, so that the degree of the positional displacements, the correction amount, and the number of times of correction executed in the between-sheet interval can be separately calculated.

The sub-scan displacement correction amount calculation mechanism (SDCM) 50 outputs the positional displacement information in the sub scanning direction to the sub-scan displacement correction mechanism (SDM) 51, in FIG. 2. It should be noted that the positional displacement information in the sub scanning direction is represented by Py+Δ or Py−Δ, which is the displacement of the pattern.

The sub-scan displacement correction mechanism (SDM) 51 is the part of the image area signal generation circuit 65. The sub-scan displacement correction mechanism (SDM) 51 receives the positional displacement information to change the writing start point in every single sheet by the pixel clock for writing the latent image, as illustrated in FIG. 16, so that the sub-scan image area signal, that is, FGATE, is output.

Thus, the positional displacement errors in the sub scanning direction can be corrected by changing the writing start point in the every single sheet by the sub-scan image area signal. In addition, the between-sheet interval is set based on the generation timing of the sub-scan image area signal.

As described above, the image area signal generation circuit 65 outputs the main-scan image area signal LGATE and the sub-scan image area signal FGATE. The image area signal generation circuit 65 also outputs the pattern image area signal, that is, PGATE. The pattern image area signal is used for forming the main-scan displacement error detection patterns and sub-scan displacement error detection patterns. Thus, the image area signal generation circuit 65 is capable of outputting the correction signals associated with correction with respect to the positional displacements, such as the positional displacements in the main scanning direction and in the sub scanning direction, and the pattern image area signal.

Specific examples of the pattern 80 are described in FIGS. 15, 17A and 17B. Although only a pair of line patterns, namely, the main-scan displacement error detection patterns, are described with respect to each color, a plurality of line patterns are formed for averaging in the actual case, so that a central value of the displacement can be obtained and variation with respect to each color is suppressed by an averaged correction. When executing the averaging, the plural line patterns are required. However, generating multiple line patterns in the limited interval is difficult. To solve the above problem, the correction with high accuracy is achieved by employing the following procedures. Namely, first, the line patterns sufficient for filling the predetermined between-sheet interval are generated. Then, the line patterns are further sequentially generated in the next between-sheet interval, which follows the preceding between-sheet interval. As a result, the plurality of line patterns, that is, the multiple line patterns, can be generated. Thus, the correction with high accuracy can be achieved by averaging the detected data.

Figure 18:
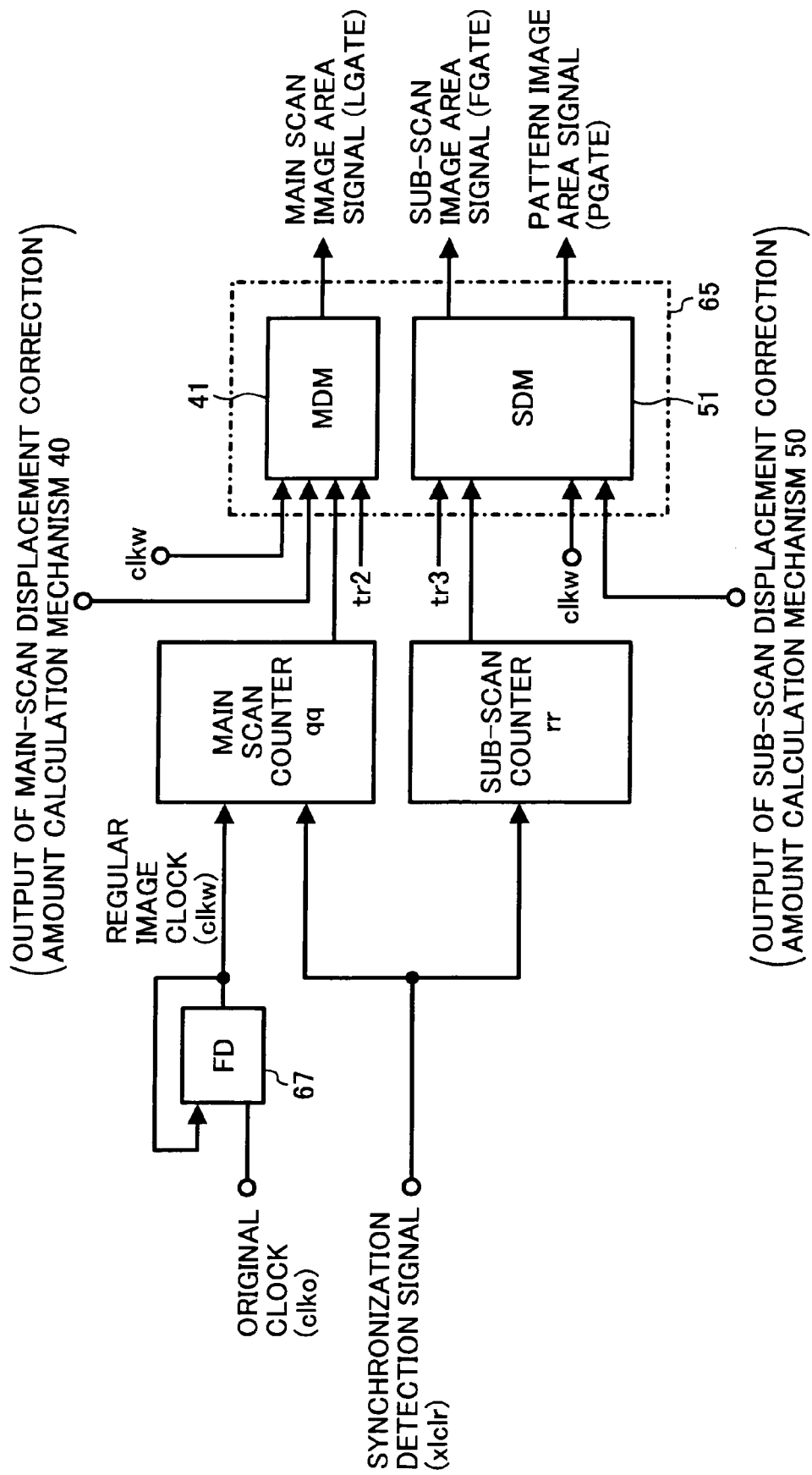
FIG. 18 is a block diagram illustrating contents for generating a variety of signals used for correcting positional displacement errors.

Referring now to FIG. 18, a mechanism and the variety of signals used for correcting the positional displacement errors include a frequency divider (FD) 67, a main-scan counter qq, a sub-scan counter rr, and the image area signal generation circuit 65 including the above described the main-scan displacement correction mechanism (MDM) 41 and the sub-scan displacement correction mechanism (SDM) 51. To the main-scan displacement correction mechanism (MDM) 41, clkw and tr2 are input in addition to an output from the main-scan displacement correction amount calculation mechanism (MDCM) 40. The main-scan displacement correction mechanism (MDM) 41 outputs LGATE. To the sub-scan displacement correction mechanism (SDM) 51, clkw and tr3 are input in addition to an output from the sub-scan displacement correction amount calculation mechanism (SDCM) 50.

In FIG. 18, the original clock clko is divided by the frequency divider (FD) 67, so that the original clock clko is converted into the regular pixel clock clkw and is output to the main-scan counter qq. In addition, the synchronization detection signal xlclr input from the photo-detector 21B is output to the main-scan counter qq and the sub-scan counter rr.

Figure 19:
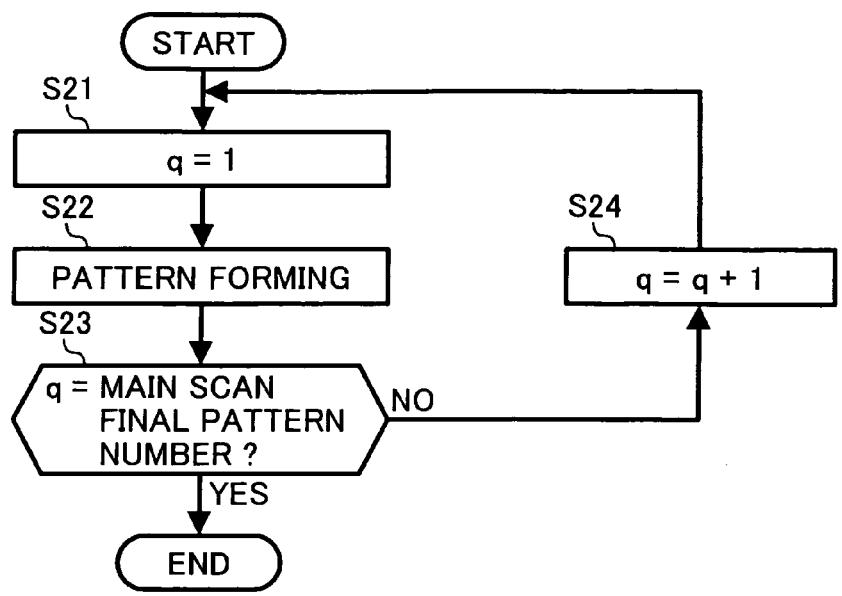
FIG. 19 is a flowchart illustrating a procedure for forming main-scan displacement error detection patterns.

Referring to FIG. 19, four steps from Step S21 to Step S24 are taken for forming the displacement error detection patterns. The procedure for generating the main-scan displacement error detection patterns illustrated in FIG. 19 is as follows.

The procedure sets a counter value q of the main-scan counter qq to 1 in Step S21 after receiving the synchronization detection signal xlclr. The sub-scan displacement correction mechanism (SDM) 51 outputs the pattern image area signal, that is, PGATE, in Step S22, so that the patterns 80 in FIG. 15A are formed in the between-sheet interval, with respect to each color, on respective photoconductors 2Y, 2M, 2C and 2B.

Unless the count value is equal to the number of final patterns at Step S23, the procedure adds 1 to the count value q at Step S24 and returns to Step S21. When the count value is equal to the same as the number of final patterns thus set, the procedure terminates forming the patterns.

Figure 20:
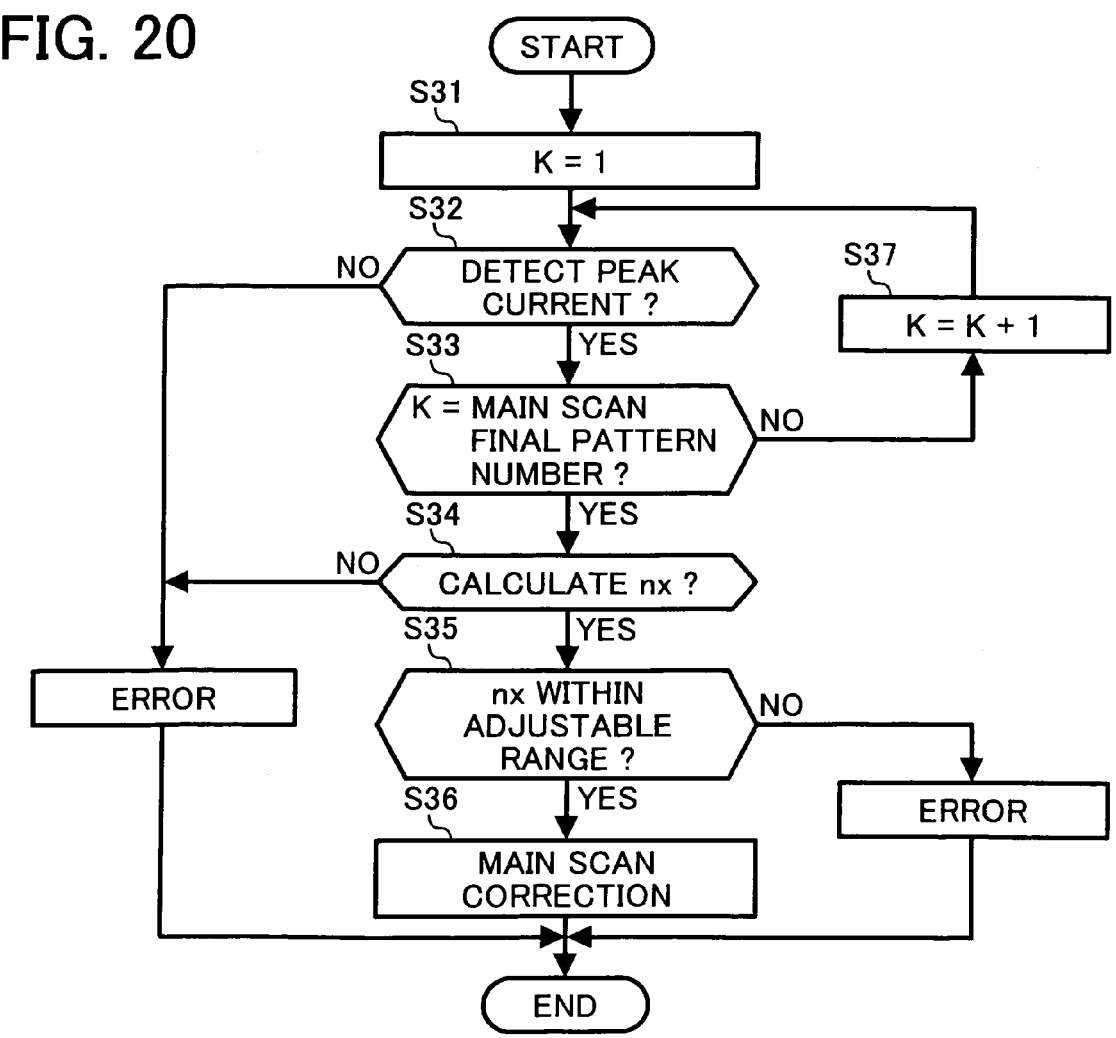
FIG. 20 is a diagram illustrating a procedure for detecting a magnification error in the main scanning direction.

Referring now to FIG. 20, six steps from Step S31 to Step S36 are taken for detecting and correction the positional displacement errors in the main scanning direction.

The procedure resets a setting value k for the counter, which counts the number of line patterns, to 1 at Step S31. Then, the procedure detects peaks of detection currents by the photo-detectors 24, 25 and 26 at Step S32 to detect the number of line patterns and the distance Px between the patterns. The procedure determined whether or not detection reaches up to the final pattern at Step S33. Unless the final pattern image is detected, the procedure adds 1 to the setting value k at Step S37 to return to Step S32. When the detection reaches the final pattern, the procedure proceeds to Step S34 to calculate an average value nx. Here, nx is an average value obtained from the respective distances Px thus detected.

The procedure proceeds to Step S35 to determine whether or not the average value nx is in an adjustable range, in other words whether or not the average value nx is within a range in which the image is not affected by a change in the writing start position. When satisfying the adjustable range, the procedure proceeds to Step S36 to change the writing start position, by using the main-scan image area signal, that is, LGATE, so that the positional displacements in the main scanning direction can be corrected.

Figure 21:
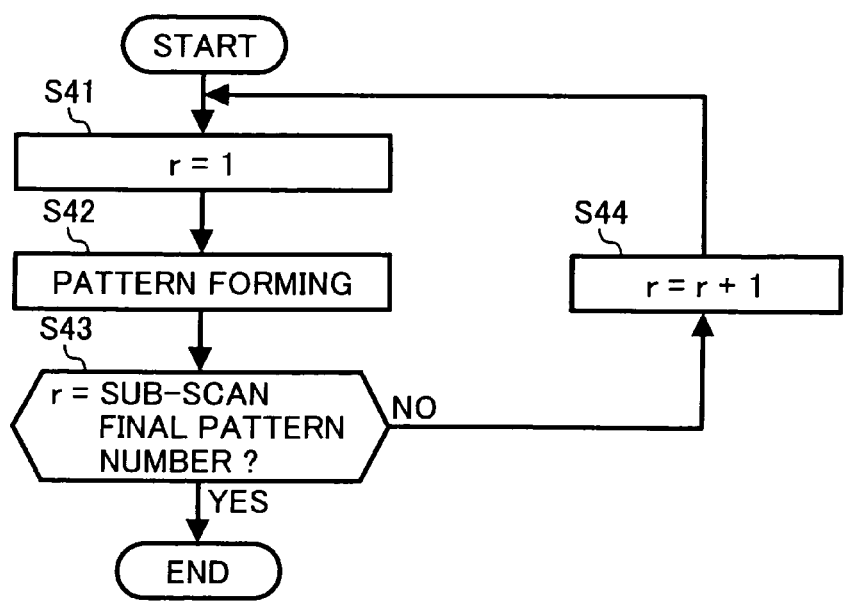
FIG. 21 is a flowchart illustrating a procedure for forming sub-scan displacement error detection patterns.

Referring to FIG. 21, four steps from Step S41 to Step S44 are taken for forming the sub-scan displacement error detection patterns. A procedure for forming the sub-scan displacement error detection patterns is as follows.

Upon receiving the synchronization detection signal, that is, xlclr, the procedure resets a counter value r in the sub-scan counter rr to 1 at Step S41. The sub-scan displacement correction mechanism (SDM) 51 outputs the pattern image area signal, that is, PGATE, at Step S42, so that the patterns illustrated in FIG. 17A can be formed in the between-sheet interval on the respective photoconductors 2Y, 2M, 2C and 2B, with respect to each color.

Unless the count value is equal to the number of the final patterns at Step S43, the procedure adds 1 to the count value r at Step S44 to return to Step S41. When the count number is equal to the same as number of final patterns thus set, the procedure terminates forming the patterns.

Figure 22:
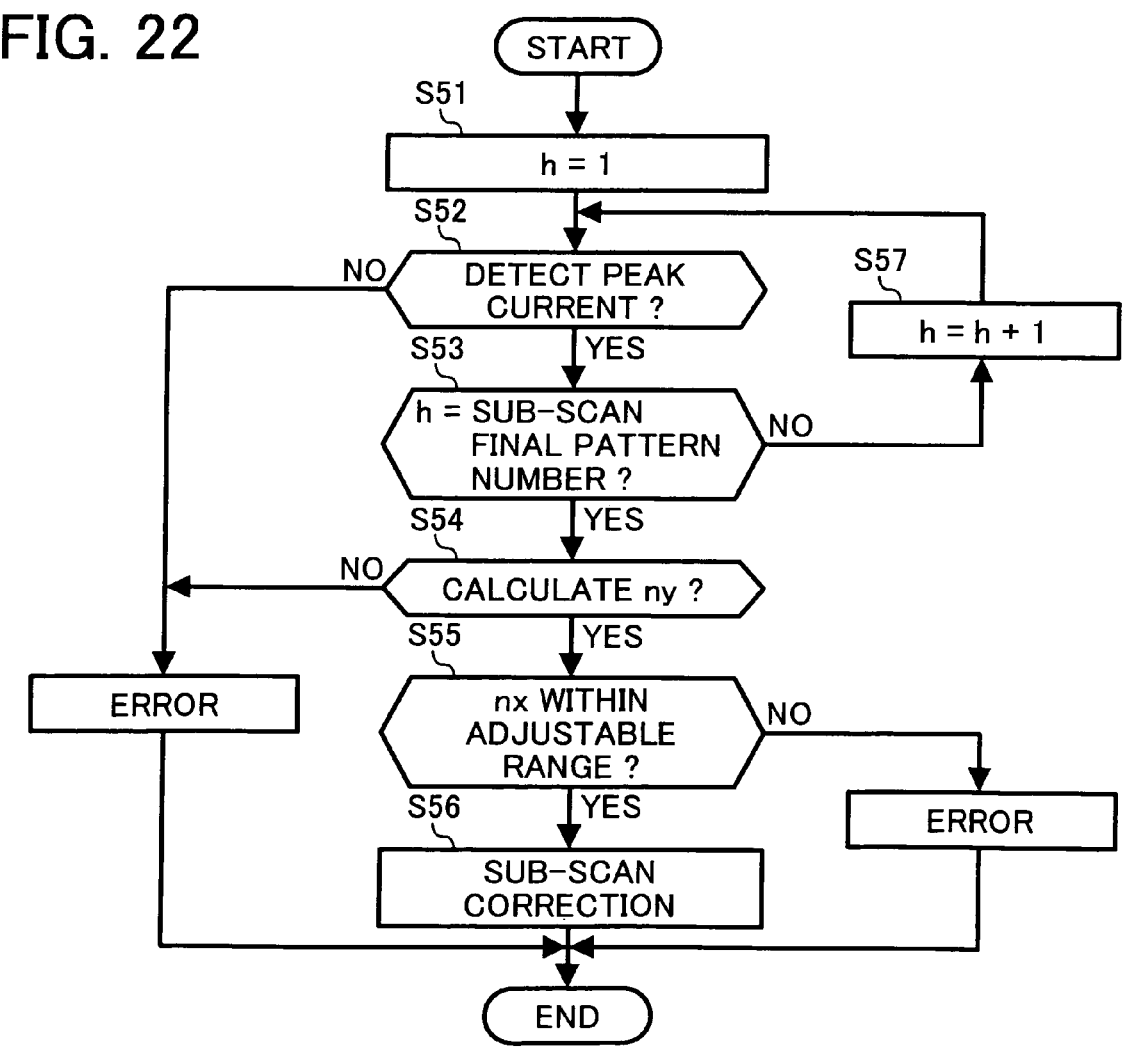
FIG. 22 is a diagram illustrating a procedure for detecting positional displacement errors in the sub scanning direction.

Referring now to FIG. 22, seven steps from Step S51 to Step S57 are taken for detecting and correcting the positional displacement errors in the sub scanning direction.

The procedure resets a setting value h of the counter, which counts the number of line patterns, to 1 at Step S51. The procedure detects the peaks of the detection currents by the photo-detector 24, 25 and 26 at Step S52 to detect the number of the line patterns and the distances Py between the patterns. The procedure determines whether or not the detection reaches the final pattern at Step S53. Unless the detection reaches up to final pattern, the procedure adds 1 to the h at Step S57 to return to Step S52. When the detection reaches up to the final pattern, the procedure proceeds to Step S54 to calculate an average value ny. Here, the value ny is an average value of the respective distances thus detected.

Next, the procedure proceeds to Step S55 to determine whether or not the average value ny is in an adjustable range, in other words whether or not the average value ny is within a range in which the image is not affected by the change in the writing start position. When satisfying the adjustable range, the procedure proceeds to Step S56 to change the writing start position, by the sub-scan image area signal, that is, FGATE, so that the positional displacements in the sub scanning direction can be corrected.

Thus, the positional displacement error correction in the sub scanning direction is executed as follows. Namely, the displacement error detection patterns are formed on the transfer belt 9. Then, based on the positional displacement data obtained by reading the displacement error detection patterns by using the photo-detectors, the generation timing of the sub-scan image area signal is led or lagged with respect to the writing start point as a reference. It should be noted that the transfer belt 9 is the medium holding the patterns thereon.

Since the writing start point in the sub scanning direction is adjusted based on the reference with respect to each photoconductors, the positional displacements, that is, the color displacements, of the superposed images in the sub scanning direction can be improved. In addition, since the correction is executed by changing the generation timing of the sub-scan image area signal, the stepwise corrections dispersed in certain intervals between sheets may be possible. If comparing a color adjustment, which is the correction for eliminating the color displacement, with the magnification corrections in the main scanning direction, the color adjustment takes a longer processing time. However, since the image correction without the downtime can be achieved by executing the series of corrections in the plurality of between-sheet intervals, the image quality can be improved. It should be noted that the term "downtime" means reduction in performance based on the image output time.

Hereinafter, relations between respective sets of correction mechanisms will be described.

In FIGS. 2, 16A and 16B, the image area signal generation circuit 65 starts generating the pattern image area signal, that is, PGATE, while synchronizing the pattern image area signal with a sub-scan position of the sub-scan image area signal, namely FGATE, immediately therebefore. Here, a term "synchronizing" indicates a predetermined time interval so as to obtain the same amount of the displacements. In other words, the pattern is written, after a certain time interval, from a termination of the sub-scan area signal.

When checking on the color displacements between respective colors during image formation, by keeping the position at which the patterns are initiated constant from the termination of the images, the amount of the displacements with respect to each color and the amount of the displacements in color displacement detection patterns on the image is confirmed to one another to correct.

The displacement error detection patterns are formed in the between-sheet interval, with respect to each given time interval after completion of the sub-scan image area signal corresponding to the single sheets. Since a consistent relation between the images and the displacement error detection patterns can be kept, an appropriate correction with high fidelity to the image can be achieved.

When the writing of the displacement error detection patterns occurs simultaneously with the magnification error detection in the main scanning direction, the writing of the displacement error detection patterns has a priority.

For example, when the writing of the main-scan displacement error detection patterns or the sub-scan displacement error detection occurs simultaneously with the magnification error detection in the main scanning direction, the writing of the main-scan displacement error detection patterns or the sub-scan displacement error detection patterns is preferentially executed. Hereby, variable factors can be eliminated, so that detection of the amount of the displacements with high accuracy can be achieved. It should be noted that the variable factors include a sudden magnification variation during the positional displacement correction in the main scanning direction or the sub scanning direction.

As for the priority for controlling the respective sets, such as the first, the second and the third sets of mechanisms, the first set of mechanisms has the priority over the second and the third sets of mechanisms. The first set of mechanisms indicates the main-scan magnification error detection mechanism and the main-scan magnification error correction mechanism (MMM) 31. The second set of mechanisms indicates the main-scan displacement detection mechanism and the main-scan displacement correction mechanism (MDM) 41. The third set of mechanisms indicates the sub-scan displacement detection mechanism and the sub-scan displacement correction mechanism (SDM) 51.

Since the positional displacement correction, that is, the color displacement correction, generated during typical image forming can be treated with the first set of detection mechanisms and the correction mechanism capable of processing in a short time, the first set of detection mechanisms and the correction mechanism are used until a limit of the positional displacement correction, that is, the color displacement correction, capable of correcting with the first set of detection mechanisms and the correction mechanism. Accordingly, correction with a shorter time period can be achieved.

The second set of detection mechanisms and the third set of detection mechanisms separately execute the positional displacement error detection and the positional displacement error correction. That is to say, the second set of detection mechanisms executes the positional displacement error detection in the main scanning direction by using the main-scan displacement detection mechanism and the positional displacement error correction in the main scanning direction by using the main-scan displacement correction mechanism (MDM) 41. Whereas, the third set of detection mechanisms executes the positional displacement error detection in the sub scanning direction by using the sub-scan displacement detection mechanism and the positional displacement error correction in the main scanning direction by using the sub-scan displacement correction mechanism 41.

Since an amount of the main-scan displacements and an amount of sub-scan displacements are separately measured and corrected, the positional displacements in the main scanning direction can be improved by executing the magnification correction in the main scanning direction in an interval between the above two types of corrections. This method causes reduction of the correction amount with respect to the positional displacement correction in the main scanning direction executed thereafter. Accordingly, the correction without significant variation can be continued.

Moreover, in a job when the number of sheets sequentially fed is small, the number of the intervals between sheets is also small. For this reason, there is a case in which the amount of main-scan displacements and the amount of sub-scan displacements cannot be measured and corrected. However, in the case described above, more accurate correction is capable of being achieved by preferentially executing a certain correction other than the correction executed in the preceding job.

After executing the positional displacement error detection in the sub scanning direction by the sub-scan displacement detection mechanism and the positional displacement error correction in the sub scanning direction by the sub-scan displacement correction mechanism (SDM) 51, both of which are included in the third set of mechanisms, the second set of mechanisms including the main-scan displacement detection mechanism and the main-scan displacement correction mechanism (MDM) 41 executes the positional displacement error detection in the main scanning direction and the positional displacement error correction in the sub scanning direction.

When measuring the sub-scan displacement error detection patterns in such a manner that an interval between a line parallel to the main scanning direction and a line inclined with respect to the main scanning direction is measured, if the positional displacements in the sub scanning direction is large enough, the interval to be measured is lengthened. As a result, there is a possibility that the lengthened interval result in errors. For that reason, to shorten the interval to be measured, measuring and correcting the positional displacements in the sub scanning direction has priority over correction in the main scanning direction. With the manner described above, since the positional displacements in the sub scanning direction is corrected, an increase in the interval to be measured can be eliminated to suppress the error within a certain range, so that correction with high accuracy can be achieved.

When writing the sub-scan displacement error detection patterns, as illustrated in FIGS. 17A, 17B and 21, occurs simultaneously with the magnification error detection in the main scanning direction by the main-scan magnification error detection mechanism, illustrated in FIG. 20, concurrent processing is executed.

When the magnification error correction is interposed during the positional displacement error correction in the main scanning direction, a sudden change in magnification in the main scanning direction occurs at a certain point and the image pattern formed in an inclined manner with respect to the main scanning direction is displaced in the main scanning direction. As a result, a measured result varied from the preceding image patterns may be obtained. In such a case, the magnification error correction in the main scanning direction is once canceled to control the magnification error correction in the main scanning direction after control for the positional displacement error correction in the main scanning direction is completed.

It should be noted that, with reference to the writing of the sub-scan displacement error detection patterns, although the magnification in the main scanning direction varies during the writing by the magnification error correction in the main scanning direction, the sub-scan displacement error detection patterns, which are formed of the lines parallel to the main scanning direction, in the sub scanning direction do not change with respect to the preceding patterns. Accordingly, simultaneous processing such as the writing of the sub-scan displacement error detection patterns and the measuring of the magnification error in the main scanning direction is possible. Thereby, correction using the between-sheet interval can be effectively executed.

Figure 23:
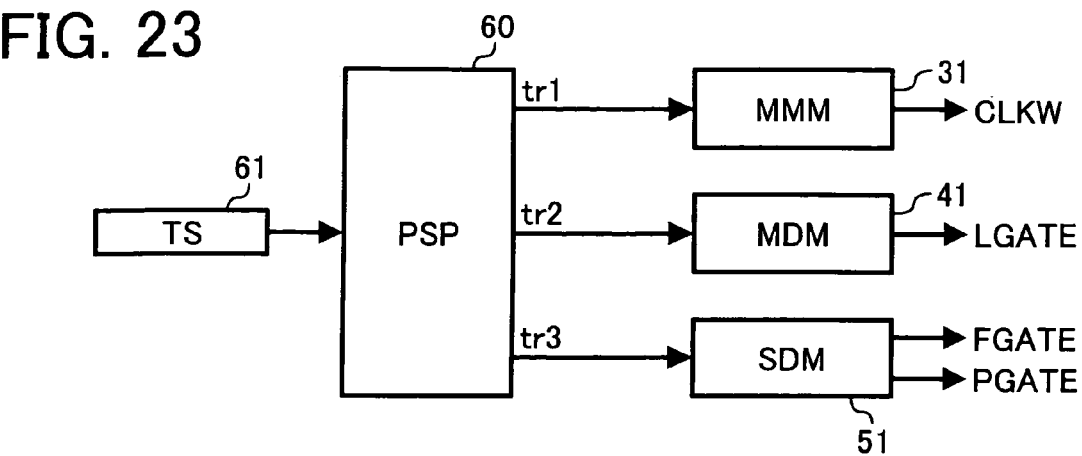
FIG. 23 is a block diagram illustrating a function executed by a processing selection part.

Referring to FIG. 23, an example of a selection and execution function of each correction control executed by the processing selection part (PSP) 60 will be explained. Detection information by the temperature sensor (TS) 61 is input to the processing selection part (PSP) 60, shown in FIG. 2. In FIG. 23, the processing selection part (PSP) 60 receiving the temperature information from the temperature sensor (TS) 61 outputs a main scan magnification correction control trigger Tr1 as a start signal to the main-scan magnification error correction mechanism (MMM) 31, outputs a main scan displacement correction control trigger Tr2 as the start signal to the main-scan displacement correction mechanism (MDM) 41, and outputs a positional displacement error correction control trigger Tr3 as the start signal to the sub-scan displacement correction mechanism (SDM) 51, respectively. With the triggers Tr1, Tr2 and Tr3 output therefrom, the correction mechanisms receiving the triggers execute the correction in the between-sheet interval.

The following equations are satisfied with respect to each correction trigger.

$$tr1=(\Delta T1=T1) \text{ and } (nottr2+M) \text{ and } (nottr3+N) \quad (A)$$

$$tr2=(\Delta T2=T2) \text{ and } (nottr1) \text{ and } (nottr3+N) \text{ and } tr3' \quad (B)$$

$$tr3=(\Delta T2=T2) \text{ and } (nottr1) \text{ and } (nottr2+M) \text{ and } tr2' \quad (C)$$

In the equations, a reference symbol "M" represents the number of sheets required for the positional displacement error correction in the main scanning direction. A reference symbol "N" represents the number of sheets required for the positional displacement error correction in the sub scanning direction. A reference symbol "T1" represents a temperature interval on which the magnification correction in the main scanning direction is executed. A reference symbol "ΔT1" represents a temperature change from a point of time at which the preceding magnification correction in the main scanning direction is executed. A reference symbol "T2" represents a temperature interval on which the correction is executed after any of the successful corrections in the main scanning direction or the sub scanning direction. A reference symbol "ΔT2" represents a temperature change from a point of time at which the preceding positional displacement correction in the sub scanning direction is executed. A reference symbol "TR2'" represents the main scan displacement correction trigger, preceding correction of which is successful. A reference symbol "TR3'" represents the sub scan displacement correction trigger, the preceding correction of which is successful.

In the above (A), the magnification correction control in the main scanning direction is executed in a case as follows. Namely, the temperature change ΔT1 from the point of time at which the preceding main scanning direction magnification correction control is executed reaches a predetermined temperature change, that is to say, the temperature interval, while not only positional displacement correction control in the main scanning direction but also the positional displacement correction control in the sub scanning direction are not executed. Therefore, in the above case, only the magnification correction control in the main scanning direction is executed in the same between-sheet interval.

In the above (B), the positional displacement correction in the main scanning direction is executed in a case as follows. Namely, the temperature change ΔT2 from the point of time at which the preceding positional displacement correction in the main scanning direction is executed reaches a predetermined temperature change, that is to say, the temperature interval, while not only the main scanning direction magnification correction control and the sub scanning direction positional displacement correction are not executed but also the preceding positional displacement correction in the sub scanning direction is successful. Therefore, in the above case, only the positional displacement correction in the main scanning direction is executed, in the dispersed manner, in the different intervals between sheets within the jobs.

In the above (C), the positional displacement correction in the sub scanning direction is executed in a case as follows. Namely, the temperature change ΔT2 from the point of time at which the preceding positional displacement correction in the main scanning direction is executed reaches the predetermined temperature change, that is to say, the temperature interval, while not only the main scanning direction magnification correction control and the positional displacement correction in the main scanning direction are not executed but also the preceding positional displacement correction in the main scanning direction is successful. Therefore, in the above case, only the positional displacement correction control in the sub scanning direction is executed, in the dispersed manner, in the different intervals between sheets within the jobs.

In the respective examples described above including the following cases by using the image forming method forming the latent images on the plurality of photoconductors and the thus formed respective latent images are visualized, so that the visualized images formed on the medium are sequentially superposed to form the superposed image, the examples include the processing as follows. Namely, the plurality of different types of writing error corrections are executed between the image processing in the preceding sheet and the image processing in the following sheet, in other words, the between-sheet interval. Moreover, the plurality of different types of writing error corrections include at least two of the following three writing error corrections:

1. Magnification error correction in the main scanning direction;
2. Positional displacement error correction in the main scanning direction;
3. Positional displacement error correction in the sub scanning direction;

In an example explained below, by additionally executing toner density correction, two of four different types of correction are executed in the between-sheet interval. Here, the four types of correction include:

1. Magnification error correction in the main scanning direction;
2. Positional displacement error correction in the main scanning direction;
3. Positional displacement error correction in the sub scanning direction;
4. Toner density correction.

Since the three different types of corrections other than the toner density correction executed in the between-sheet interval are already described in detail, the explanation thereof is omitted.

The toner density correction is commonly performed in the image forming apparatus employing an electrostatic development method. Referring to the examples described above, an image forming apparatus produces a well color balanced image by adjusting the four photoconductors 2Y, 2M, 2C and 2B so that equal toner density can be obtained. An outline of the toner density correction includes the following procedures. Namely, the image forming apparatus writes toner reading patch patterns, which are patterns used for correcting the toner density, in the between-sheet interval to determine degree of density by reading the patch patterns with sensors. When the density is not appropriate, such as when the density of the patch pattern is too dark, a laser power in the optical writing unit 1 or a transfer bias is decreased. On the other hand, when the density of the patch pattern is too light, the laser power in the optical writing unit 1 is increased or toner is added so that the toner density can be kept constant to control image forming conditions.

All processing associated with toner density correction control will be executed by a toner density correction control mechanism (TDCM) 400. The toner density correction control mechanism (TDCM) 400 will be illustrated in FIG. 29 below. The magnification error correction in the scanning directions, toner density correction and color adjustment correction by correcting the positional displacement errors in the main scanning direction and the sub scanning direction are executed in the between-sheet interval in a mixed manner.

In this example, reflective photo-detectors, that is, specular reflective photo-detector, are used for detecting the toner density correction patterns.

Figure 24:
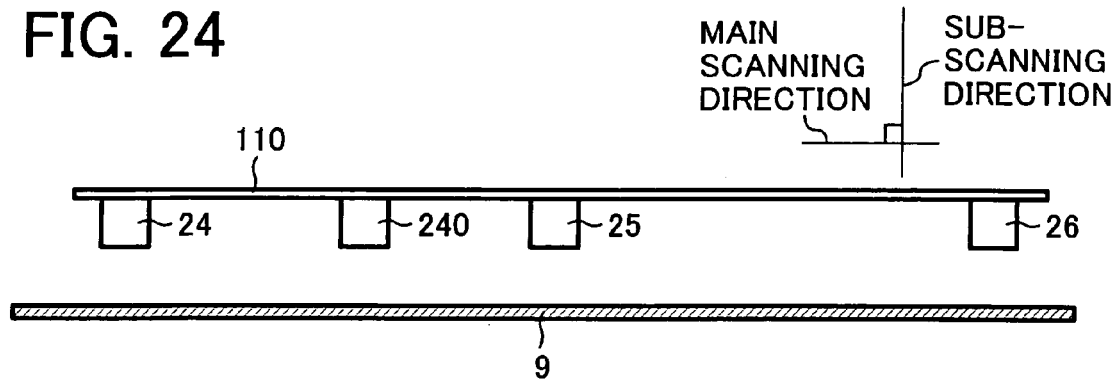
FIG. 24 is a sectional view illustrating a transfer belt and a holding member opposing the transfer belt having photodetectors thereon.

Referring to FIG. 24 according to the example illustrated in FIG. 4, an immobile holding member 110 includes four photo-detectors 24, 25, 26 and 240. Opposing the immobile holding member 110, the transfer belt 9 is provided. The three photo-detectors 24, 25 and 26 out of four photo-detectors are arranged on the immovable holding member 110 so that the photo-detectors oppose the transfer belt 9.

The photo-detector 240 used for detecting diffused light is provided in the main scanning direction between the photo-detectors 24 and 25. It should be noted that two orthogonal lines on upper right side of FIG. 24 through 27 indicate the main scanning direction and the sub scanning direction.

Figure 25:
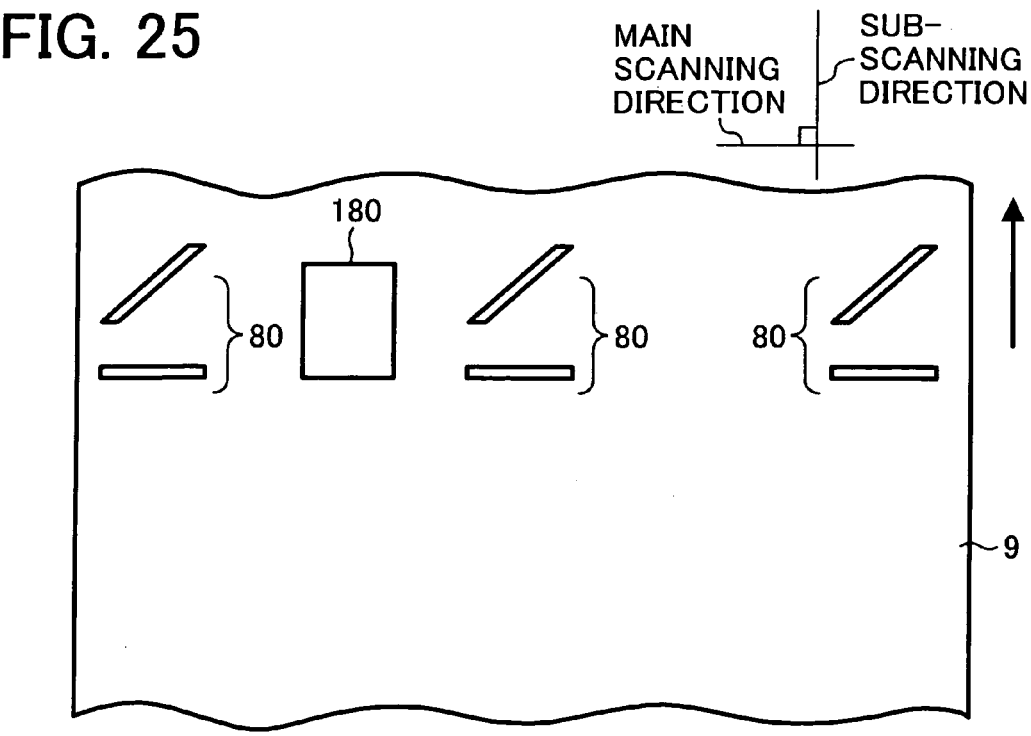
FIG. 25 is a partial plan view illustrating a transfer belt on a surface of which displacement error correction patterns having a rectangle shape and toner density correction pattern are formed.

Referring to FIG. 25, the patterns 80 and a toner density correction pattern 180 are formed on the transfer belt 9. An arrow illustrated upper right side of the transfer belt 9 indicates conveyance direction of the transfer belt 9, in other words the sub scanning direction. On positions on the transfer belt 9, which oppose the photo-detectors 24, 25 and 26, patterns illustrated in FIG. 25 are formed so that the patterns are read. On the transfer belt 9 opposing the photo-detector 240, the toner density correction pattern 180 having rectangle shape, as a pattern for the diffused light, is formed. In the example, four photo-detectors are required in total. In the example, the patterns 80 and the toner density correction pattern 180 are arranged so that the both are not superposed in the main scanning direction. With an arrangement described above, even when the patterns 80 and the toner density correction pattern 180 occur simultaneously, the patterns may be simultaneously written.

Figure 26:
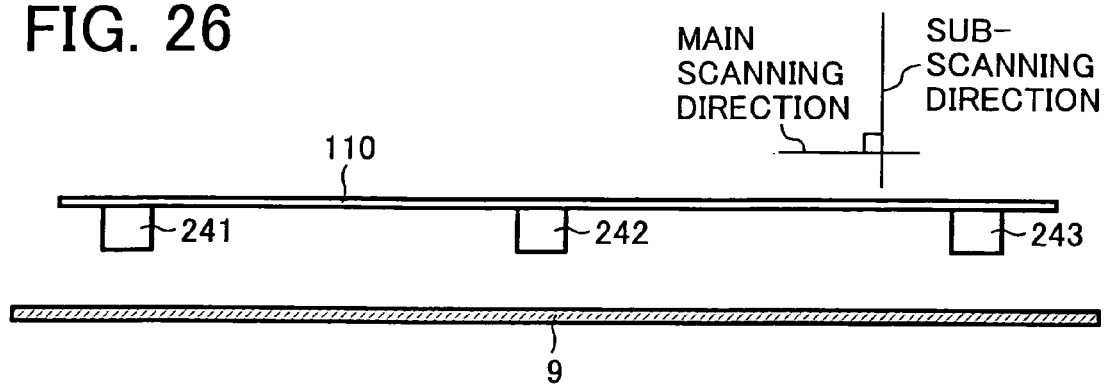
FIG. 26 is a sectional view illustrating a transfer belt and a holding member, opposing the transfer belt, having photodetectors.

Referring now to FIG. 26, the immobile holding member 110 includes the photo-detectors 241, 242 and 243. The photo-detectors 240 though 243 are photo-detectors that detect irregular reflection light, that is, the diffused light. The photo-detectors 240 though 243 are used for detecting the toner density correction patterns. The photo-detectors 241, 242, and 243 are arranged in the main scanning direction and on the immobile holding member 110 opposing the transfer belt 9.

Figure 27:
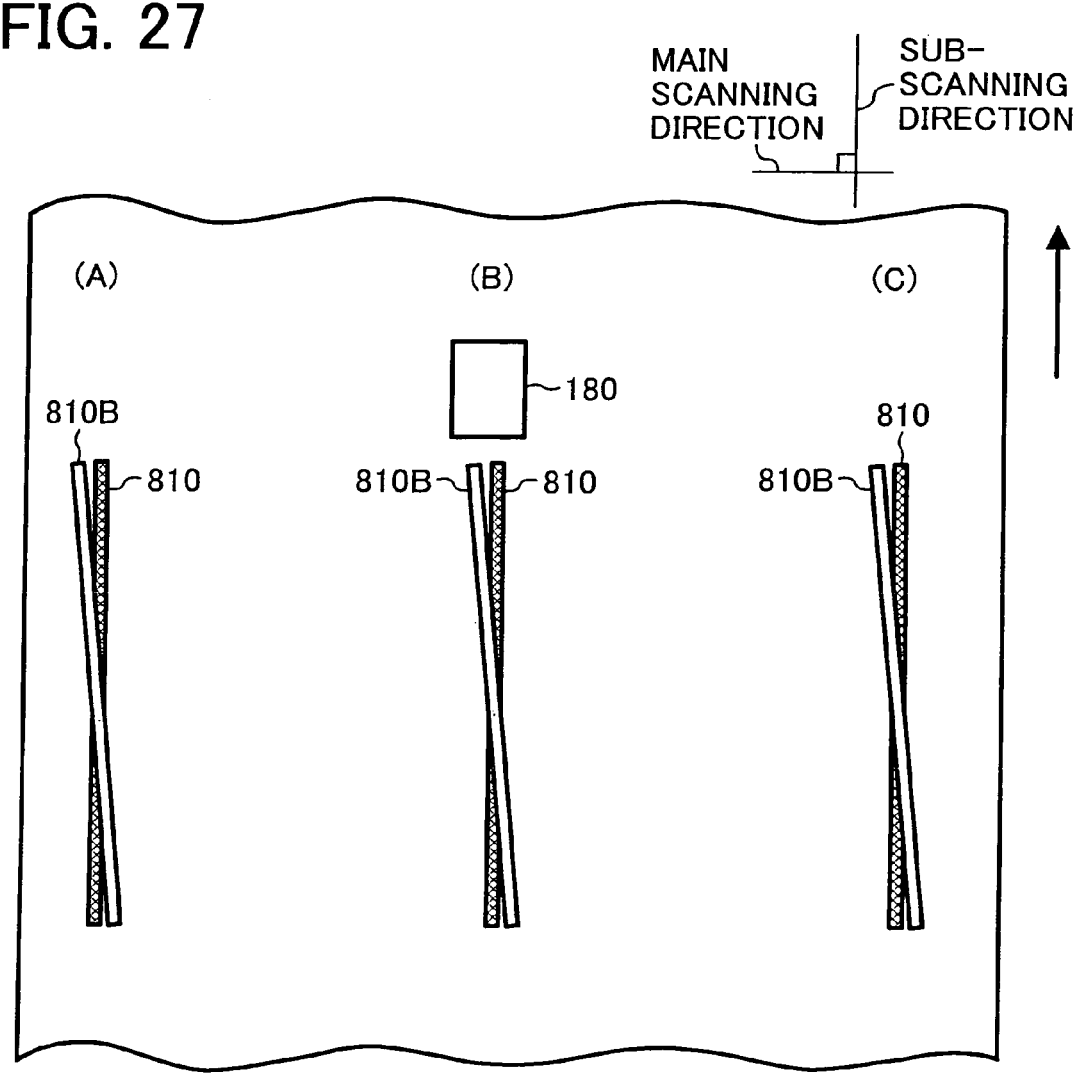
FIG. 27 is a partial plan view illustrating a transfer belt on a surface of which black line patterns and color line patterns are formed in an intersecting manner.

Referring now to FIG. 27, on the transfer belt 9 opposing the photo-detectors 241, 242 and 243, black line patterns 810B as patterns for detecting the diffused light and color line patterns 810 are formed in a manner that the black line patterns and the color line patterns conform to a traveling direction of the transfer belt 9, that is a direction indicated by an arrow and in a manner that the both line patterns are intersect with each other. In FIG. 27, a symbol "A" is given to the leftmost intersecting line patter images. A reference symbol "B" is given to the intersecting line patter images in the middle. A reference symbol "C" is given to the rightmost intersecting line patter images. It should be noted that the line patterns 810 have different colors with respect to each between-sheet interval. In other words, a certain line pattern is cyan in certain timing, magenta in another timing, and yellow in another timing. However, the black line patterns 810B are formed to intersect with the other color line patterns so that the patterns having two colors are constantly formed in an intersecting manner.

Among these three patterns, as in the case illustrated in FIG. 25, the toner density correction pattern 180 with rectangular shape 180 for correcting the toner density is formed, as the same pattern for the diffused light, on a position at a downstream side of the central pattern.

Thus, in this case, the diffused light detection photo-detectors with the same type are used as the photo-detector for detecting the displacement error correction patterns and the photo-detector for detecting the toner density correction patterns. Accordingly, above structure allows a reduction in the number of assembling parts so that the structure can be simplified.

Figure 28A:
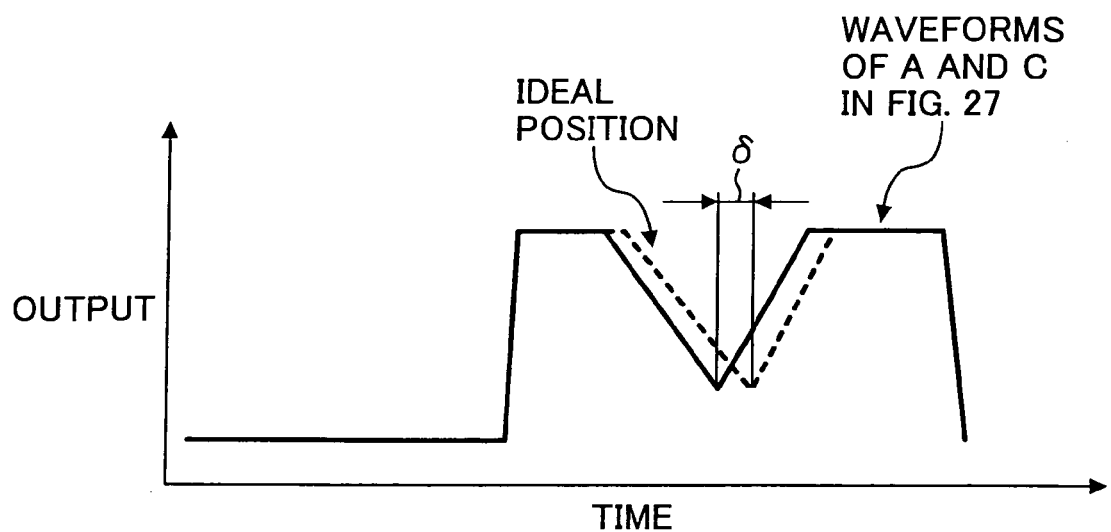
FIGS. 28A and 28B are charts illustrating output waveforms detected by photo-detectors.
Figure 28B:
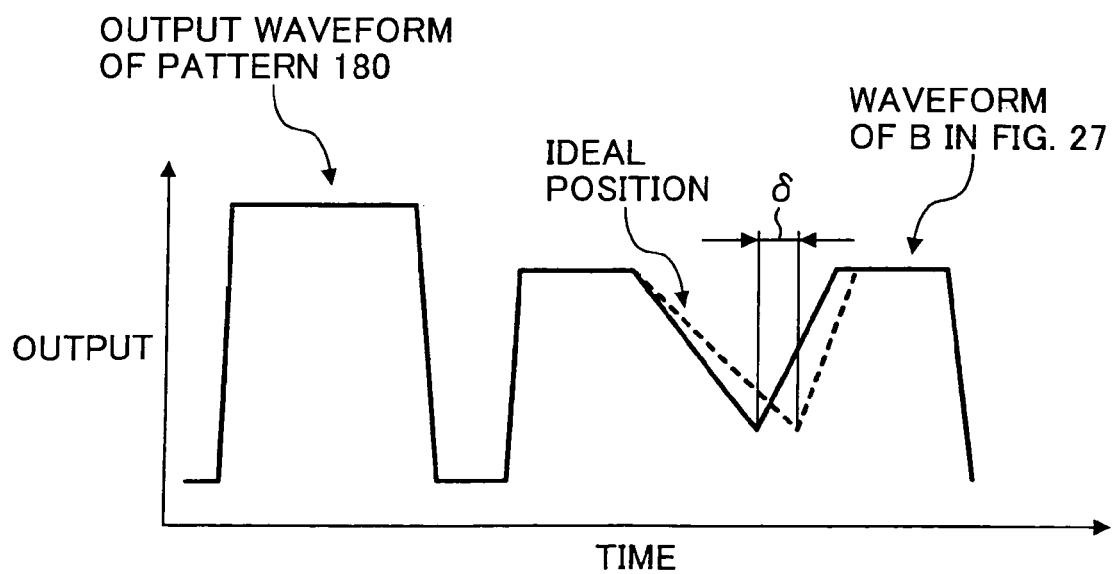

Referring now to FIG. 28A and 28B, in two charts, each horizontal axis indicates time and each vertical axis indicates an output. Each heavy line indicates a waveform. Each dotted line indicates an ideal position explained below. A reference symbol 6 indicates the amount of the displacements which represents the color displacement. In the two charts, FIG. 28A indicates output waveforms of A and C in FIG. 27. On the other hand, FIG. 28B indicates an output waveform of B in FIG. 27.

When the photo-detectors 241 and 243 in FIG. 26 detect respective patterns A and C illustrated in FIG. 27, the output waveform thereof is represented as illustrated in FIG. 28A. The amount of the displacements 8 from an ideal position relative to a reversed peak position having a V-shape can be detected. It should be noted that the reversed peak position is a reverse peak position in a case in which no positional displacement or no color displacement occurs.

In addition, when the photo-detector 242 in FIG. 26 detects the respective patterns B illustrated in FIG. 27, the output waveform thereof is represented as illustrated in FIG. 28B. The amount of the displacements 6 from the ideal position with relative to a reversed peak position having a V-shape can be detected in the same manner as the method in indicated by the FIG. 28A. It should be noted that the reversed peak position is a reverse peak position in the case in which no positional displacement or no color displacement occurs. In this case, the density can be read out from a height of a trapezoid-shaped waveform preceding the V-shaped waveform. It should be noted that the height of the trapezoid-shaped waveform indicates an output value.

The couple of patterns 810B and 810 as illustrated in FIGS. 26 and 27 are the intersecting patterns, superposition of which is sequentially displaced. As illustrated in FIGS. 26 and 27, since the black patterns, that is, the patterns 810B, have little reflection, positions on which the patterns 810B and 810 are completely superposed have the least reflection. The amount of the color displacements can be detected by measuring a distance between a lowest point in the V-shape and the ideal position. Since the density is identified by diffused light, the single type of photo-detector can be used for both the positional displacements and the density by identifying the both with the diffused light, that is to say by using the photo-detector capable of treating the diffused light.

As illustrated in FIG. 28, in this example, when the displacement error correction patterns 810B and 810 and the toner density correction pattern 180 are simultaneously written, the displacement error correction patterns 810B, 810 and the toner density correction pattern 180 are configured not to superpose with each other so that the both patterns are simultaneously written.

Here, the photo-detector of the same type such as a diffused light detecting photo-detector is used for both purposes, that is, detecting the displacement error correction patterns and detecting the toner density correction pattern. However, different types of photo-detectors are necessary to simultaneously write and detect the displacement error correction patterns 810B and 810, and the toner density correction pattern 180. As illustrated in FIGS. 26 and 27, arranging the respective positions of patterns allows simultaneous measurement of the density and the positional displacements.

As illustrated in FIG. 17, when positional control in the sub scanning direction of the image is executed by the sub-scan image area signal, that is, FGATE, the pattern image area signal, that is, PGATE, which constantly follows FGATE with a predetermined interval is generated. Since the pattern in the sub scanning direction and PGATE are generated by the counter and a comparator, both of which synchronize with the synchronization detection signal, an FGATE counter is shared or a PGATE counter is started from a position where FGATE is terminated. This operation allows PGATE to follow FGATE. As a result, a relation between the image and the pattern corresponds with each other. Therefore, an appropriate amount of the displacements can be detected.

A positional alignment pattern and a density control pattern are written by using PGATE. Thus, the toner density correction pattern starts generating when the preceding sub-scan image area signal FGATE is terminated. By generating the both patterns, the between-sheet interval can be effectively used.

Accuracy of the density control pattern is not so strict as the pattern for aligning positions because the density control patterns are not superposed like the patterns for aligning the positions. However, when reading the patterns a plurality of times to average so as to increase the accuracy in the density measurement, a synchronization control described above is preferable for correctly determining the area on which the patterns are written.

Figure 29:
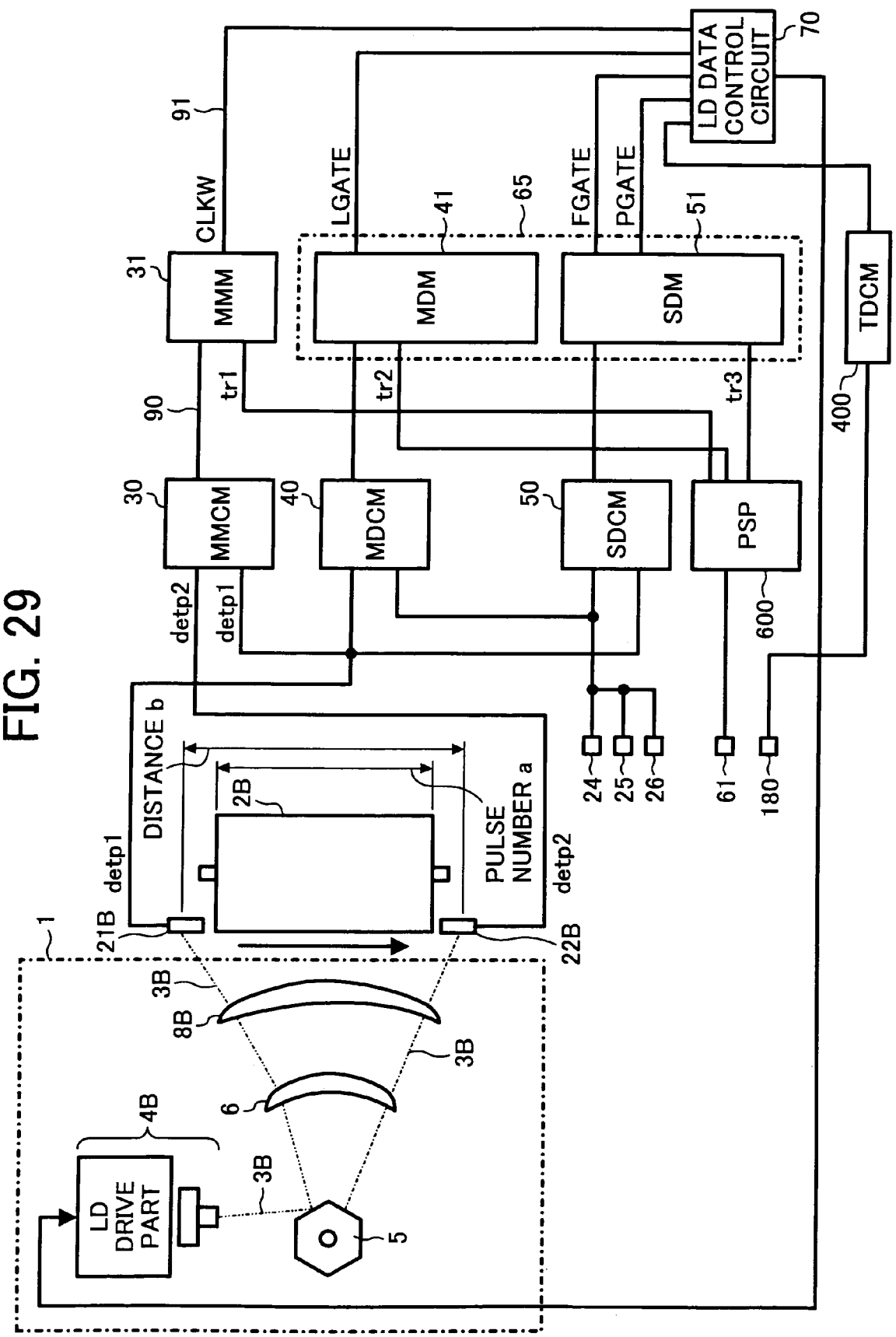
FIG. 29 is a block diagram illustrating the mechanisms for controlling a variety of corrections executed according to an embodiment of the present invention.
Figure 30:
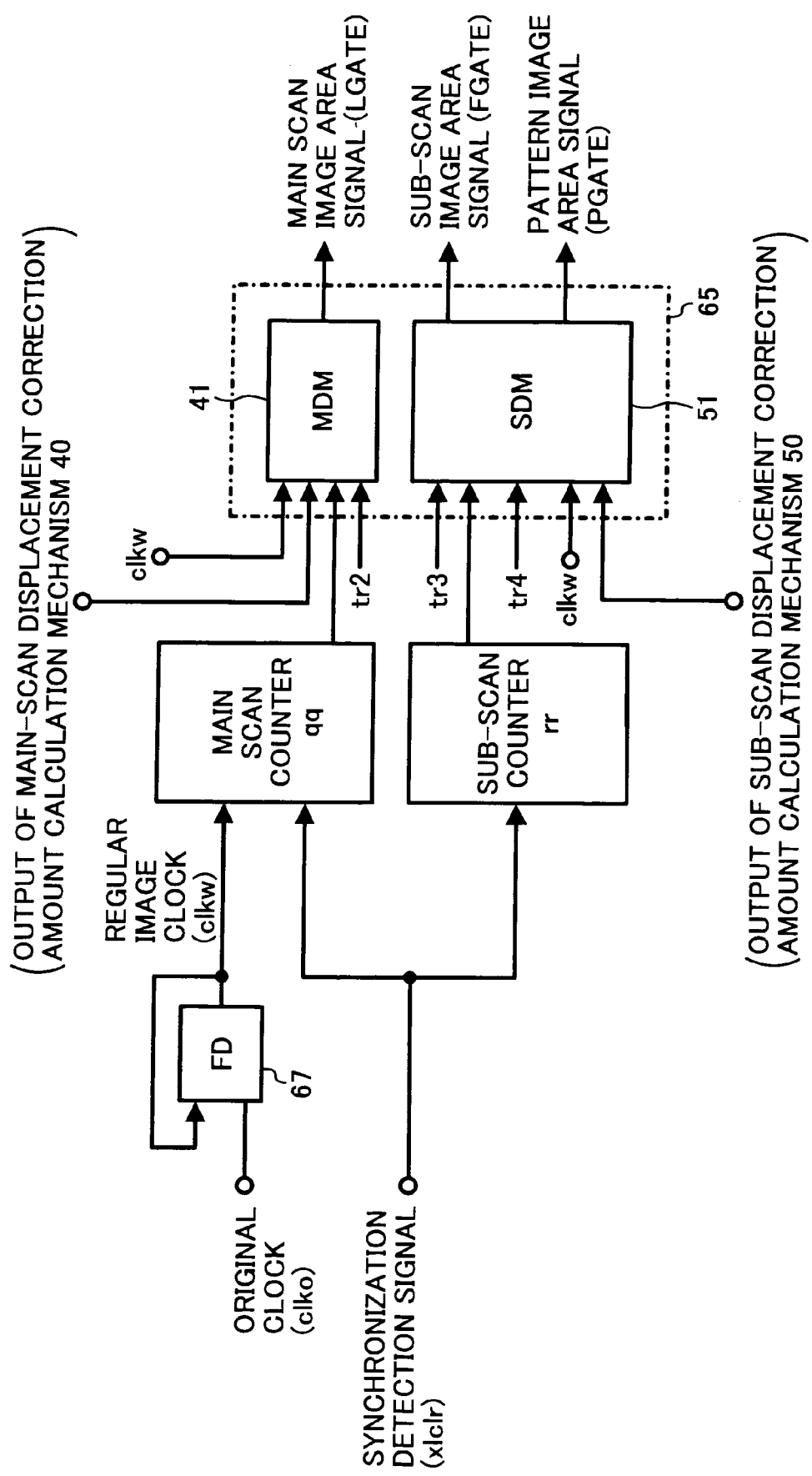
FIG. 30 is a block diagram illustrating contents for generating a variety of signals for correcting positional displacement errors.
Figure 31:
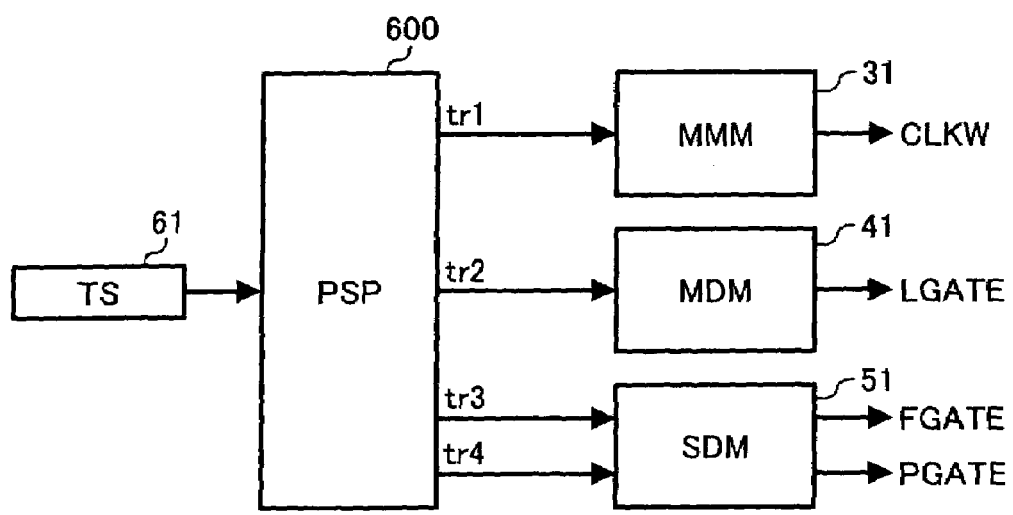
FIG. 31 is a block diagram illustrating a function executed by a processing selection part.

Referring now to FIG. 29 through 31, FIG. 29 illustrates the black writing system. Other than the toner density correction pattern 180, the toner density correction control mechanism (TDCM) 400 and a processing selection part (PSP) 600, mechanisms illustrated in FIG. 29 are the same as those in FIG. 2. FIG. 30 illustrates a mechanism for a variety of signals correcting the positional displacement errors. Other than a density correction trigger Tr4 a mechanism illustrated in FIG. 30 is the same as that in FIG. 18. FIG. 31 illustrates selection and execution function of each correction control executed by a processing selection part (PSP) 600. Other than Tr4 and the processing selection part (PSP) 600, the mechanism illustrated in FIG. 31 is the same as that in FIG. 23.

As illustrated in FIGS. 29 through 31, the processing selection part (PSP) 600 generates a density correction trigger tr4, that is, a start signal, and the processing selection part (PSP) 600 outputs the density correction trigger tr4 to the image area signal generation circuit 65, so that formation of the toner density correction pattern by PGATE is executed. As a result, a series of corrections are executed.

Hereinafter, contents selected by a processing selection part (PSP) 600 will be described. In FIGS. 29 through 31, the contents of the processing selection part (PSP) 600 corresponding to the processing selection part (PSP) 60 are represented by equations below when the following conditions are satisfied:

The number of necessary sheets m for the main scanning direction positional displacement correction.

The number of necessary sheets n for the sub scanning direction positional displacement correction.

A temperature interval t1 on which the main scanning direction magnification correction is executed.

The temperature change $\Delta t1$ from a point of time at which the previous scanning direction magnification correction is executed.

A temperature interval t2 at which the correction is executed after the correction in the main scanning direction or the sub scanning direction is executed.

The temperature change $\Delta t2$ from a point of time at which the previous sub scanning direction positional displacement correction is executed.

A sheet interval p1 at which the density correction is executed.

The number of sheet $\Delta p1$ after the previous density correction is executed.

Scan magnification correction trigger tr1.

Main scan displacement correction trigger tr2 and correction trigger tr2', the previous correction by which is successful.

Sub scan displacement correction trigger tr3 and correction trigger tr3', the previous correction by which is successful.

The density correction trigger tr4.

As described above, when the above conditions are satisfied, the following equations are satisfied:

$$tr1 = (\Delta t1 = t1) \text{ and } (\text{not}(tr2+m)) \text{ and } (\text{not}(tr3+n)) \text{ and } (\text{not}(tr4));$$

$$tr2 = (\Delta t2 = t2) \text{ and } (\text{not}(tr1)) \text{ and } (\text{not}(tr3+n)) \text{ and } tr3' \text{ and } (\text{not}(tr4));$$

$$tr3 = (\Delta t2 = t2) \text{ and } (\text{not}(tr1)) \text{ and } (\text{not}(tr2+m)) \text{ and } tr2' \text{ and } (\text{not}(tr4));$$

$$tr4 = (\Delta p1 = p1) \text{ and } (\text{not}(tr1)) \text{ and } (\text{not}(tr2+m)) \text{ and } (\text{not}(tr3+n)).$$

Typical scan magnification correction is frequently executed under a condition in which the t2 is greater than t1. When the main-scan positional displacement correction trigger tr2 and the sub-scan positional displacement trigger tr3 are input, when the positional displacement correction is executed, that is, m and n, and when the density correction is executed, the scan magnification correction is not executed.

The main-scan positional displacement error correction is executed at the temperature interval t2. The main-scan positional displacement error correction is started when the previous sub-scan positional displacement correction is successful while the density control is not executed, or when the main-scan positional displacement correction is not actually executed.

The sub-scan positional displacement correction is executed at the temperature interval t2. The sub-scan positional displacement correction is started when the previous main-scan positional displacement correction is successful while the density control is not executed, or when the main-scan positional displacement correction is not actually executed.

The density correction is executed in the following manner. Namely, the used toner amount is measured by counting the sheets to execute the correction control depending on the number of sheets. The density correction is started when not only the main-scan positional displacement correction and the sub-scan positional displacement correction are not executed, but also when the scan magnification correction is not executed.

When the writing of the toner density correction pattern occurs simultaneously with the measurement of magnification error correction in the main scanning direction, both processing is concurrently executed. When reading of the toner density correction pattern occurs simultaneously with the measurement of magnification error correction in the main scanning direction, control over the toner density correction has the priority. Hereby, the down time, in other words, a stop time other than the image forming, during continuous printing can be further reduced.

Typically, the toner density correction pattern is solidly shaded pattern. Since the solidly shaded pattern is not susceptible to clock variation, even when the scan magnification correction control starts operating during operation, the density control is not influenced by the change in magnification. Therefore, the following equations can be satisfied in the above cases.

$$tr1=(\Delta t1=t1) \text{ and } (\text{not}(tr2+m)) \text{ and } (\text{not}(tr3+n));$$

$$tr2=(\Delta t2=t2) \text{ and } (\text{not}(tr1)) \text{ and } (\text{not}(tr3+n)) \text{ and } tr3' \text{ and } (\text{not}(tr4));$$

$$tr3=(\Delta t2=t2) \text{ and } (\text{not}(tr1)) \text{ and } (\text{not}(tr2+m)) \text{ and } tr2' \text{ and } (\text{not}(tr4));$$

$$tr4=(\Delta p1=p1) \text{ and } (\text{not}(tr2+m)) \text{ and } (\text{not}(tr3+n)).$$

Typical scan magnification correction is frequently executed under a condition in which the t2 is greater than t1. When the main-scan positional displacement correction trigger tr2 and the sub-scan positional displacement trigger tr3 are input, when the positional displacement correction is executed, that is, m and n, and when the density control is executed, the scan magnification correction is not executed.

The main-scan positional displacement error correction is executed at the temperature interval t2. The main-scan positional displacement error correction is started when the previous sub-scan positional displacement correction is successful while the density control is not executed, or when the main-scan positional displacement correction is not actually executed.

The sub-scan positional displacement correction is executed at the temperature interval t2. The sub-scan positional displacement correction is started when the previous main-scan positional displacement correction is successful while the density control is not executed, or when the main-scan positional displacement correction is not actually executed.

The density correction is executed in the following manner. Namely, the used toner amount is measured by counting the sheets to execute the correction control depending on the number of sheets. The density correction is started when not only the main-scan positional displacement correction but also the sub-scan positional displacement correction is not executed.

When writing sequence in the toner density correction pattern other than the solidly shaded pattern occurs simultaneously with the measurement of the magnification error correction in the main scanning direction, the concurrent processing is terminated. Hereby, variable factors such as sudden disturbance in the PLL circuit during the density control can be effectively suppressed, so that the density control with high accuracy can be achieved. It should be noted that the solidly shaded patter image is the pattern with uniform data in all pixels.

Figure 32A:
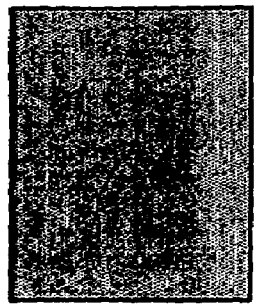
FIGS. 32A and 32B are diagrams illustrating patterns for toner density correction.
Figure 32B:
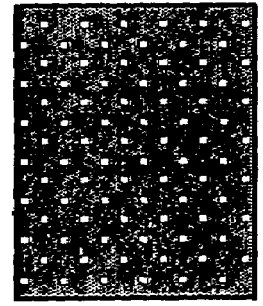

Referring to FIGS. 32A and 32B, toner density correction pattern with different density will be explained.

In FIGS. 32A and 32B, when a half-shaded pattern is used other than the solidly shaded pattern in FIG. 32A, the change in magnification during the operation causes disturbance in clocks. The disturbance in clocks further causes disturbance in pixels alignment to change the density of the pattern. For that reason, stability in density is preferentially considered to adjust the scan magnification later. This is because of the following reason. The magnification does not change significantly even in a single operation. On the other hand, in the density control, toner refill shortage causes acute reduction in density. It should be noted that the half shaded pattern is a pattern in which control is executed by reading an intermediate density having reduced half-shaded dots.

Obviously, numerous modifications and variations of the present invention are possible in light of the above teachings. It is therefore to be understood that within the scope of the appended claims, the invention may be practiced otherwise than as specifically described herein.

The invention claimed is:

1. An image forming apparatus, comprising:
an image forming mechanism configured to perform an image processing operation to form a plurality of elementary-color images, superpose the plurality of elementary-color images sequentially into a single color image on a transfer medium, and to transfer the single color image onto a recording sheet, and to repeat the image processing operation to transfer subsequent single color images onto subsequent recording sheets;
an error correction mechanism configured to perform a plurality of different recording error corrections to correct different recording errors in a main scanning direction and a sub scanning direction during time intervals between the image processing operations on respective of the recording sheets and on a following recording sheet, wherein the error correction mechanism executes each one of the plurality of different recording error corrections during different of the time intervals between the image processing operations on the recording sheets that are adjacent to each other under the image processing operations; and
a selector configured to activate at least two of the plurality of different recording error corrections.

2. The image forming apparatus according to claim 1, wherein the plurality of different recording error corrections includes a magnification error in the main scanning direction, a main-scan displacement in the main scanning direction, and a sub-scan displacement in the sub scanning direction, and the error correction mechanism comprises:
   a first corrector comprising:
   a magnification error detection mechanism configured to detect an amount of the magnification error in the main scanning direction; and
   a magnification error correction mechanism configured to correct the magnification error detected by the magnification error detection mechanism, a second corrector comprising:
   a main-scan displacement detection mechanism configured to detect an amount of the main-scan displacements among the plurality of elementary-color images in the main scanning direction; and
   a main-scan displacement correction mechanism configured to correct the main-scan displacements detected by the main-scan displacement detection mechanism, and a third corrector comprising:
   a sub-scan displacement detection mechanism configured to detect an amount of the sub-scan displacements among the plurality of elementary-color images in the sub scanning direction; and
   a sub-scan displacement correction mechanism configured to correct the sub-scan displacements detected by the sub-scan displacement detection mechanism.

3. The image forming apparatus according to claim 2, wherein the magnification error detection mechanism includes two photo-detectors arranged, with an interval, in a direction scanned by scanning light and a magnification error correction amount calculation mechanism configured to calculate the amount of the magnification error in the main scanning direction with scanning light detection information from the photo-detectors.

4. The image forming apparatus according to claim 3, wherein the two photo-detectors include light receptive photo-detectors.

5. The image forming apparatus according to claim 2, wherein the magnification error correction mechanism includes a phase locked loop circuit configured to change a pixel clock frequency to write the plurality of the elementary color images in the main scanning direction, based on displacement information from the magnification error detection mechanism, the pixel clock frequency being a pulse train corresponding to a pixel.

6. The image forming apparatus according to claim 2, wherein the magnification error correction mechanism includes a frequency divider configured to generate pixel clock signals based on original clock signals, a pulse train generation circuit configured to generate pulses to change phases of image clock signals with respect to regular pixel clocks, based on an output by the magnification error detection mechanism, and a selector configured to select appropriate pixel clock signals for correction from an output by the pulse train generation circuit.

7. The image forming apparatus according to claim 6, wherein, with respect to the magnification error correction mechanism, the pulse train generation circuit generates the pixel clock signals for correction with a short pulse width in comparison with a regular pixel clock signals when the single color image tends to be lengthened, while generating the pixel clock signals for correction with a long pulse width in comparison with the regular pixel clock signals when the single color image tends to be shortened.

8. The image forming apparatus according to claim 7, wherein the photo-detectors include reflective photo-detectors.

9. The image forming apparatus according to claim 2, wherein the main-scan displacement detection mechanism includes photo-detectors arranged opposing the transfer medium and a main-scan displacement correction amount calculation mechanism configured to calculate the amount of the main-scan displacements, based on detection information from the photo-detectors detecting main-scan displacement detection patterns formed in advance, the displacements being color displacements.

10. The image forming apparatus according to claim 9, wherein the main-scan displacement correction mechanism is a part of an image area signal generation circuit configured to receive positional displacement information in the main scanning direction by the main-scan displacement correction amount calculation mechanism to change a writing start position with respect to each single main scanning line of pixel clock signals for writing the plurality of the elementary color images, so that main-scan image area signals are output.

11. The image forming apparatus according to claim 10, wherein the image area signal generation circuit outputs the main-scan image area signals, sub-scan image area signals, and pattern image area signals writing the main-scan displacement error detection patterns and the sub-scan displacement error detection patterns.

12. The image forming apparatus according to claim 11, wherein the image area signal generation circuit starts generating the pattern image area signals in synchronization with a sub-scan position of an immediately preceding sub-scan image area signal.

13. The image forming apparatus according to claim 2, wherein the sub-scan displacement detection mechanism includes photo-detectors arranged opposing the transfer medium and a sub-scan displacement correction amount calculation mechanism configured to calculate the sub-scan displacements, based on detection information from the photo-detectors detecting sub-scan displacement error detection patterns formed in advance, the displacements being color displacements.

14. The image forming apparatus according to claim 13, wherein the sub-scan displacement correction mechanism is a part of an image area signal generation circuit configured to receive positional displacement information in the sub scanning direction from the sub-scan displacement correction amount calculation mechanism to change a writing start position with respect to each single sheet of the pixel clock signals for writing the plurality of the elementary color images, so that sub-scan image area signals are output.

15. The image forming apparatus according to claim 2, wherein, when writing of main-scan displacement error detection patterns and sub-scan displacement error detection patterns occurs simultaneously with detecting of the amount of the magnification error in the main scanning direction by the magnification error detection mechanism, the writing of the main-scan displacement error detection patterns and sub-scan displacement error detection patterns is preferentially executed.

16. The image forming apparatus according to claim 2, wherein, with respect to a priority to control the first, second, and third correctors, control over the first corrector has priority over the second and the third correctors.

17. The image forming apparatus according to claim 2, wherein detecting and correcting the amount of the main-scan displacements by the second corrector is executed independent of detecting and correcting the amount of the sub-scan displacements by the third corrector.

18. The image forming apparatus according to claim 2, wherein detecting and correcting the amount of the main-scan displacements by the second collector is executed after detecting and correcting the amount of the sub-scan displacements by the third corrector.

19. The image forming apparatus according to claim 2, wherein, when writing of sub-scan displacement error patterns occurs simultaneously with detecting of the amount of the magnification error in the main scanning direction by the magnification error detection mechanism, concurrent processing is performed.

20. An image correction control apparatus for use in an image forming apparatus, comprising:
   an error correction mechanism configured to perform a plurality of different recording error corrections to correct different recording errors in a main scanning direction and a sub scanning direction during time intervals between image processing operations performed by the image forming apparatus on respective of recording sheets and on a following recording sheet, wherein the error correction mechanism executes each one of the plurality of different recording error corrections during different of the time intervals between the image processing operations on the recording sheets that are adjacent to each other under the image processing operations; and
   a selector configured to activate at least two of the plurality of different recording error corrections.

21. The image correction control apparatus according to claim 20, wherein the plurality of different recording error corrections includes a magnification error in the main scanning direction, a main-scan displacement in the main scanning direction, and a sub-scan displacement in the sub scanning direction, and the error correction mechanism comprises:
   a first corrector comprising:
      a magnification error detection mechanism configured to detect an amount of the magnification error in the main scanning direction; and
      a magnification error correction mechanism configured to correct the magnification error detected by the magnification error detection mechanism;
   a second corrector comprising:
      a main-scan displacement detection mechanism configured to detect an amount of the main-scan displacements among the plurality of elementary-color images in the main scanning direction; and
      a main-scan displacement correction mechanism configured to correct the main-scan displacements detected by the main-scan displacement detection mechanism; and
   a third corrector comprising:
      a sub-scan displacement detection mechanism configured to detect an amount of the sub-scan displacements among the plurality of elementary-color images in the sub scanning direction; and
      a sub-scan displacement correction mechanism configured to correct the sub-scan displacements detected by the sub-scan displacement detection mechanism.

22. The image correction control apparatus according to claim 21, wherein the magnification error correction mechanism includes a frequency divider configured to generate pixel clock signals, made up of a pulse train corresponding to pixels and for writing the plurality of elementary-color images, by dividing original clock signals having a higher frequency than a frequency of the pixel clock signals, and a pulse train generation circuit configured to generate a certain pulse for the pixel clock signals by a plurality of correction pulses corresponding to an amount of displacements and having a different pulse width from a regular pulse width,
   the image correction control apparatus correcting the magnification error by replacing phases of the pixel clock signals by using the correction pulses having the different pulse width from the regular pulse width, based on correction data obtained from photo-detectors arranged at two points.

23. An image forming apparatus, comprising:
   image forming means for performing an image processing operation for forming a plurality of elementary-color images, superposing the plurality of elementary-color images sequentially into a single color image on a transfer medium, and transferring the single color image onto a recording sheet, and to repeat the image processing operation to transfer subsequent single color images onto subsequent recording sheets;
   error correction means for performing a plurality of different recording error corrections for correcting different recording errors in a main scanning direction and a sub scanning direction during time intervals between the image processing operations on one of the recording sheets and on a following recording sheet, wherein the error correction means executes each one of the plurality of different recording error corrections during different of the time intervals between the image processing operations on the recording sheets that are adjacent to each other under the image processing operations; and
   selecting means for activating at least two of the plurality of different recording error corrections.

24. The image forming apparatus according to claim 23, wherein the plurality of different recording error corrections include a magnification error in the main scanning direction, a main-scan displacement in the main scanning direction, and a sub-scan displacement in the sub scanning direction, and the error correction means comprises:
   first correcting means comprising:
      magnification error detecting means for detecting an amount of the magnification error in the main scanning direction; and
      magnification error correcting means for correcting the magnification error detected by the magnification error detection means;
   second correcting means comprising:
      main-scan displacement detecting means for detecting an amount of the main- scan displacements among the plurality of elementary-color images in the main scanning direction; and
      main-scan displacement correcting means for correcting the main-scan displacements detected by the main-scan displacement detection means; and third correcting means comprising:
      sub-scan displacement detecting means for detecting an amount of the sub-scan displacements among the plurality of elementary-color images in the sub scanning direction; and
      sub-scan displacement correcting means for correcting the sub-scan displacements detected by the sub-scan displacement detection means.

25. The image forming apparatus according to claim 24, wherein the magnification error detecting means includes two light detecting means arranged with an interval in a direction scanned by scanning light and a magnification error correction amount calculation means for calculating the amount of the magnification error in the main scanning direction by scanning light detection information from the two light detecting means.

26. The image forming apparatus according to claim 25, wherein the two light detecting means include light receptive light detecting means.

27. The image forming apparatus according to claim 24, wherein the magnification error correcting means includes means for changing a pixel clock frequency, which is a pulse train corresponding to a pixel, for writing the plurality of elementary color images in the main scanning direction, based on displacement information from the magnification error detecting means.

28. The image forming apparatus according to claim 24, wherein the magnification error correcting means includes means for generating pixel clock signals based on original clock signals, means for generating pulses for changing phases of image clock signals with respect to regular pixel clock signals, based on an output by the magnification error detecting means, and selecting means for selecting appropriate pixel clock signals for correction from an output by the means for generating the pulses.

29. The image forming apparatus according to claim 28, wherein, with respect to the magnification error correcting means, the means for generating pulses generates the pixel clock signals for correction with a short pulse width in comparison with regular pixel clock signals when a single color image tends to be lengthened, while generating the pixel clock signals for correction with a long pulse width in comparison with the regular pixel clock signals when the single color image tends to be shortened.

30. The image forming apparatus according to claim 24, wherein the main-scan displacement detecting means includes light detecting means arranged opposing the transfer medium and main-scan displacement error calculating means for calculating the amount of the main-scan displacements, based on detection information from the light detecting means detecting main-scan displacement error detection patterns formed in advance, the displacements being color displacements.

31. The image forming apparatus according to claim 30, wherein the main-scan displacement correcting means is a part of means for generating image area signals receiving positional displacement information in the main scanning direction by the main-scan displacement calculating means to change a writing start position with respect to each single main scanning line of pixel clock signals for writing the plurality of elementary color images, so that main-scan image area signals are output.

32. The image forming apparatus according to claim 31, wherein the means for generating the image area signals outputs the main-scan image area signals, sub-scan image area signals, and pattern image area signals for writing the main-scan displacement error detection patterns and the sub-scan displacement error detection patterns.

33. The image forming apparatus according to claim 32, wherein the means for generating the image area signals starts generating the pattern image area signals in synchronization with a sub-scan position of an immediately preceding sub-scan image area signal.

34. The image forming apparatus according to claim 30, wherein light detecting means includes reflective light detecting means.

35. The image forming apparatus according to claim 24, wherein the sub-scan displacement detecting means includes light detecting means arranged opposing the transfer medium, and sub-scan displacement calculating means for calculating the amount of the sub-scan displacements based on detection information from the light detecting means detecting sub-scan displacement error detection patterns formed in advance, the displacements being color displacements.

36. The image forming apparatus according to claim 35, wherein the sub-scan displacement correcting means is a part of means for generating image area signals receiving positional displacement information in the sub scanning direction from the sub-scan displacement calculating means to change a writing start position with respect to each single sheet of the pixel clock signals for writing the plurality of elementary color images, so that the sub-scan image area signals are output.

37. The image forming apparatus according to claim 24, wherein, when writing of main-scan displacement error detection patterns and sub-scan displacement error detection patterns occurs simultaneously with detecting of the amount of the magnification error in the main scanning direction by the magnification error detecting means, the writing of the main-scan displacement error detection patterns and sub-scan displacement error detection patterns is preferentially executed.

38. The image forming apparatus according to claim 24, wherein, with respect to a priority to control the first, second, and third correcting means, control over the first correcting means has the priority over the second and the third correcting means.

39. The image forming apparatus according to claim 24, wherein detecting and correcting the amount of the main-scan displacements by the second correcting means is executed independent of detecting and correcting the amount of the sub-scan displacements by the third correcting means.

40. The image forming apparatus according to claim 24, wherein detecting and correcting the amount of the main-scan displacements by the second correcting means is executed after executing detecting and correcting the amount of the sub-scan displacements by the third correcting means.

41. The image forming apparatus according to claim 24, wherein, when writing of sub-scan displacement error detection patterns occurs simultaneously with detecting of the amount of the magnification error in the main scanning direction by the main-scan displacement detecting means, concurrent processing is performed.

42. An image forming method, comprising:
  performing an image processing operation comprising:
    forming a plurality of elementary-color images;
    superposing the plurality of elementary-color images sequentially into a single color image on a transfer medium;
    transferring the single color image onto a recording sheet; and
  repeating the image processing operation to transfer subsequent single color images onto subsequent recording sheets; and
  executing a plurality of different recording error corrections for correcting a plurality of different recording errors in a main scanning direction and in a sub scanning direction during time intervals between the image processing operations on one of the recording sheets and on a following recording sheet, wherein the executing executes each one of the plurality of different recording error corrections during different of the time intervals between the image processing operations on the recording sheets that are adjacent to each other under the image processing operations.

43. The image forming method according to claim 42, wherein the plurality of different recording errors corrections include at least two of a magnification error correction in a main scanning direction, a main-scan displacement correction in the main scanning direction, and a sub-scan displacement correction in a sub scanning direction.

44. The image forming method according to claim 42, wherein the magnification error correction in the main scanning direction shifts phases of pixel clock signals each determining timings of an individual image recording operation using scanning light, based on a resultant value of a comparison between a scanning time period of the scanning light in the main scanning direction and a reference time period.

45. The image forming method according to claim 42, wherein the main-scan displacement correction in the main scanning direction forms a plurality of predetermined main-scan displacement error detection patterns on the transfer medium, reads with a plurality of photo-detectors the plurality of predetermined main-scan displacement error detection patterns formed on the transfer medium, and changes start timings of main-scan image area signals to synchronize an individual image recording operation to a predetermined reference timing based on the read values of the plurality of predetermined main-scan displacement error detection patterns.

46. The image forming method according to claim 42, wherein the sub-scan displacement correction in the sub scanning direction forms a plurality of predetermined sub-scan displacement error detection patterns on the transfer medium, reads with a plurality of photo-detectors the plurality of predetermined sub-scan displacement error detection patterns formed on the transfer medium, and changes start timings of sub-scan image area signals to synchronize an individual image recording operation to a predetermined reference timing based on the read values of the plurality of predetermined sub-scan displacement error detection patterns.

47. The image forming method according to claim 42, wherein the plurality of predetermined sub-scan displacement error detection patterns are formed during a time interval between image processing operations on the recording sheet and on a following recording sheet each time when a predetermined time period elapses after a termination of the sub-scan image area signals corresponding to a page length in the sub scanning direction.

48. An image forming method, comprising:
   performing an image processing operation comprising:
      forming a plurality of elementary-color images;
      superposing the plurality of elementary-color images sequentially and into a single color image;
      transferring the single color image onto a recording sheet; and
      repeating the image processing operation to transfer subsequent single color images onto subsequent recording sheets; and
   performing a plurality of different recording error corrections, including at least two of a magnification error correction in a main scanning direction, a main-scan displacement correction in the main scanning direction, a sub-scan displacement correction in a sub scanning direction, and a toner density correction, for correcting a plurality of different recording errors during time intervals between image processing operations on one of the recording sheets and on a following recording sheet, wherein the performing executes each one of the plurality of different recording error corrections during different of the time intervals between the image processing operations on the recording sheets that are adjacent to each other under the image processing operations.

49. The image forming method according to claim 48, wherein, when writing of toner density correction patterns occurs simultaneously with measuring of the magnification error correction in the main scanning direction, concurrent processing is executed.

50. The image forming method according to claim 48, wherein, when a writing sequence other than a case in which the toner density correction patterns are a solid shaded pattern having uniform data in all pixels occurs simultaneously with measuring of the magnification error correction in the main scanning direction, concurrent processing is terminated.

51. The image forming method according to claim 48, wherein, when reading of the toner density correction patterns occurs simultaneously with measuring of the magnification error correction in the main scanning direction, control over the toner density correction is preferentially executed.

52. The image forming apparatus according to claim 48, wherein the toner density correction patterns are generated in synchronization with completion of a preceding sub-scan image area signals.

53. The image forming method according to claim 48, wherein photo-detectors with a similar type for detecting diffused light are used for both photo-detectors detecting main-scan displacement error detection patterns, sub-scan displacement error detection patterns, and the toner density correction patterns.

54. The image forming method according to claim 48, wherein, when writing of main-scan displacement error detection patterns and sub-scan displacement error detection patterns occurs simultaneously with writing of toner density correction patterns, in an arrangement in which the main-scan displacement error detection patterns, sub-scan displacement error detection patterns, and the toner density correction patterns are placed without being superposed with each other, concurrent writing of both main-scan displacement error detection patterns and sub-scan displacement error detection patterns is executed.

* * * * *